(12) United States Patent
Akamatsu et al.

(10) Patent No.: US 7,224,886 B2
(45) Date of Patent: May 29, 2007

(54) METHOD OF USING AV DEVICES AND AV DEVICE SYSTEM

(75) Inventors: Chiyo Akamatsu, Yokohama (JP); Tsukasa Hasegawa, Hiratsuka (JP); Tamotsu Ito, Ayase (JP); Hidefumi Goto, Yokosuka (JP); Takaharu Noguchi, Yokohama (JP); Yasunori Ohara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1191 days.

(21) Appl. No.: 10/020,989

(22) Filed: Dec. 19, 2001

(65) Prior Publication Data

US 2002/0044764 A1    Apr. 18, 2002

Related U.S. Application Data

(62) Division of application No. 09/176,773, filed on Oct. 22, 1998.

(30) Foreign Application Priority Data

Oct. 22, 1997  (JP)  ................... 09-289910
Dec. 8, 1997  (JP)  ................... 09-336796

(51) Int. Cl.
    *H04N 5/91*  (2006.01)
(52) U.S. Cl. ...................................... 386/83
(58) Field of Classification Search .............. 386/46, 386/52, 83, 92, 105, 106; 348/705, 729; 360/32, 61, 62; 369/69, 84
    See application file for complete search history.

(56) References Cited

U.S. PATENT DOCUMENTS 4,808,992 A * 2/1989 Beyers et al. .......... 340/825.24
5,001,473 A * 3/1991 Ritter et al. ........... 340/825.52
5,257,142 A   10/1993 Hong ........................... 386/46
5,390,027 A   2/1995 Henmi et al. ................ 386/65
5,488,409 A   1/1996 Yuen et al. .................... 348/5
5,506,620 A   4/1996 Ozawa ........................ 348/334
5,631,850 A * 5/1997 Tanaka et al. .............. 702/122
5,657,414 A   8/1997 Lett et al. ..................... 386/35
5,761,372 A   6/1998 Yoshinobu et al. .......... 386/83
5,815,631 A   9/1998 Sugiyama et al. ............ 386/46
5,867,224 A * 2/1999 Suh ............................ 348/553
5,973,748 A   10/1999 Horiguchi et al. .......... 348/554
5,977,964 A   11/1999 Williams et al. ............. 345/27

(Continued)

FOREIGN PATENT DOCUMENTS

EP       0 756 276 A1    1/1997

(Continued)

*Primary Examiner*—Thai Q. Tran
*Assistant Examiner*—Mishawn Dunn
(74) *Attorney, Agent, or Firm*—Antonelli, Terry, Stout and Kraus, LLP.

(57) ABSTRACT

A plurality of devices and a device system are disclosed, in which a plurality of input devices generate an input AV signal, a related device records and reproduces the AV signal, and a display device displays the AV signal. The input devices, the related device and the display device are interconnected to configure an AV system having a bus for transmitting or receiving the AV signal and management information. The related device of the AV system includes a recording medium for recording the AV signal, and the input devices transmit to the related device a request to secure a recording area on the recording medium.

21 Claims, 70 Drawing Sheets

U.S. PATENT DOCUMENTS

| | | | |
|---|---|---|---|
| 6,035,091 A | 3/2000 | Kazo | 386/46 |
| 6,085,019 A | 7/2000 | Ito et al. | 386/52 |
| 6,212,327 B1 | 4/2001 | Berstis et al. | 386/83 |
| 7,017,171 B1 * | 3/2006 | Horlander et al. | 725/25 |

FOREIGN PATENT DOCUMENTS

| | | |
|---|---|---|
| EP | 0756276 | 1/1997 |
| JP | 04-353689 | 12/1992 |
| JP | 07-147063 | 6/1995 |
| JP | 08-056352 | 2/1996 |
| JP | 8-124242 | 5/1996 |
| JP | 08-227544 | 9/1996 |
| JP | 09-102827 | 4/1997 |
| JP | 09-120666 | 5/1997 |
| JP | 09-172595 | 6/1997 |
| JP | 09-270965 | 10/1997 |
| WO | 97/36422 | 3/1997 |
| WO | WO 97/36422 | 10/1997 |

* cited by examiner

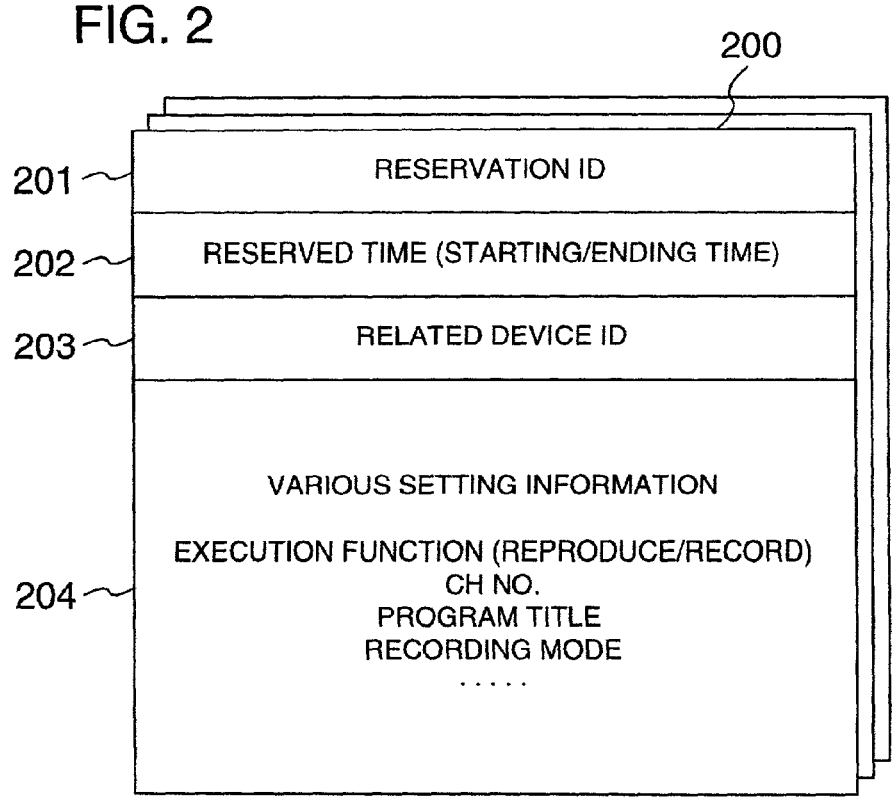
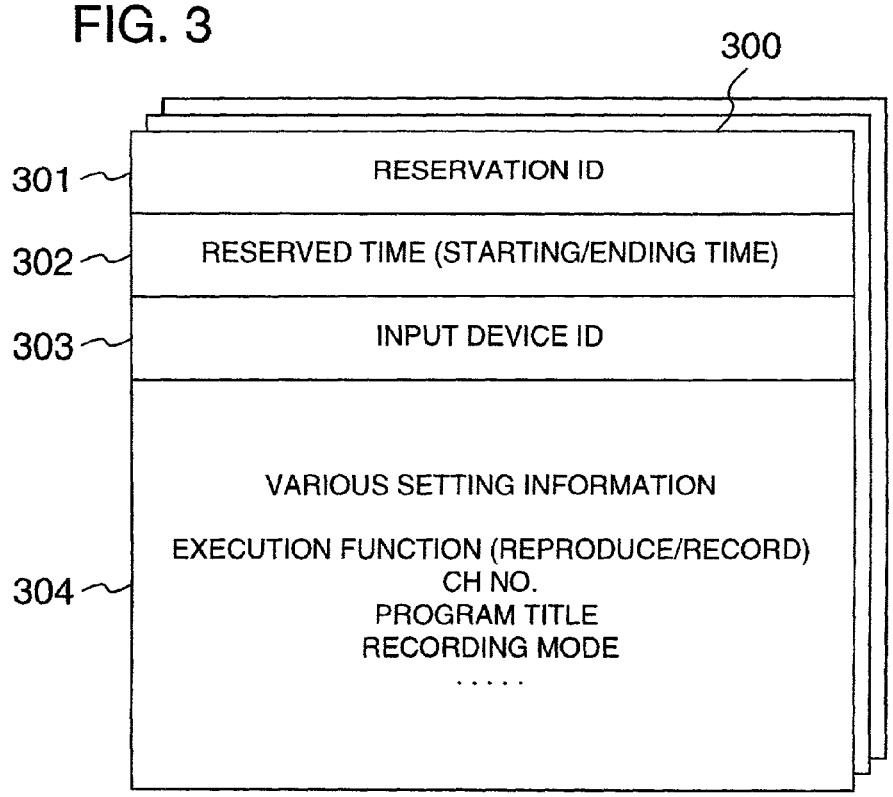

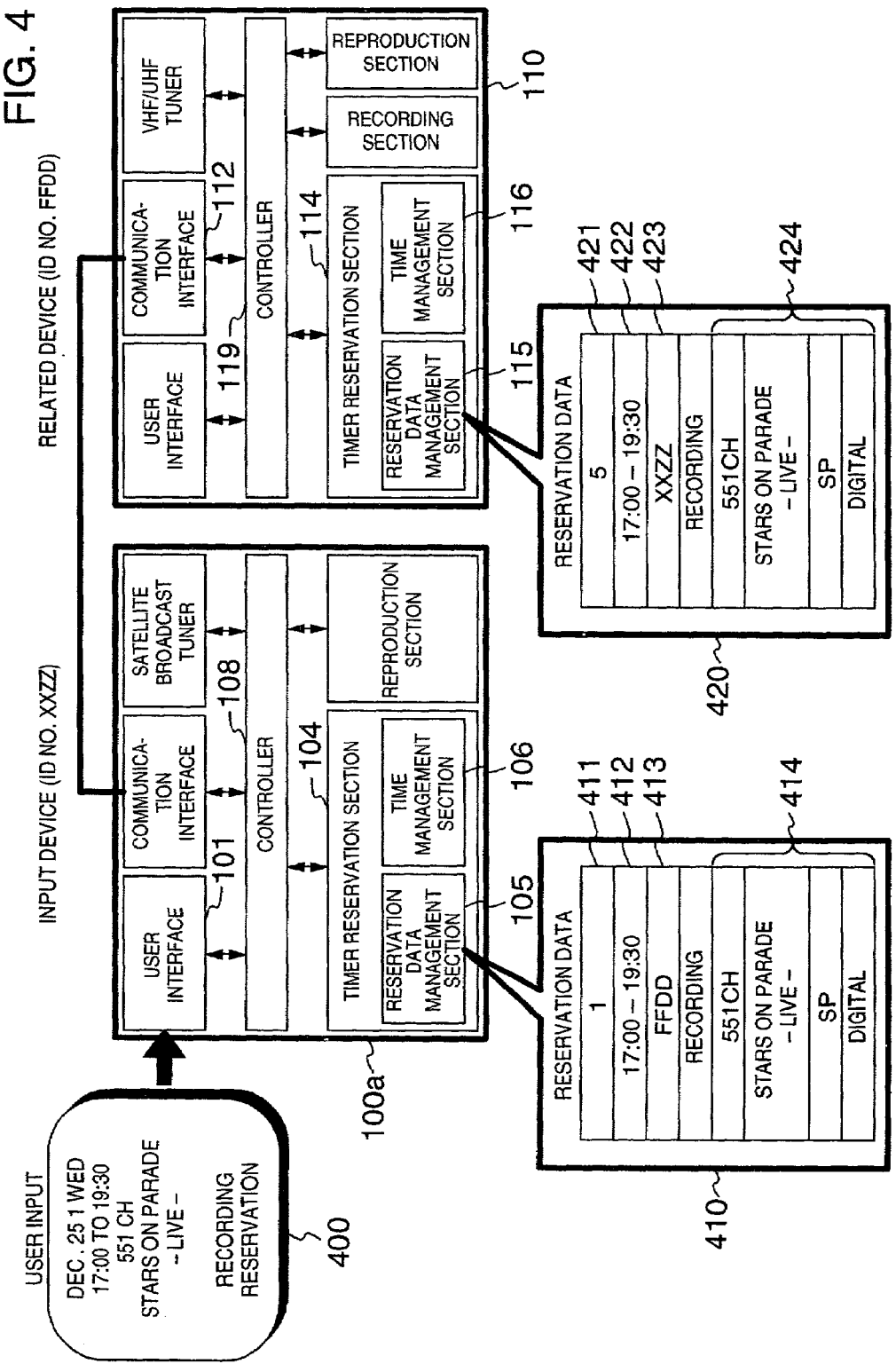

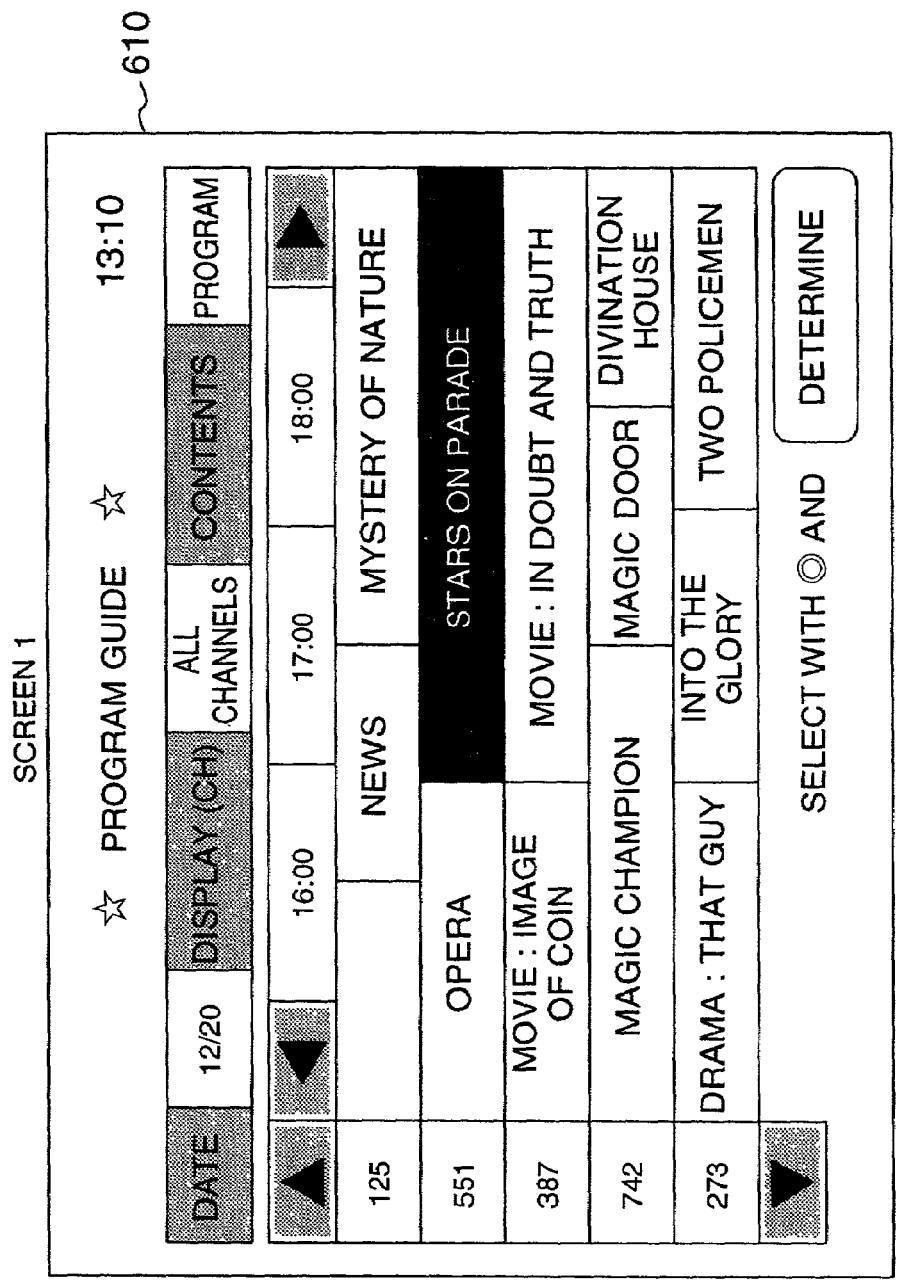

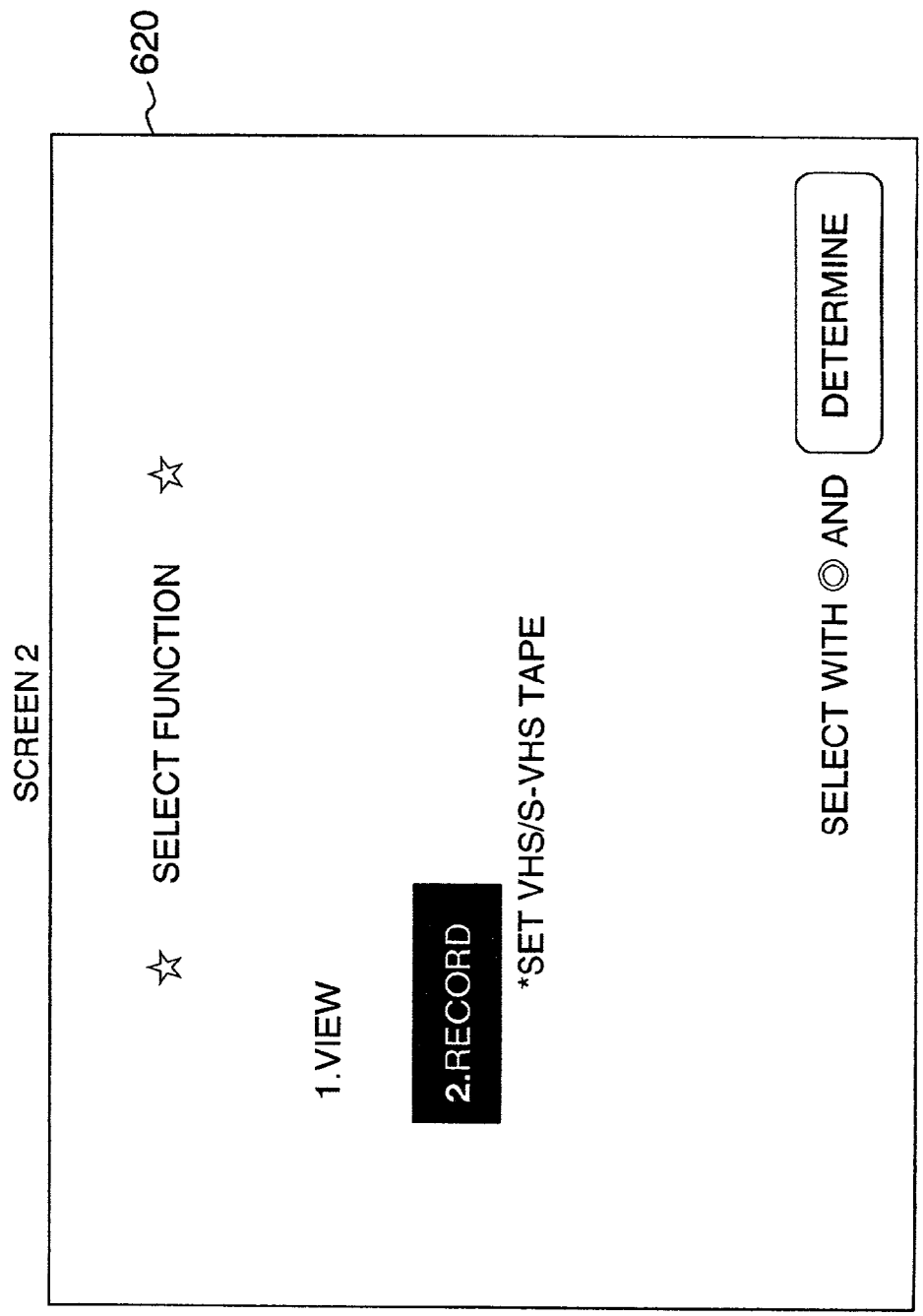

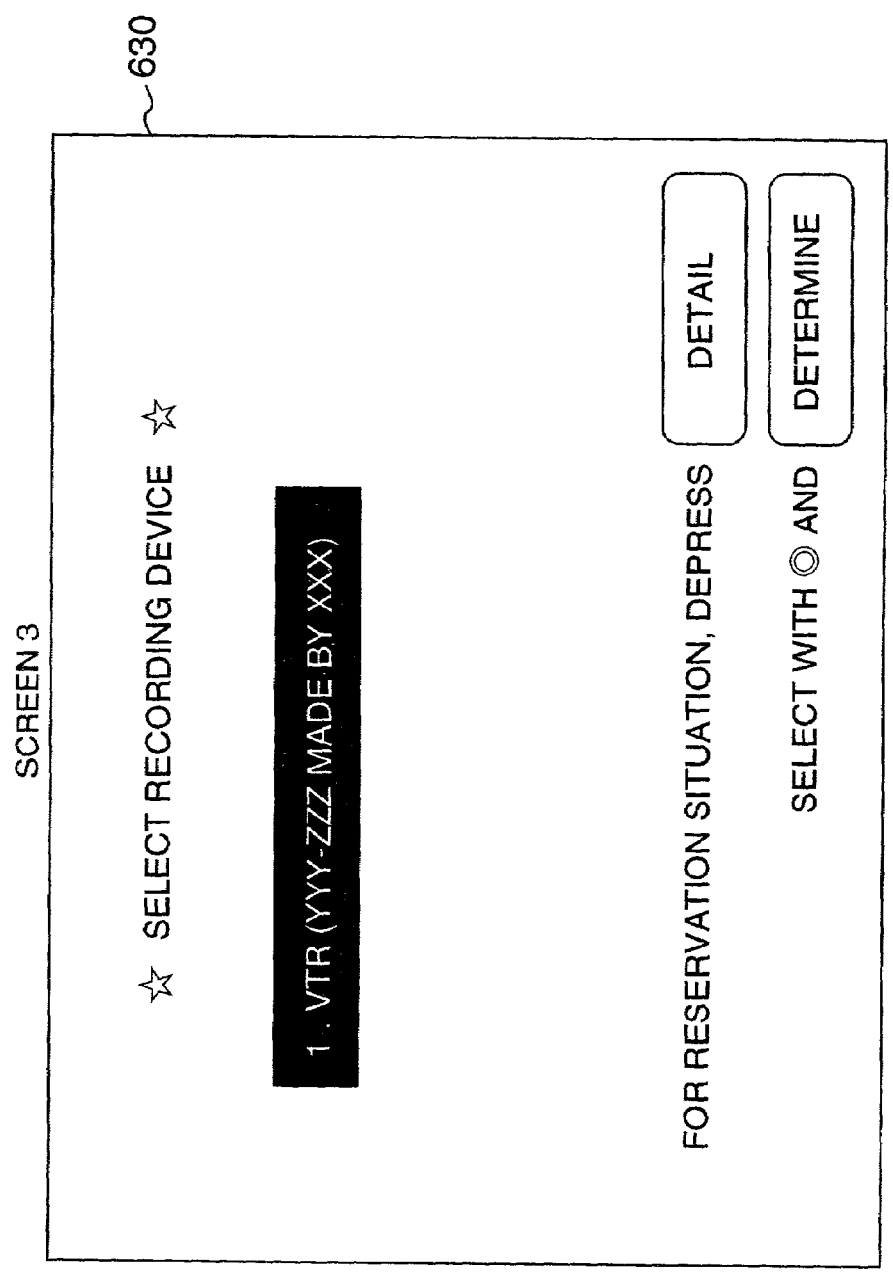

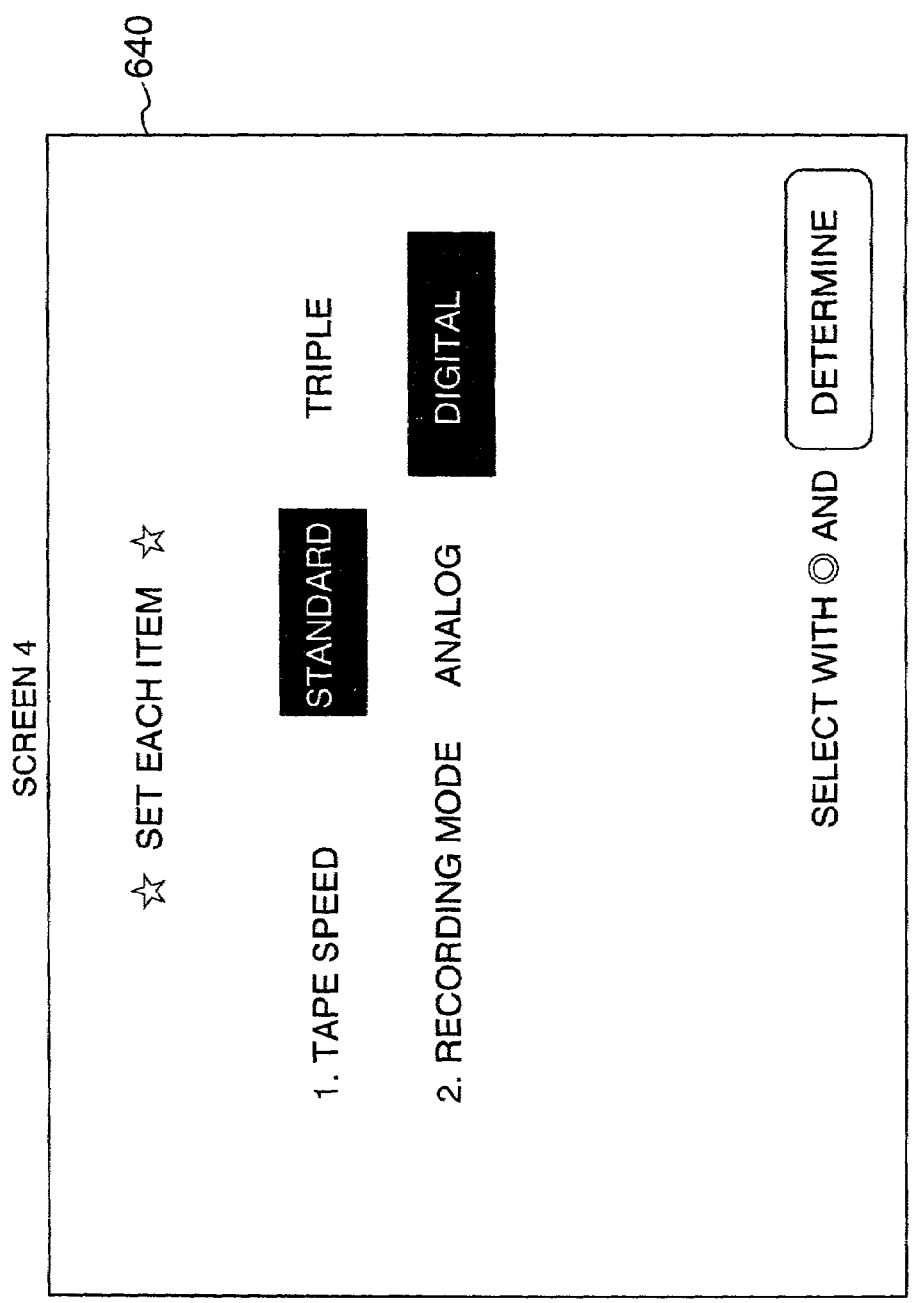

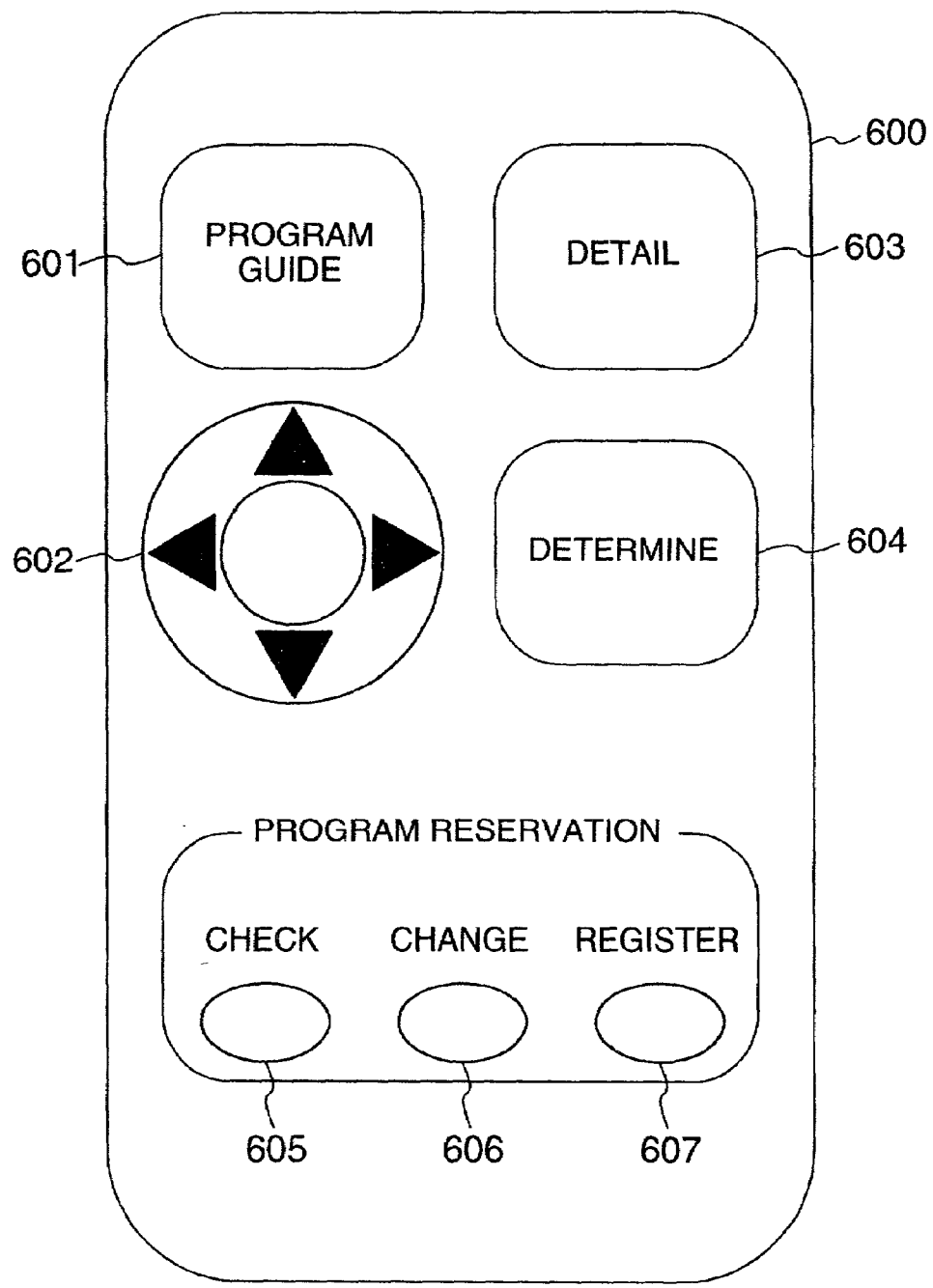

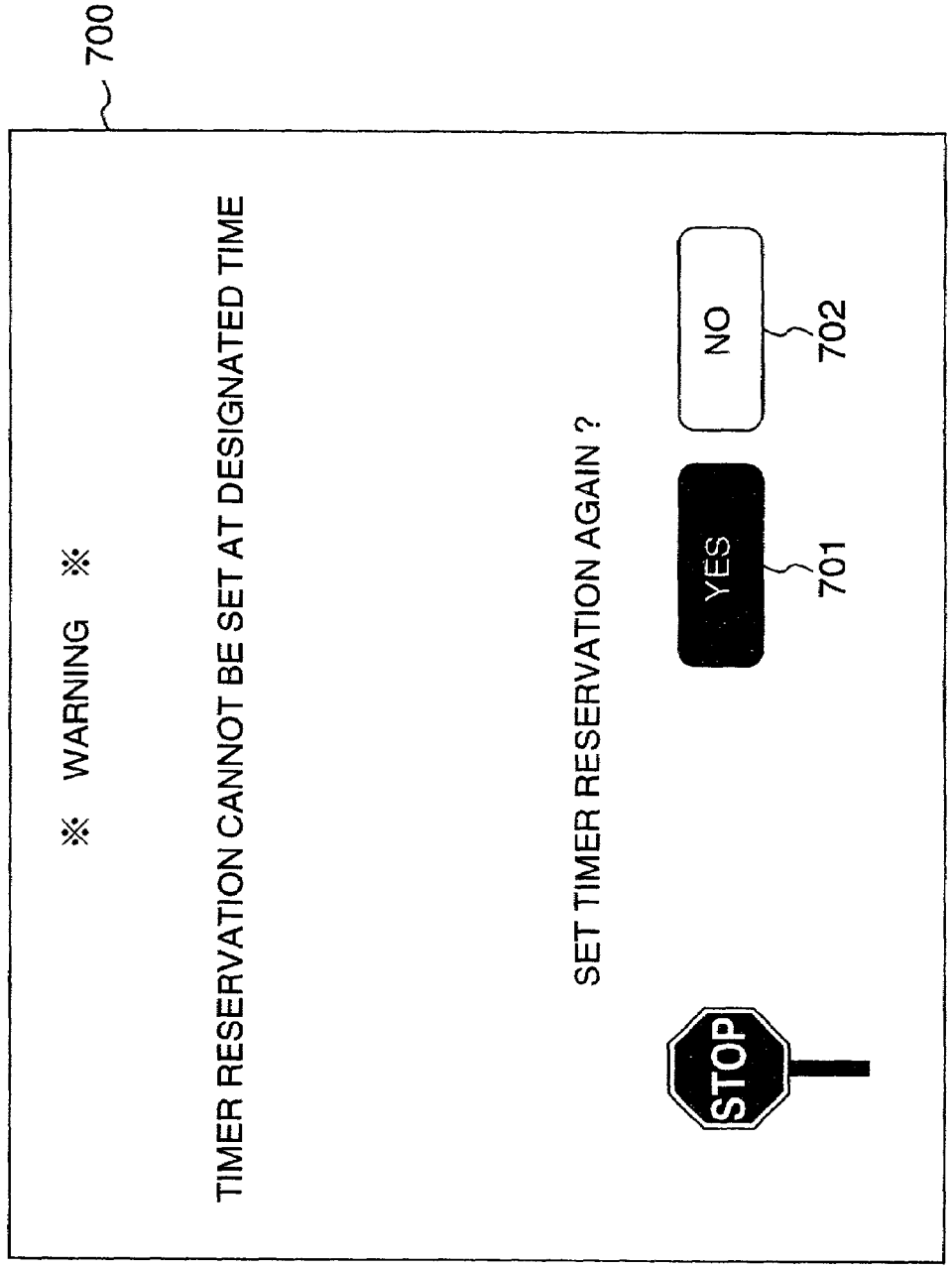

FIG. 8

☆ RECORDING DEVICE RESERVATION LIST ☆

| No. | RECORD DATE | START | CH |
|---|---|---|---|
| 1 | DEC 20 FRI | 08:30 PM | 4 |
| 2 | DEC 22 SUN | 10:00 AM | 3 |
| 3 | EVERY WEEK SUN | 08:00 AM | 1 |
| 4 | EVERY DAY MON THRU FRI | 11:30 AM | 12 |

AFTER CHECK, [ DETERMINE ]

800

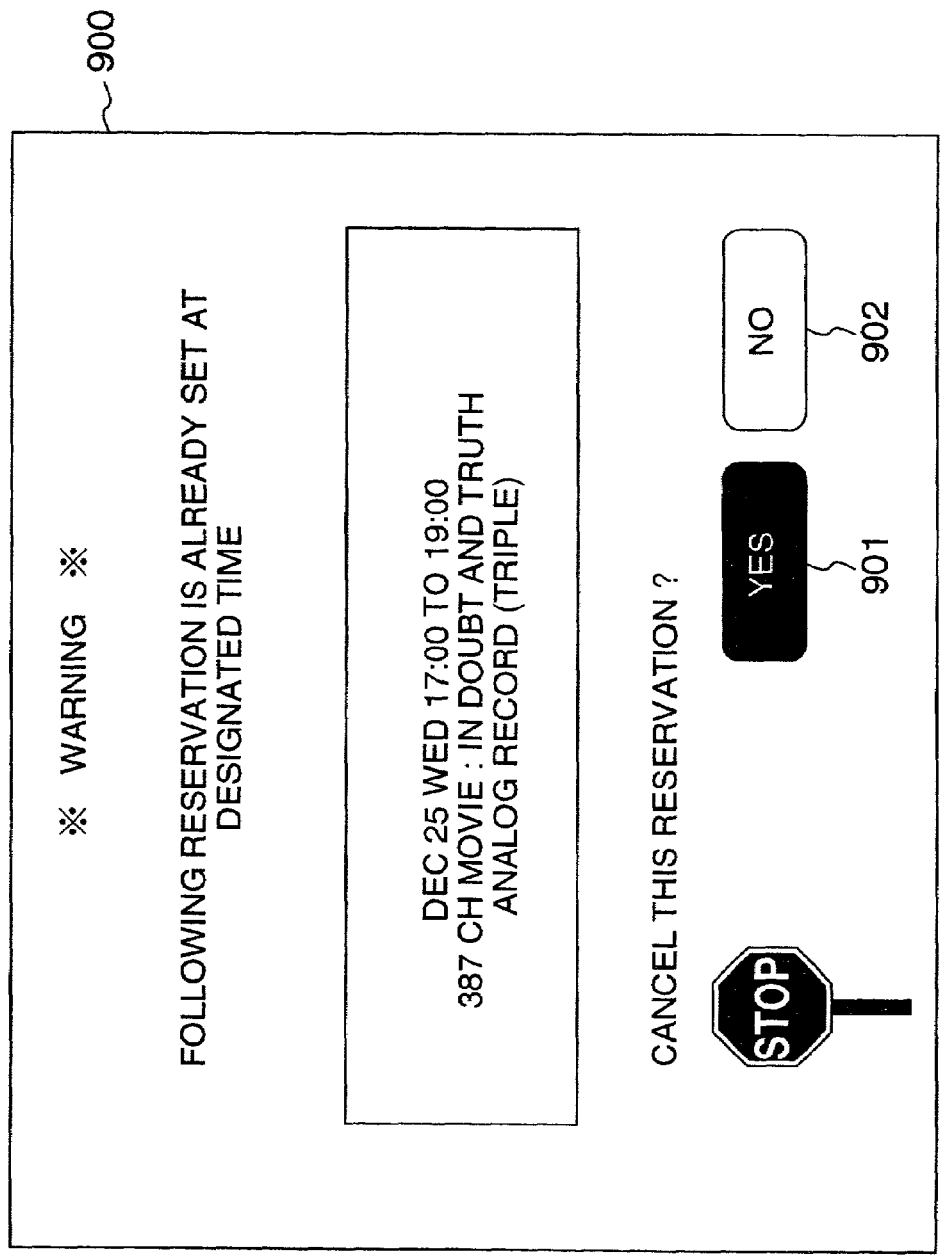

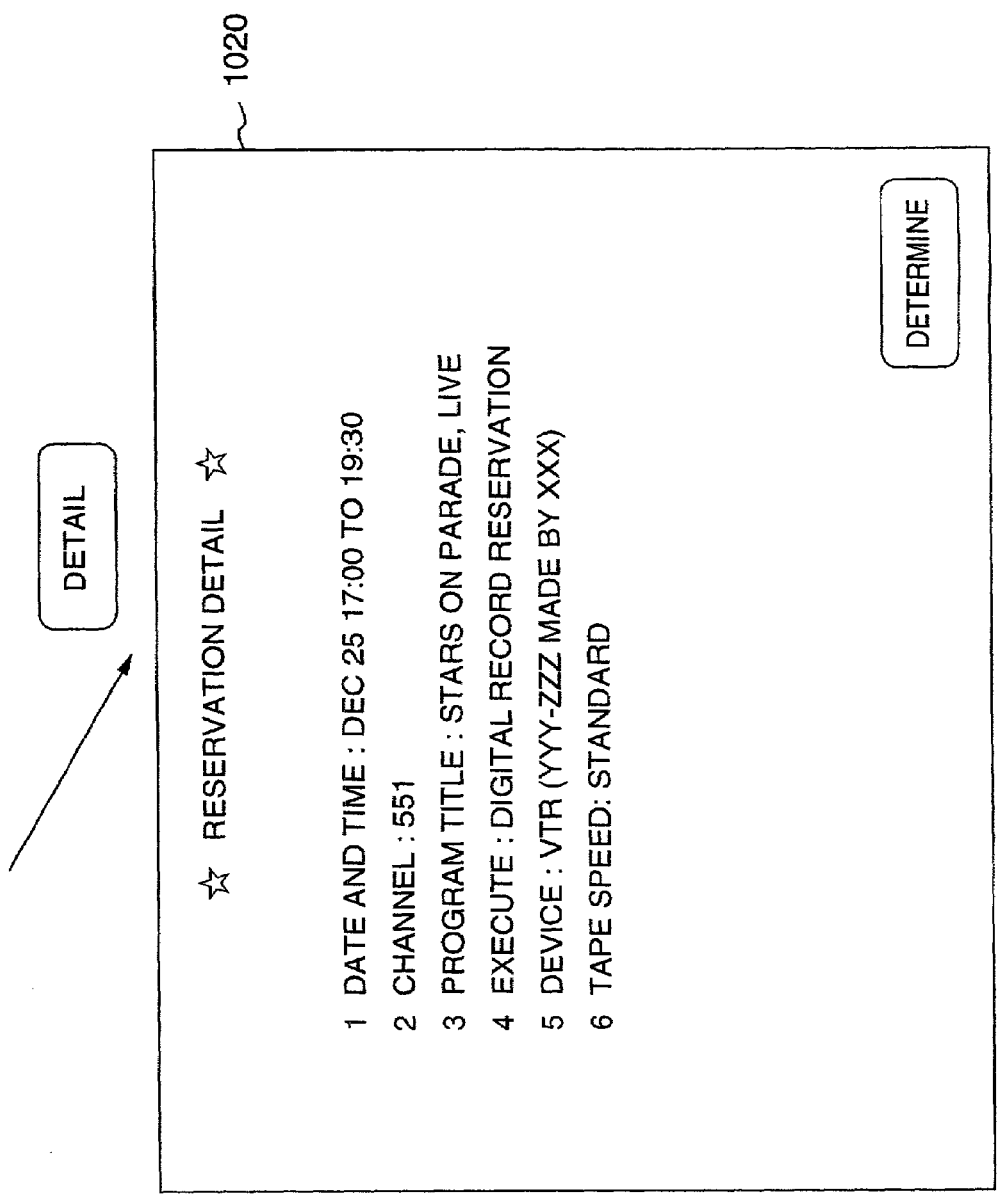

FIG. 11

CHECK/CHANGE RESERVATION

| No. | RECORD DATE | START | CH |
|---|---|---|---|
| 1 | DEC 20 FRI | 08:30 PM | 4 |
| 2 | DEC 22 SUN | 10:00 AM | 3 |
| 3 | EVERY WEEK SUN | 08:00 PM | 1 |
| 4 | EVERY DAY MON THRU FRI | 11:30 AM | 12 |
| 5 | DEC 25 WED | 05:00 PM | 551 |

★ ~ 1110

END

~ 1100

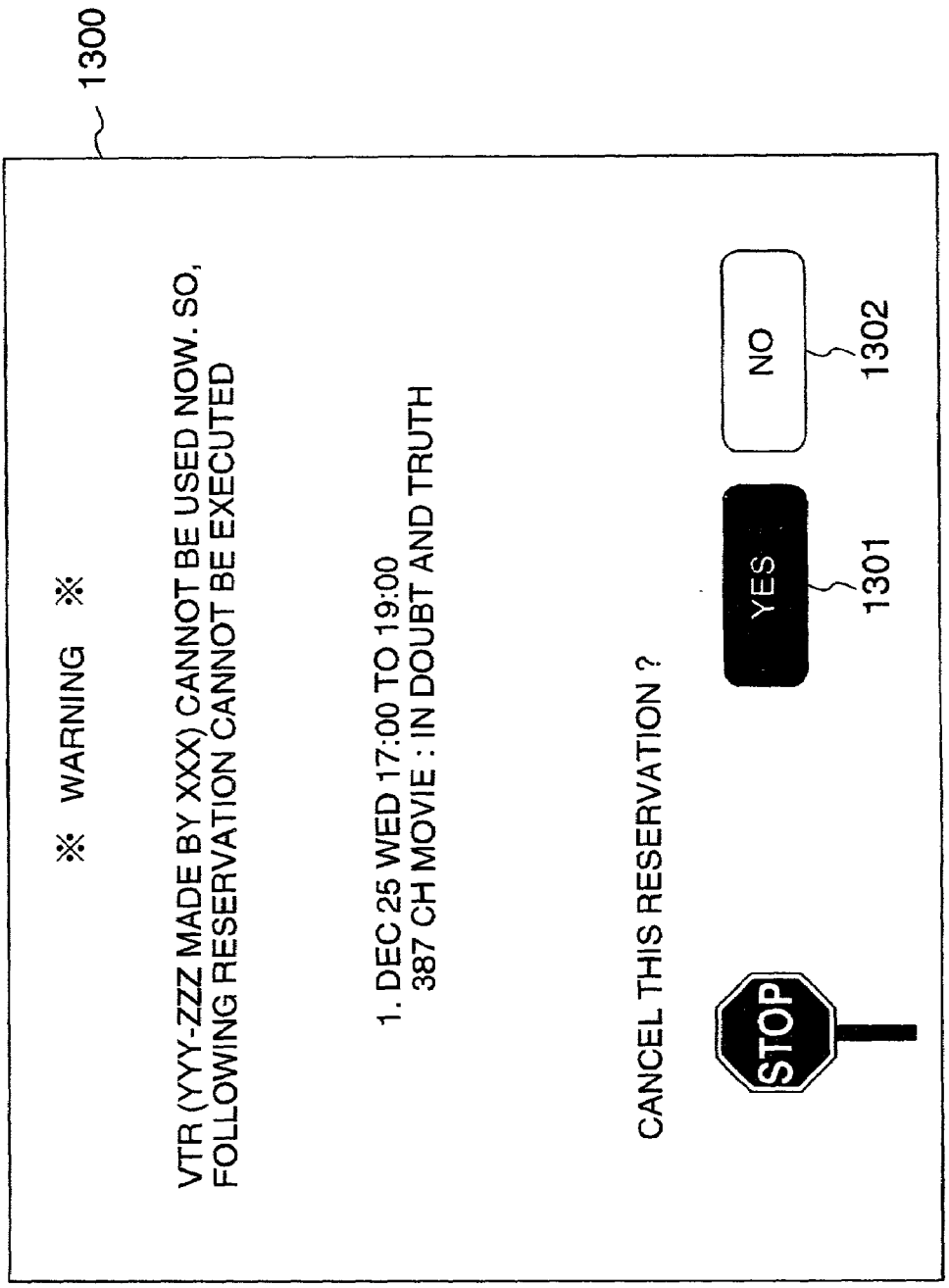

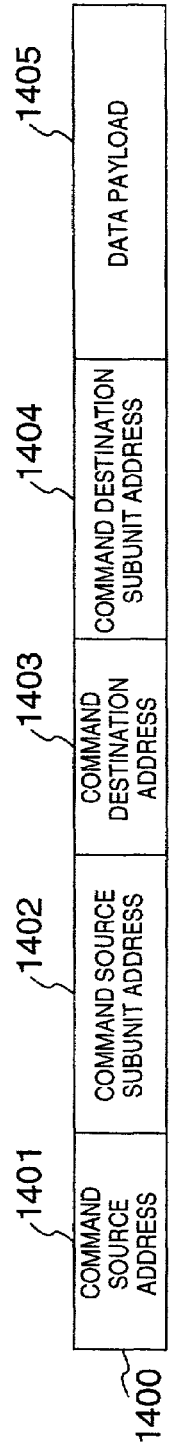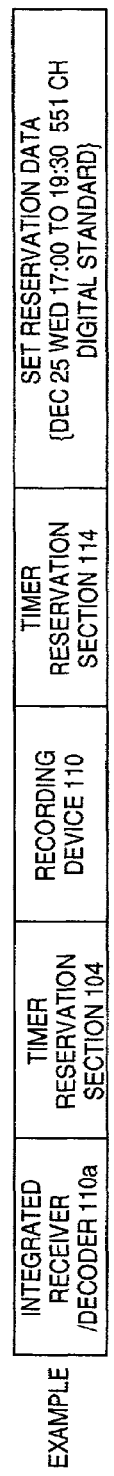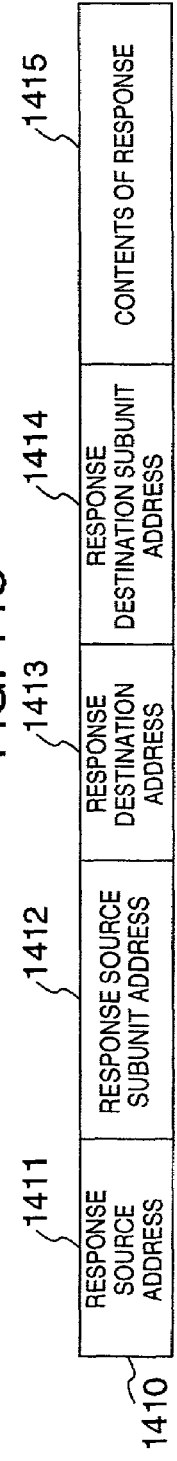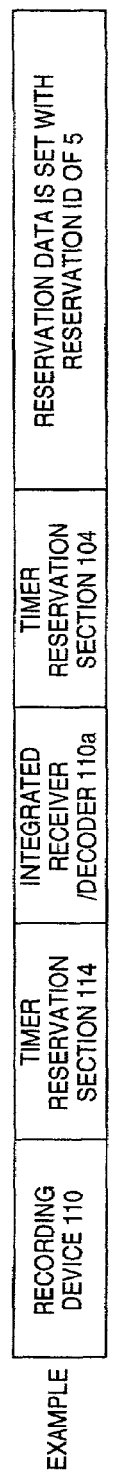

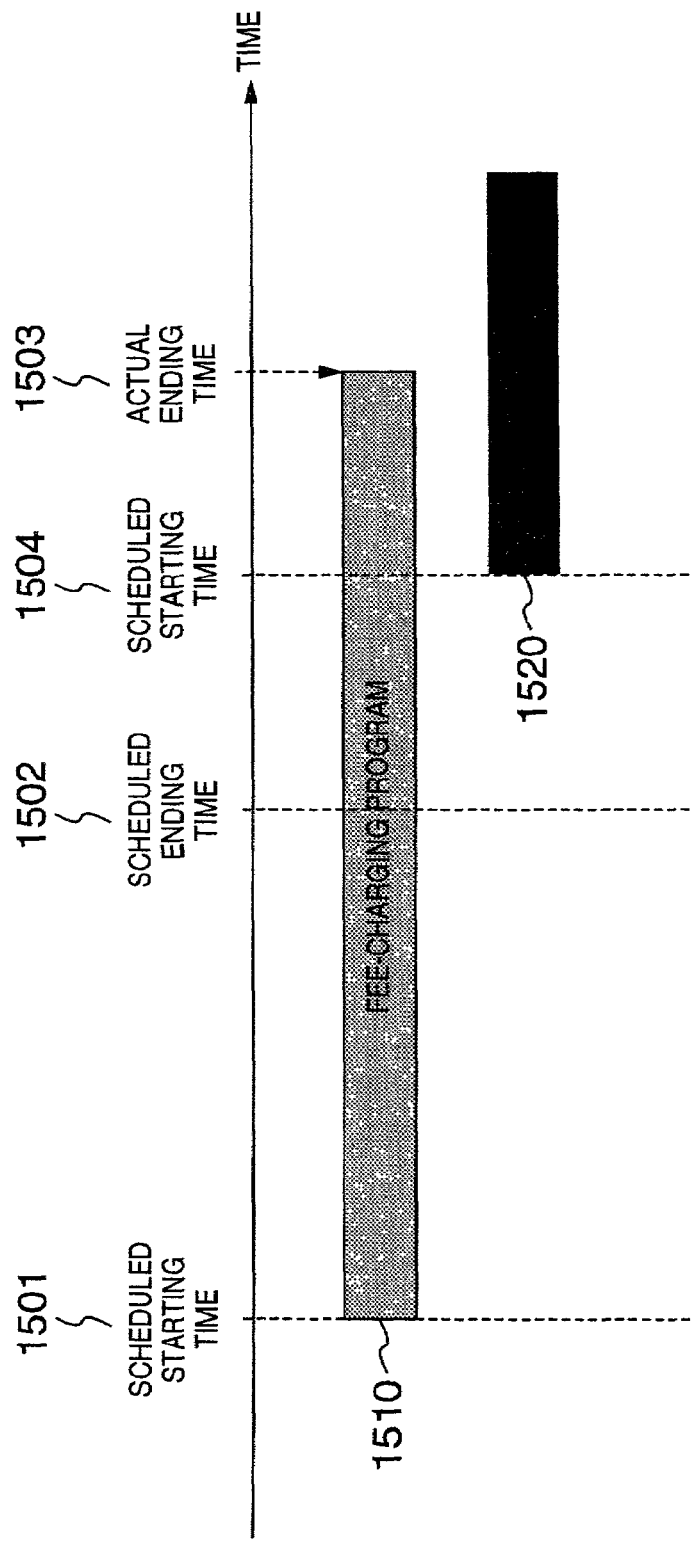

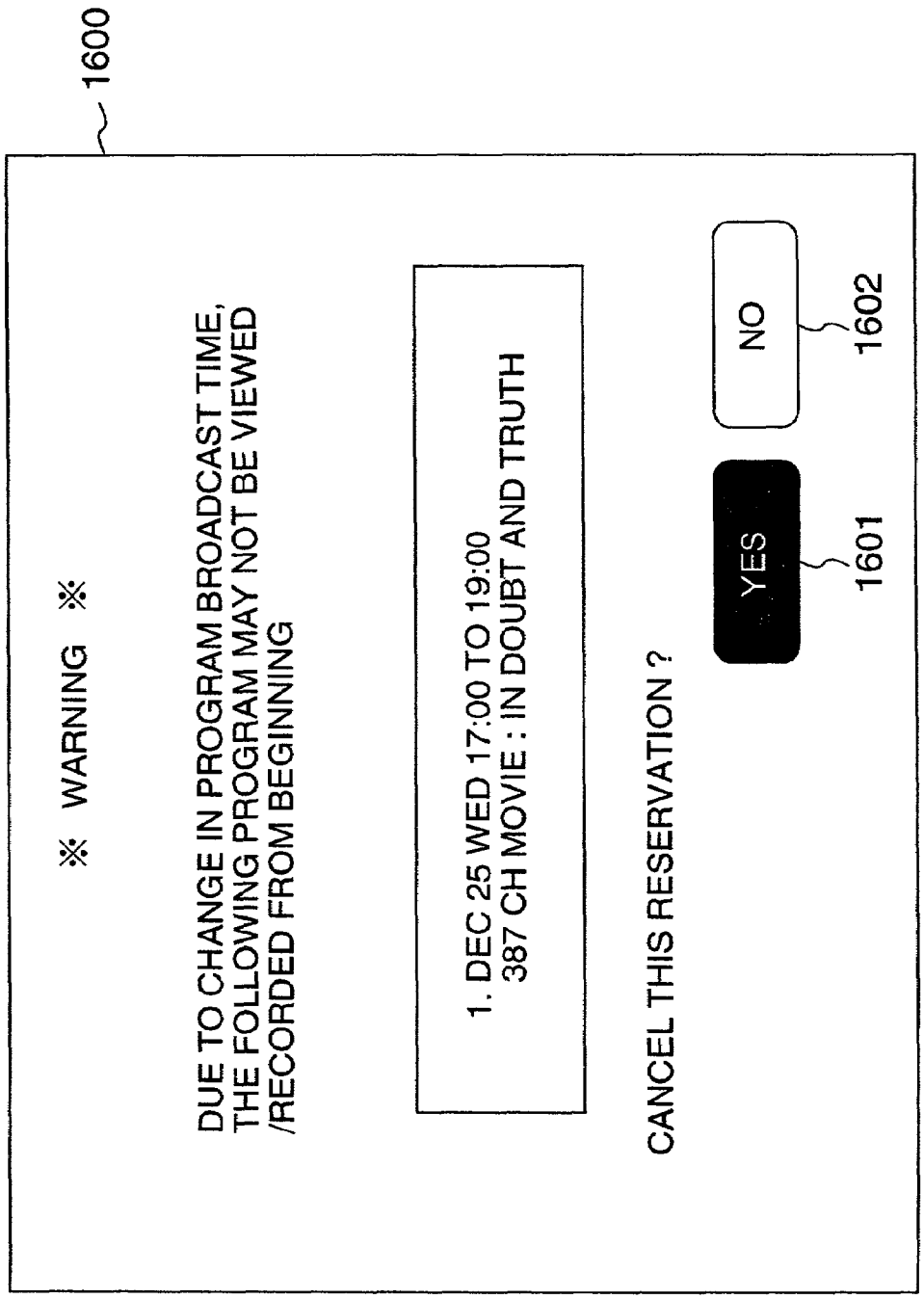

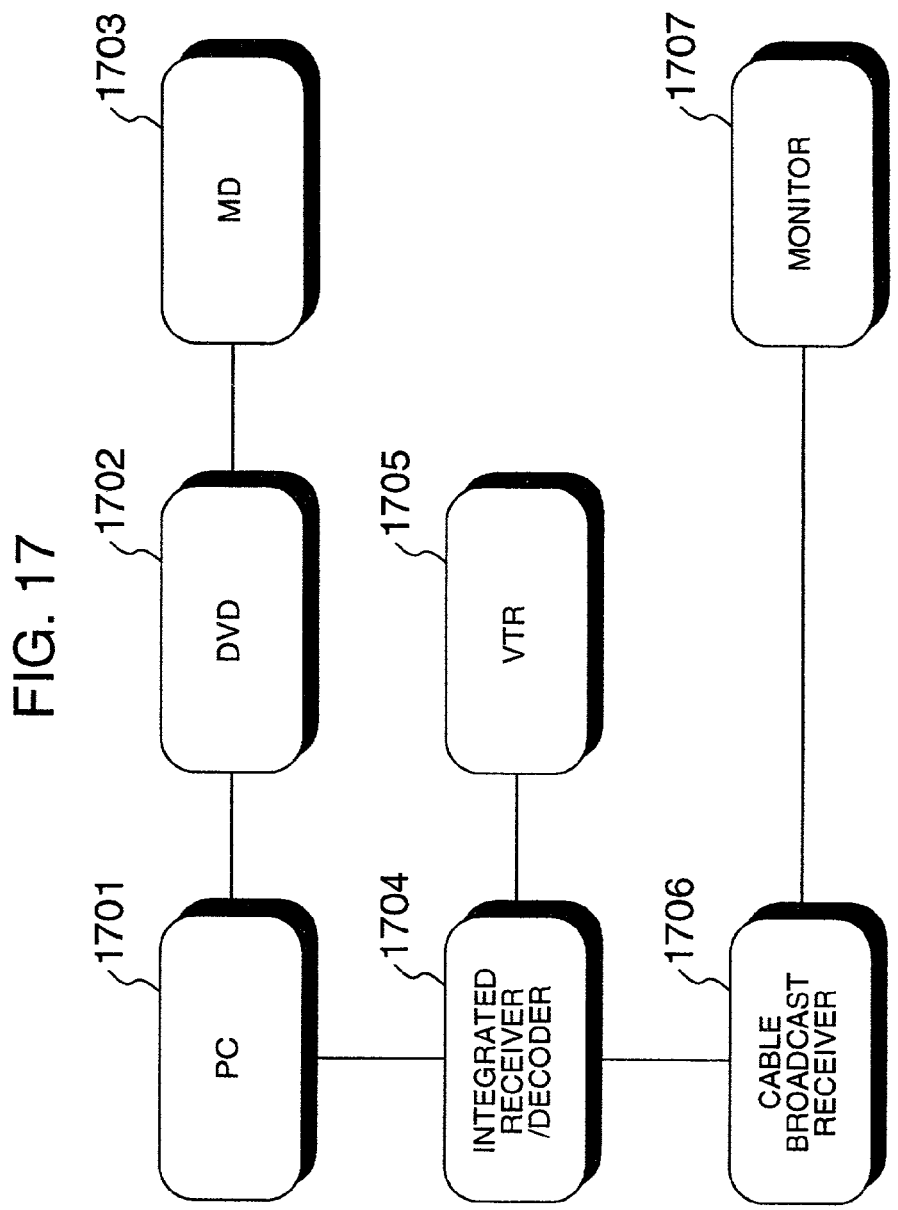

FIG. 18

☆ RESERVED PROGRAM LIST ☆ — 1800

| No. | DATE | RESERVED TIME | CH | PROGRAM TITLE | EXECUTION |
|---|---|---|---|---|---|
| 1 | 12/25 | 17:00~19:30 | 551 | STARS ON PARADE | RECORD (VTR) |
| 2 | 12/25 | 17:00~19:30 | 387 | IN DOUBT AND TRUTH | RECORD (DVD) |
| 3 | 12/28 | 20:00~22:00 | 125 | THIS YEAR'S TOPICS | RECORD (VTR) |
| 4 | 12/31 | 19:00~21:00 | 551 | POPULAR SONGS '96 | RECORD (MD) |
| 5 | 1/1 | 10:00~12:30 | 387 | MYSTERY OF SHOGUN FAMILY | RECORD (VTR) |
| 6 | 1/2 | 18:00~22:00 | 742 | STUNTS | |

1801

FOR RESERVATION CHANGE, DEPRESS [CHANGE]

FOR RESERVATION DETAIL, DEPRESS [DETAIL]

FOR ENDING, [CHECK]

FIG. 19

《 RECORD RESERVATION LIST 》 — 1900

| No. | DATE | RESERVED TIME | DATA SOURCE — 1901 |
|---|---|---|---|
| 1 | 12/22 | 13:00~14:30 | INTEGRATED RECEIVER/DECODER |
| 2 | 12/24 | 10:00~11:00 | VTR |
| 3 | 12/30 | 20:00~21:00 | PC |
| 4 | 1/1 | 19:00~21:00 | CABLE BROADCAST RECEIVER |
| 5 | 1/2 | 21:00~23:30 | INTEGRATED RECEIVER/DECODER |

DETAIL    END

*DvD!*

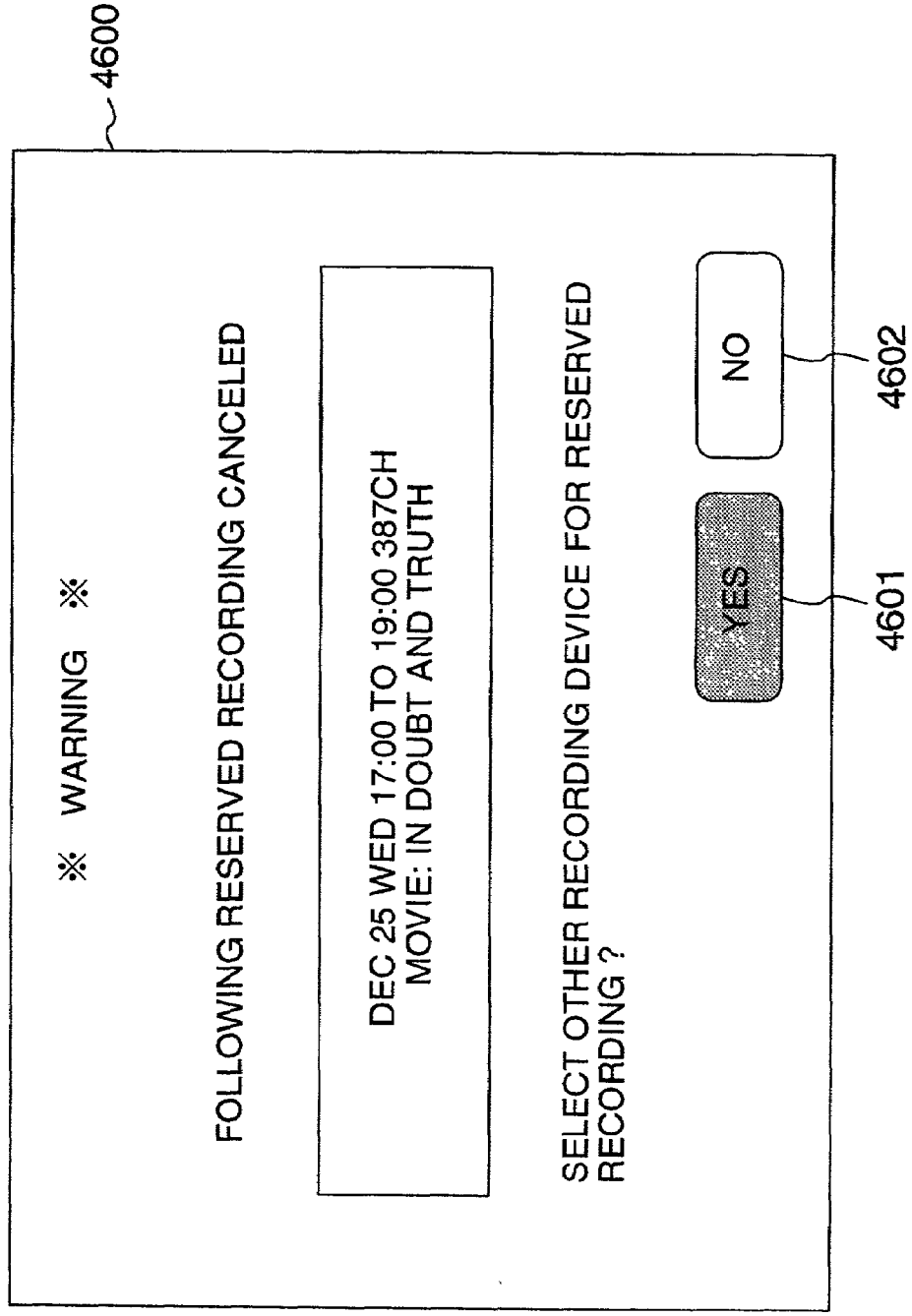

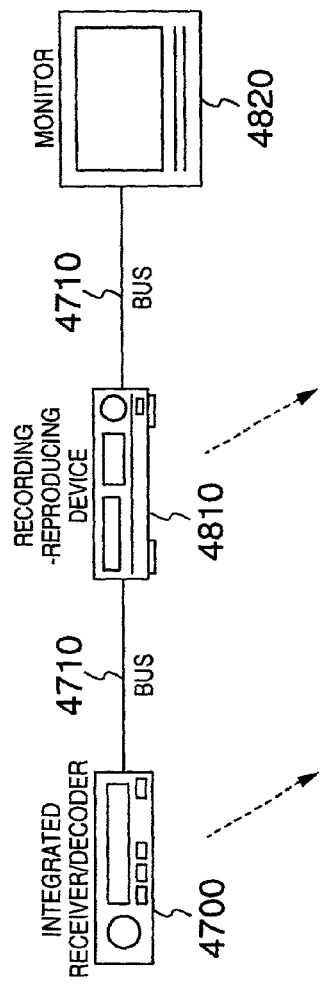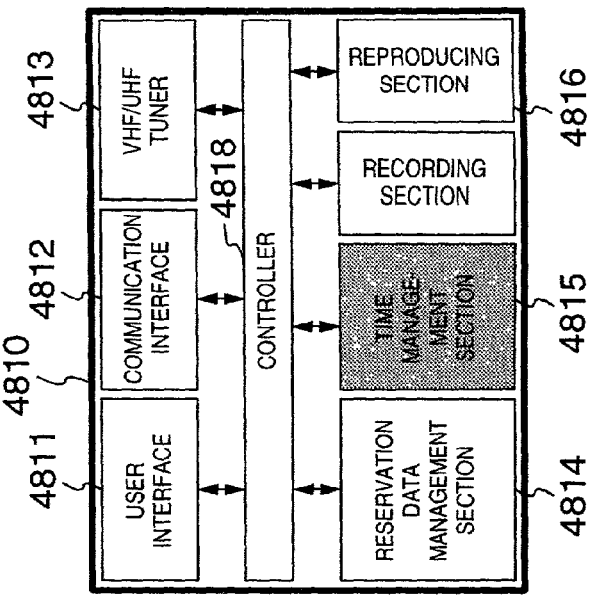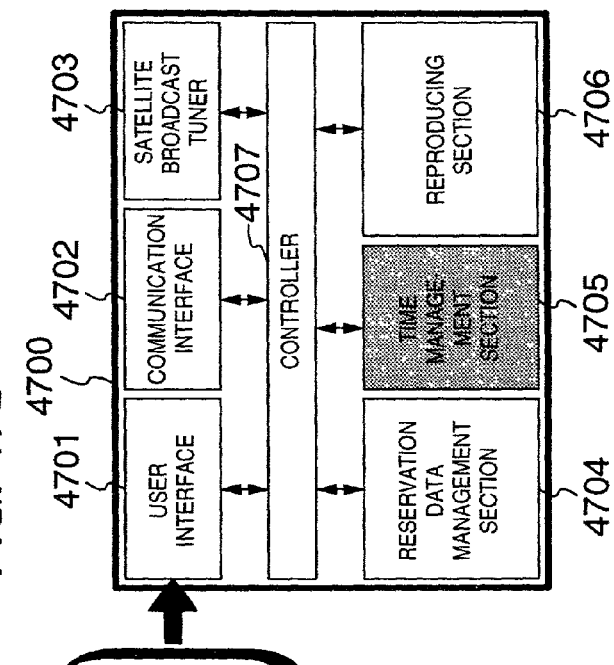

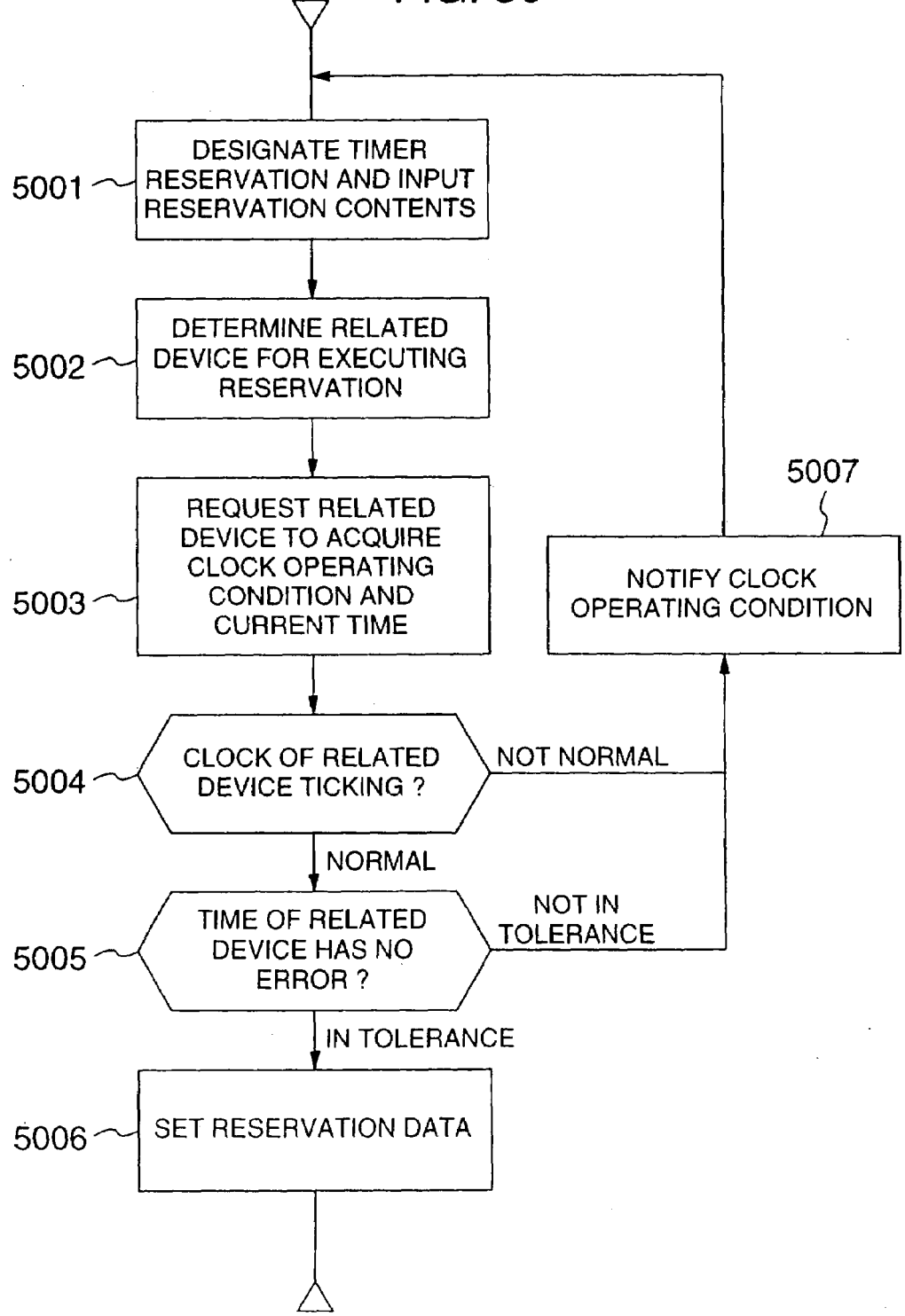

FIG. 51A

SCREEN 1

~5110

☆ PROGRAM GUIDE ☆     13:10

| DATE | DISPLAY (CH) | ALL CHANNELS | CONTENTS | PROGRAM |
|---|---|---|---|---|
| 12/20 | | | | |

| | 16:00 | 17:00 | 18:00 |
|---|---|---|---|
| 125 | NEWS | MYSTERY OF NATURE | |
| 551 | OPERA | STARS ON PARADE | |
| 387 | MOVIE : IMAGE OF COIN | MOVIE : IN DOUBT AND TRUTH | |
| 742 | MAGIC CHAMPION | MAGIC DOOR | DIVINATION HOUSE |
| 273 | DRAMA : THAT GUY | INTO THE GLORY | TWO POLICEMEN |

SELECT WITH ⊚ AND [ DETERMINE ]

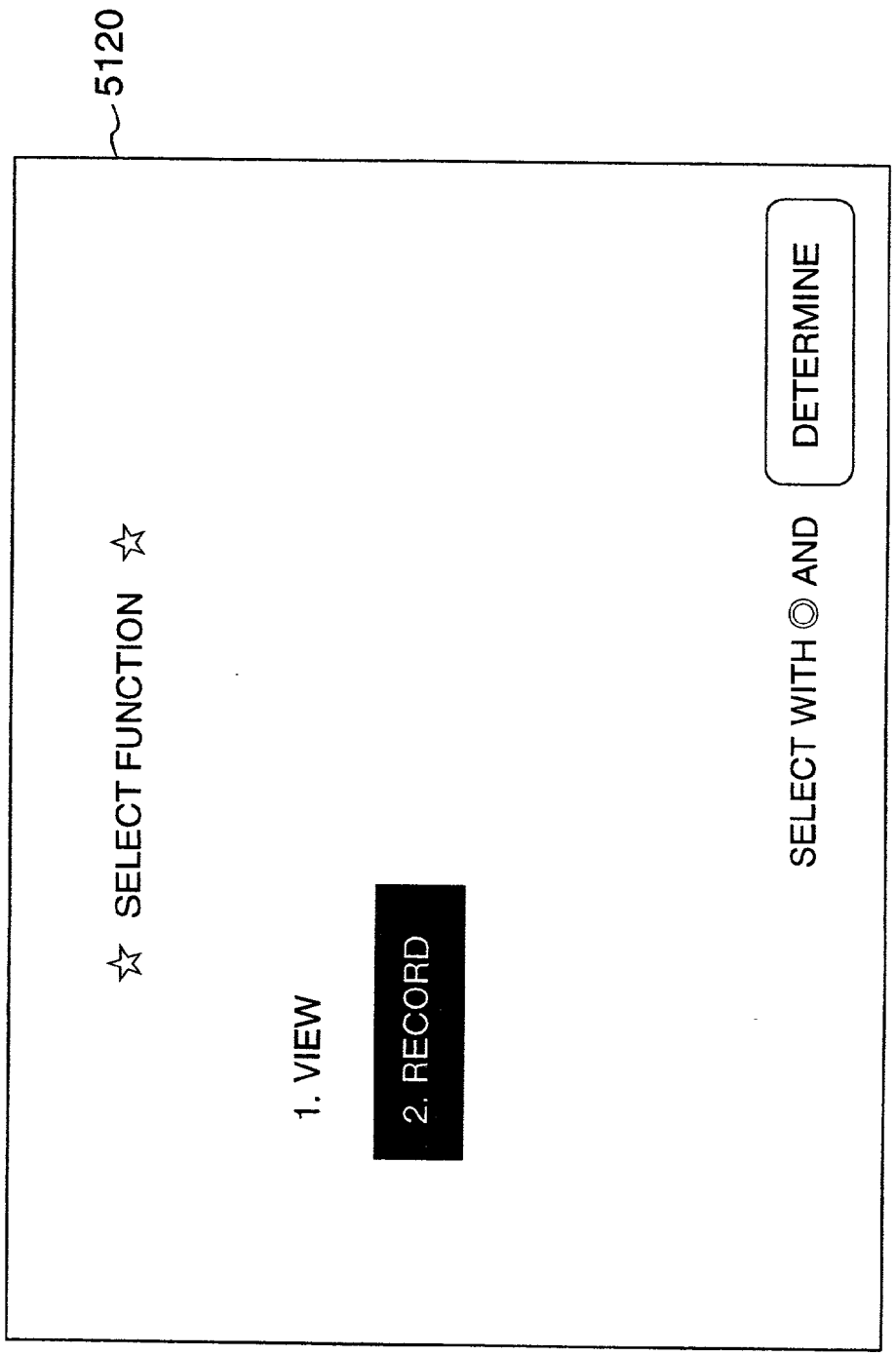

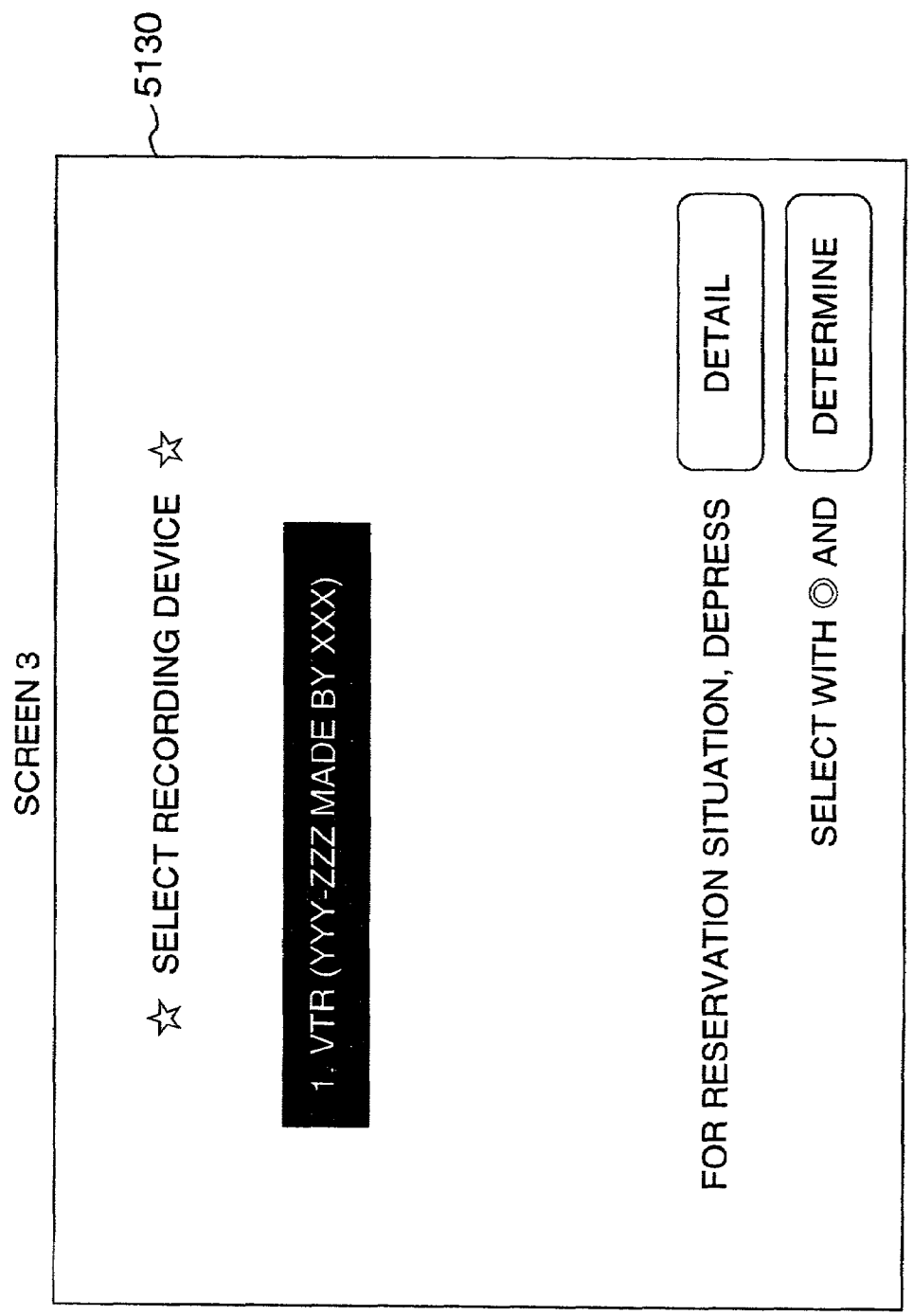

FIG. 51D

SCREEN 4

☆ SET EACH ITEM ☆

1. TAPE SPEED  STANDARD  TRIPLE

2. RECORDING MODE  ANALOG  DIGITAL

SELECT WITH ◎ AND  DETERMINE

5140

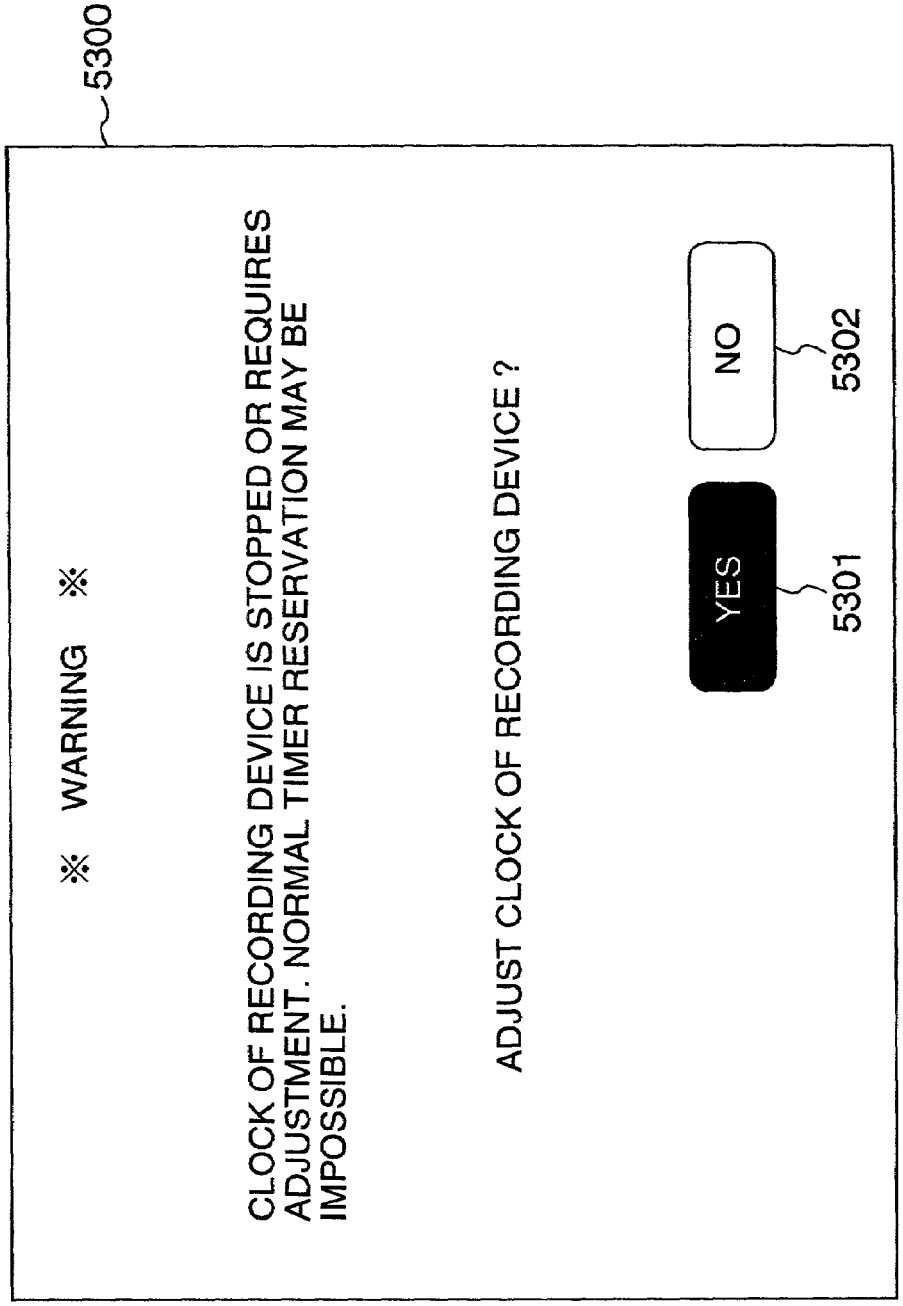

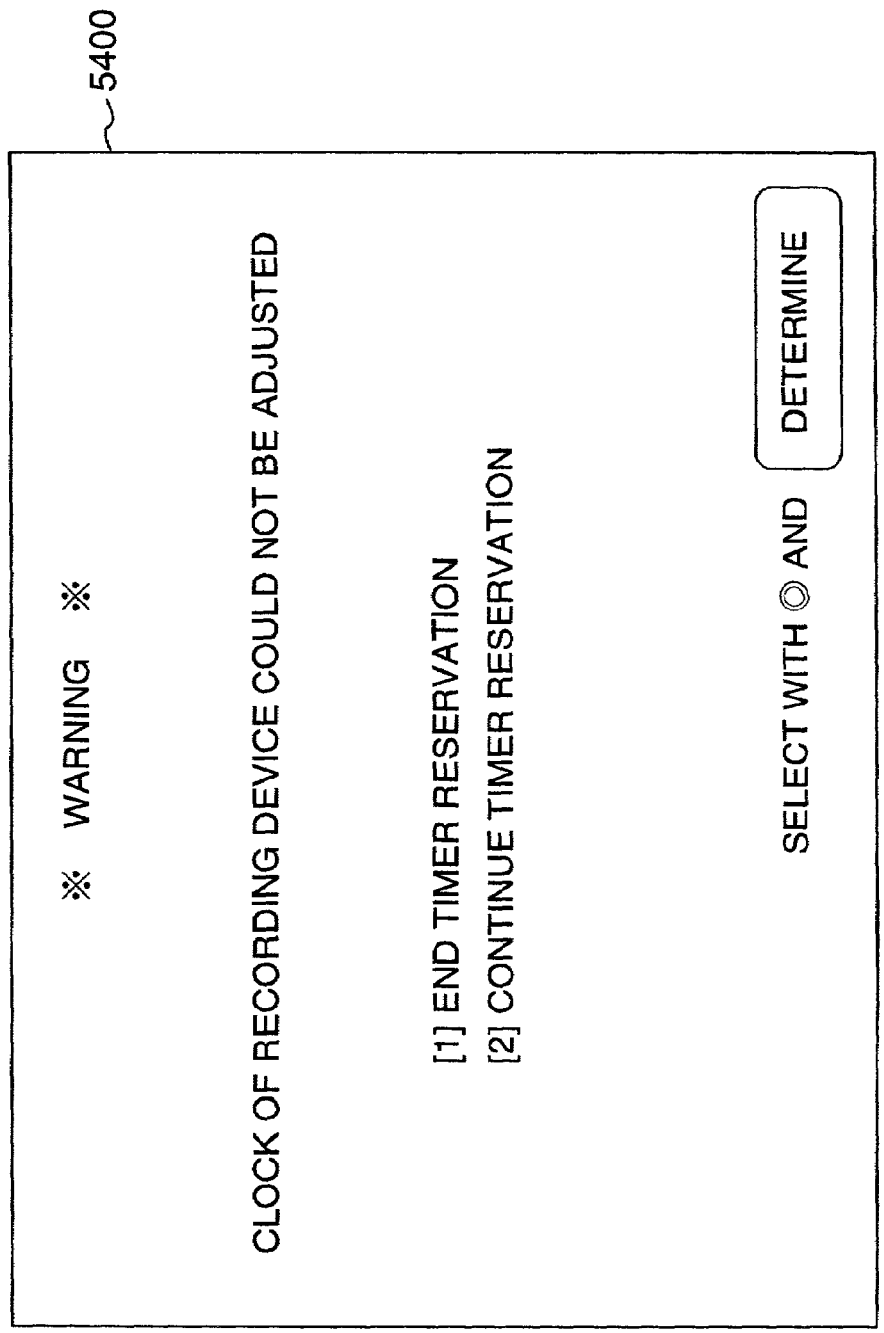

| CURRENT TIME | ~5501 |
| STATUS | ~5502 |
| MASTER TIME ACQUISITION FUNCTION | ~5503 |
| ACCESS RIGHT | ~5510 |

FIG. 55B

| MAY 27 1997, 16:15 |
| TICKING |
| NOT AVAILABLE |
| ACCESS RIGHT |

| CURRENT TIME | ~4901 |
| STATUS | ~4902 |
| MASTER TIME ACQUISITION FUNCTION | ~4903 |
| TIME ACQUISITION DEVICE DATA | ~5610 |

FIG. 56B

| MAY 27 1997, 16:15 |
| TICKING |
| NOT AVAILABLE |
| △△ INTEGRATED RECEIVER /DECODER |

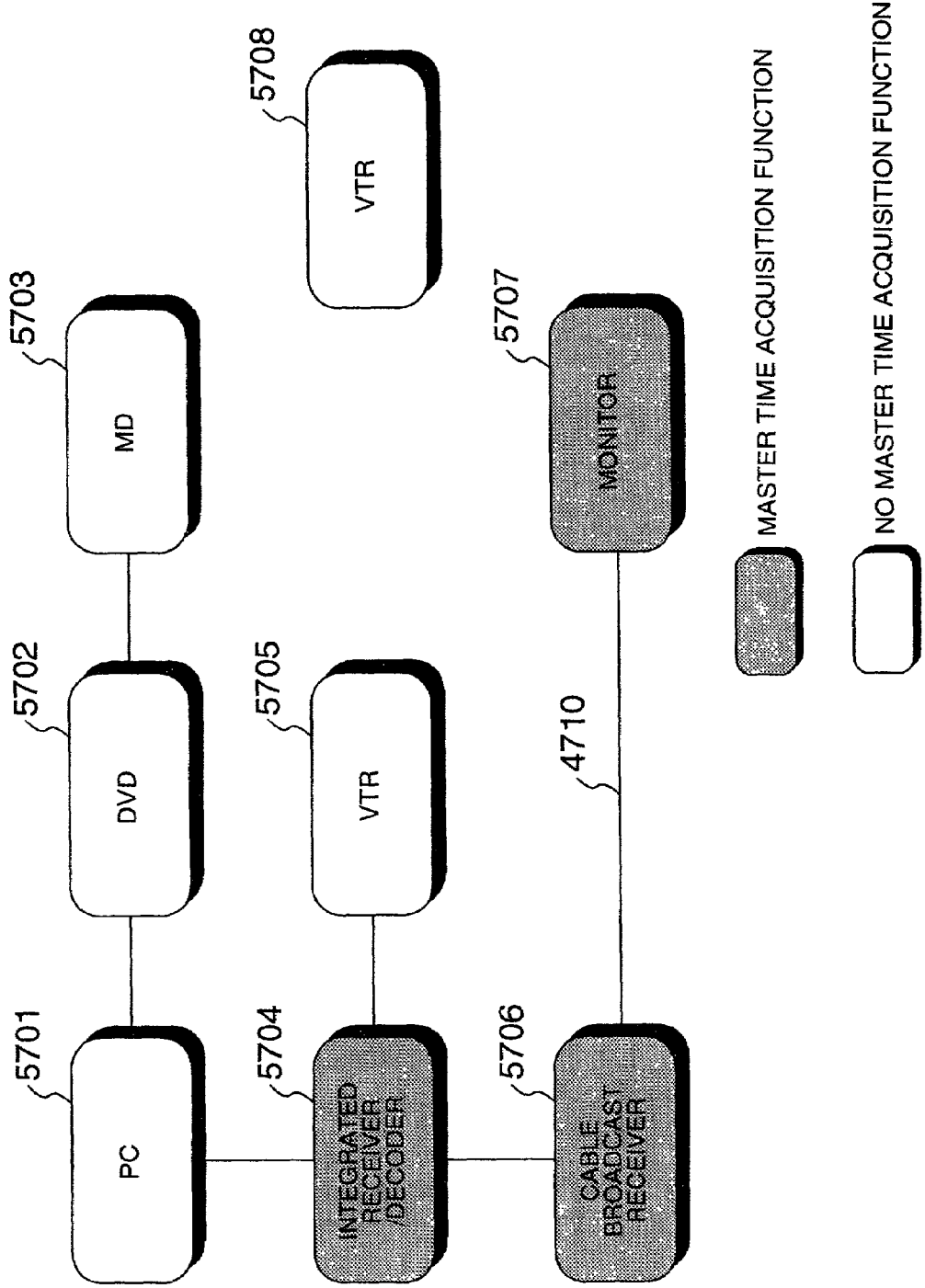

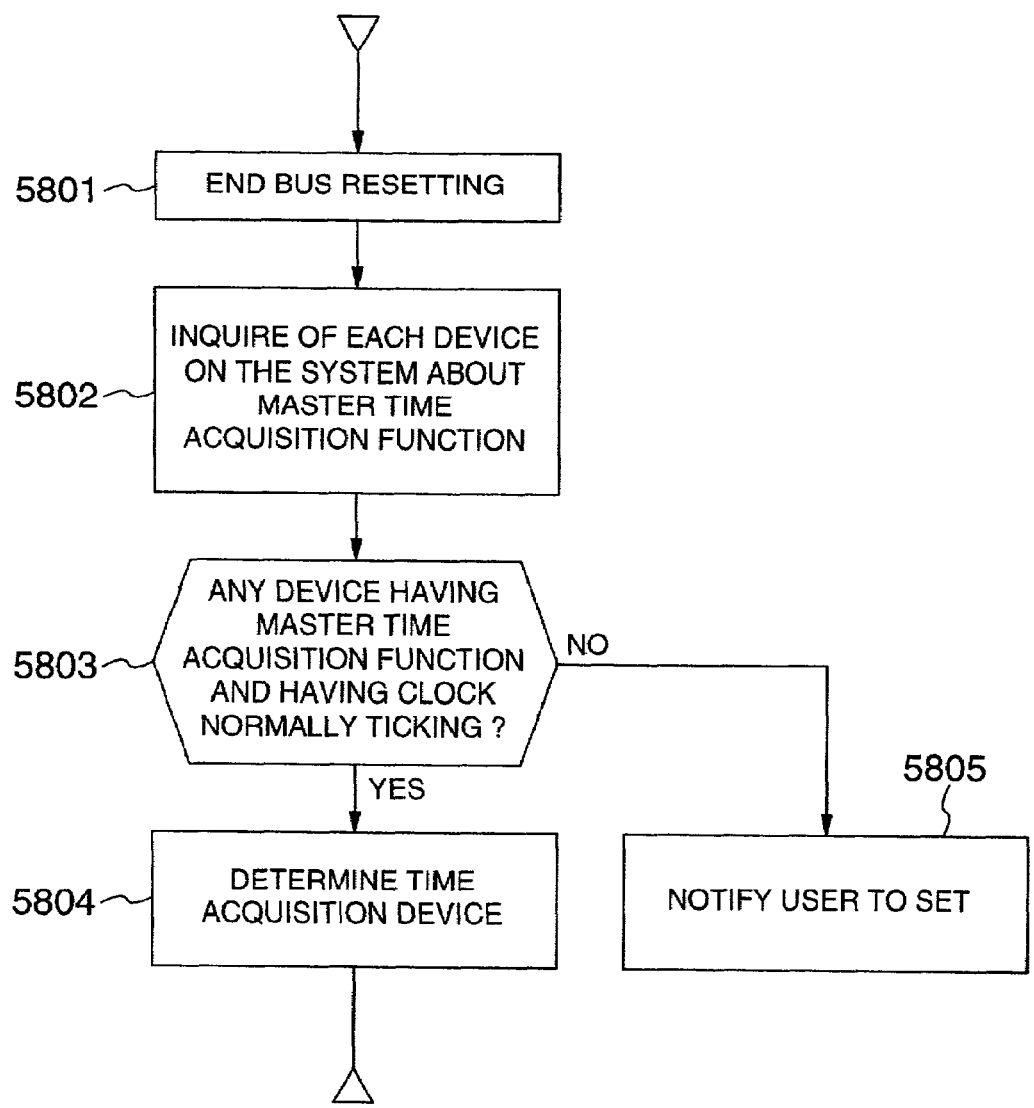

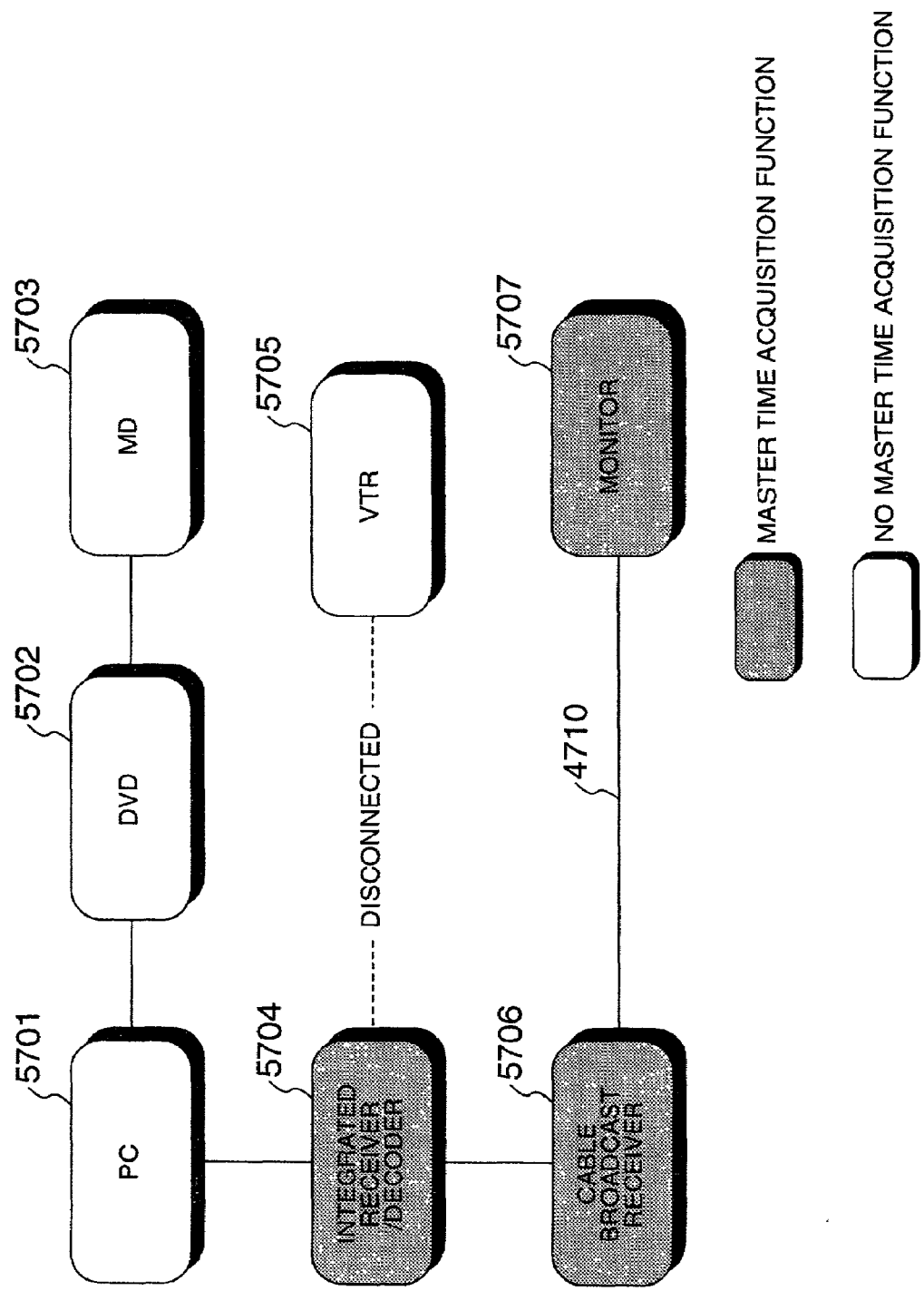

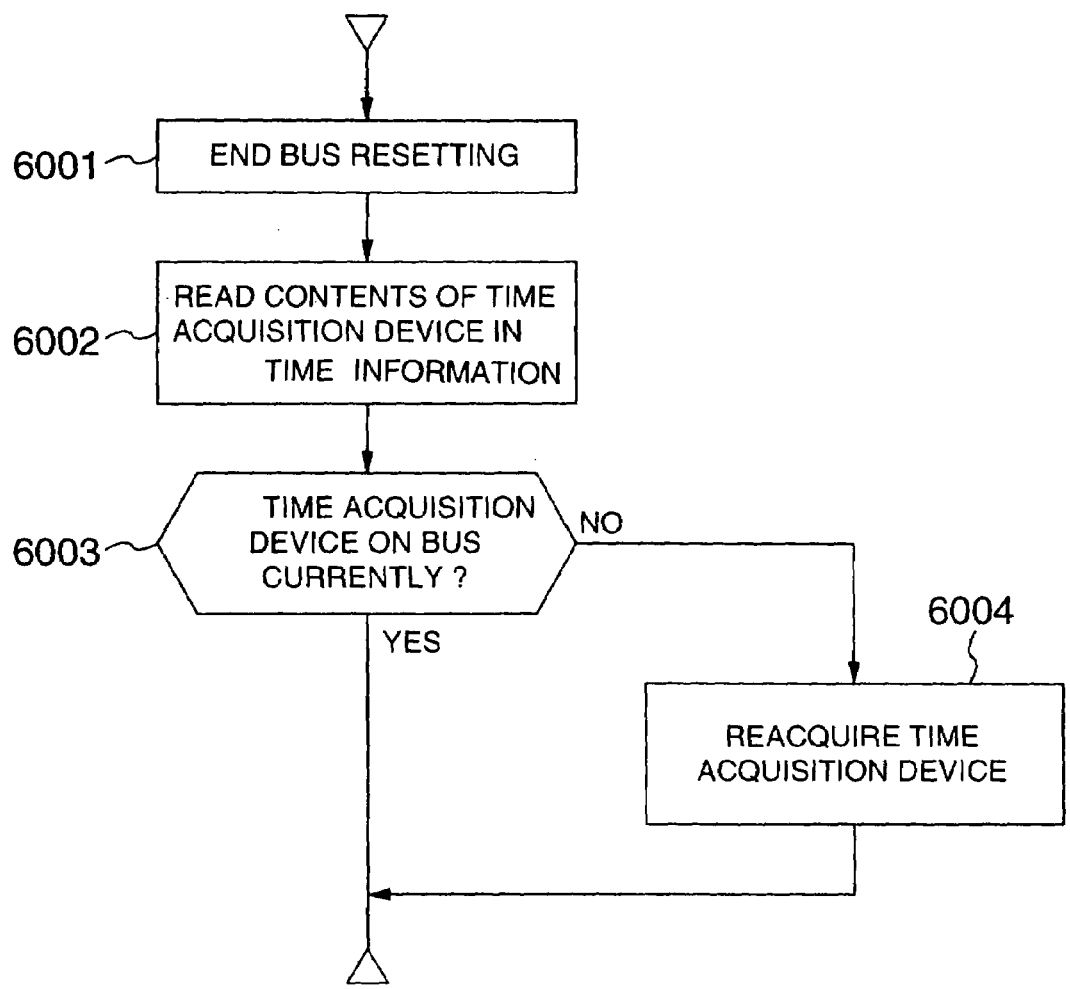

FIG. 62B

| MAY 29 1997, 16:15 |
| TICKING |
| NOT AVAILABLE |
| INTEGRATED RECEIVER/DECODER |

FIG. 62A

| CURRENT TIME | ← 6201 |
| STATUS | ← 6202 |
| MASTER TIME ACQUISITION FUNCTION | ← 6203 |
| MASTER CLOCK DATA | ← 6204 |

6200

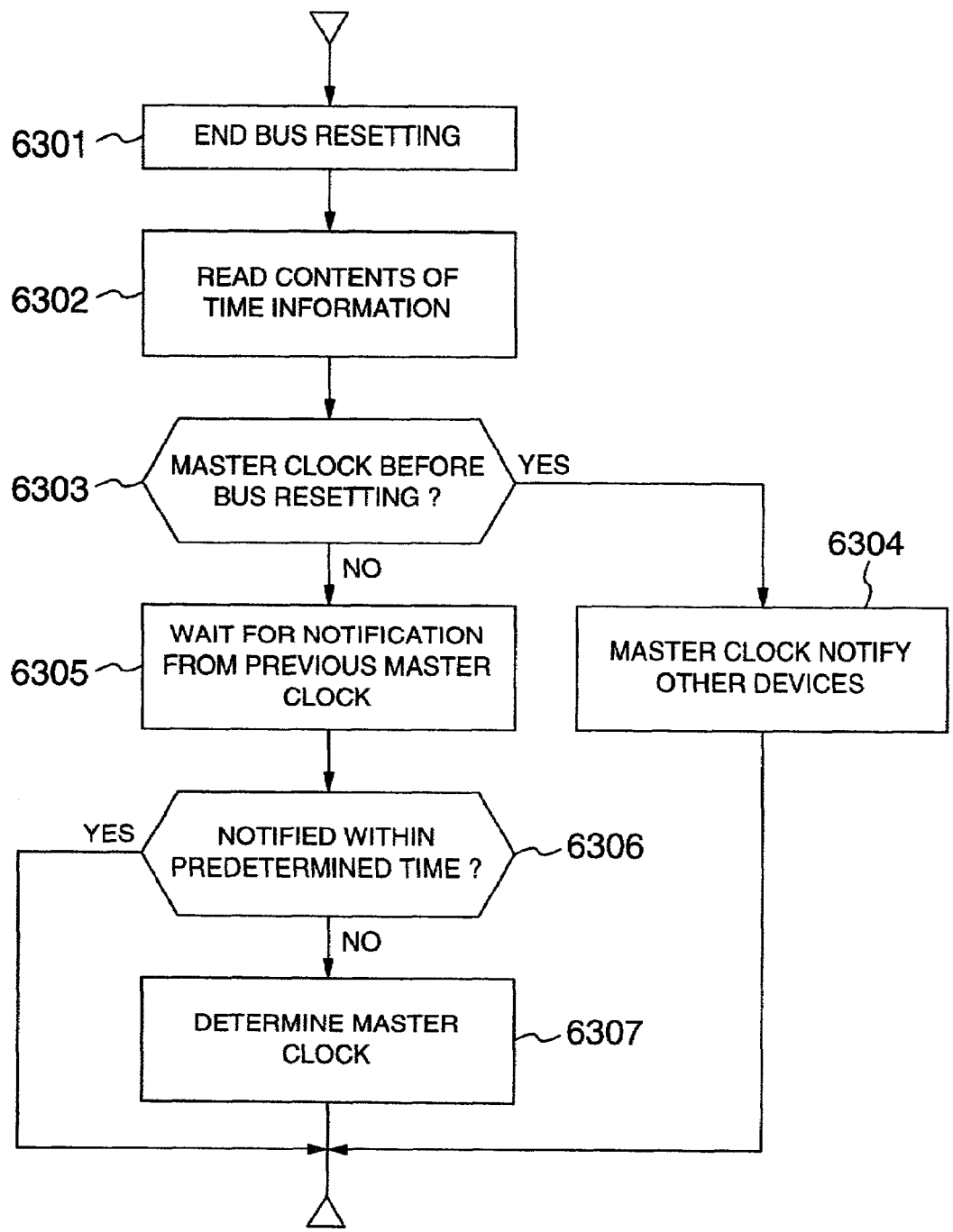

METHOD OF USING AV DEVICES AND AV DEVICE SYSTEM

CROSS-REFERENCE TO RELATED APPLICATION

This application is a division of application Ser No. 09/176,773 filed on Oct. 22, 1998, the contents of which are hereby incorporated herein by reference in their entirety.

BACKGROUND OF THE INVENTION

The present invention relates to a technique for an audio and video device system (hereinafter referred to as "the AV device system") including at least two AV devices having the audio information reproducing function, the video information reproducing function, etc. connected by a bus, or more in particular to a device application technique to secure the use of a plurality of AV devices operatively interlocked with each other.

The present invention also relates to an audio and video device system (hereinafter referred to as "the AV system") comprising a plurality of AV devices interconnected by a bus, or more in particular to a plurality of devices and a device configuration of an AV system which are managed by timer for reservation of the operation of the devices of the AV system.

A communication system using an IEEE1394 serial bus or a USB (Universal Serial Bus) has been proposed as a system including a video tape recorder (VTR), a TV receiver (TV) or other AV devices and information processing units connected by a control bus capable of transmitting and receiving both data and control signals between the devices.

The IEEE1394 serial bus can support both the isochronous transfer of such data as digital AV signals continuously at a predetermined bit rate and the asynchronous transfer of control signals such as connection control commands as required.

In addition to the isochronous transfer described above, the USB also permits a control transfer used for transmission and receipt of messages and the bulk transfer of a large amount of data at a bit rate not guaranteed.

In a system using the IEEE1394 serial bus or USB, a node ID is allocated automatically in accordance with the manner of connection of each device. Also, when a new device is added to or a device is removed from the system, the bus is reset and a node ID is allocated automatically again in accordance with the new connection.

Further, standardization is under way of control signals "AV/C Digital Interface Command Set" for controlling various AV devices from an external source.

Under the circumstances, when a system is constructed of various AV devices interconnected by the IEEE1394 serial bus or the USB to communicate data and control signals, there may be the case in which a given AV device controls other AV devices. A typical function is securing the use of a device by timer reservation for recording or reproduction.

In the conventional timer reservation functions, however, related AV devices are operated individually by the operators for timer reservation, and each AV device has never participated in the operation of other AV devices. When a set time arrives, therefore, each AV device outputs AV data such as image or audio information or starts the recording operation, for example, regardless of the operating condition of a related AV device. In the conventional method, therefore, before setting a reservation by timer, the operator is required to check whether each related device is operable at the reserved time.

If the time on the clock built in each device is not correct or the clock is cleared or stopped due to a power failure or the like, unintended AV data may be recorded, part of the intended AV data may fail to be recorded, or otherwise normal recording may become impossible.

Further, assume that a fee-charging program such as broadcast by a satellite is recorded by timer reservation. In the case where the on-air time of the program is unexpectedly extended, a VTR terminates the recording operation against the will of the operator with the arrival of the scheduled time set in advance, even though the integrated receiver/decoder may be able to meet the situation.

When a fee-charging program is reserved for recording by timer, the operator inserts a recording medium (tape or disk) having a recording area required for recording the particular program. In spite of this, the tape or disk may be taken out or used for recording a different program before the reserved time. The probable result is the shortage of the recording area, thereby making the normal recording of the reserved program impossible.

SUMMARY OF THE INVENTION

In order to solve the above-mentioned problems, an object of the present invention is to provide a technique of an AV device application by which a plurality of devices can make and manage reservations by timer in simplistic fashion in cooperation with each other.

Another object of the invention is to provide a plurality of devices managed by timer and a device system which controls the time so that the devices cooperate with each other in timer reservation.

In order to achieve the above-mentioned objects, according to the present invention, there is provided a method described below and AV devices and an AV device system for realizing the method.

Information for using a device such as timer reservation is designated to a first AV device. Upon determination of a second AV device operatively interlocked with the first AV device at the time of using a bus, the first AV device inquires of the second AV device, through the bus connecting the first and second AV devices, about the possibility of using the second AV device and the availability of the recording area of the recording medium in the second AV device during the period from the scheduled starting time and the ending time when the first AV device desires to use the second AV device.

In response to this inquiry, the second AV device checks the device operation information stored in the device operation information storage means for the second AV device and determines the usability of the second AV device during the scheduled period, while at the same time checking the recording capacity available in the recording medium. The second AV device thus gives an appropriate reply to the first AV device.

In the case where the second AV device is available for use at the designated time, the first AV device stores the device operation information, the recording starting position, the recording capacity and other information on the recording medium in the device operation information storage means of the first AV device. The same information is also stored in the device operation information storage means of the second AV device. In the case where the second AV device cannot be used at the designated time, on the other hand, the first AV device inquires of the second AV device about the cause of the cancellation or the impossibility of using the second AV device at the designated time. In the case where a plurality of requests for use of the second AV device are overlapped, one of the requests is determined as valid.

The first and second AV devices are notified several minutes before the time of actual operation.

When changing the contents of the device operation of the first AV device, the first AV device reads out the device operation information and the like from the device operation information storage means of the first AV device and displays it on the display means. Then, the appropriate portion of the device operation information is changed, and the change of the device operation information is notified to the second AV device affected by it. The second AV device, on the other hand, reads out the device operation information for the second AV device from the device operation information storage means of the second AV device and changes it accordingly.

In order to achieve the above-mentioned objects, according to another aspect of the invention, there is provided a device system comprising:

(1) a first device for processing the timer reservation and executing the reservation, including first communication interface means for communicating data and control signals with other devices connected through a control bus, operation input means enabling the user to designate a timer reservation and various setting information (such as the starting/ending time reserved, recording/reproduction, channel No., etc.) for the reservation, related device determining means for determining at least one second device operatively inter-locked with the first device to execute the reservation set by the first device, reservation registration means for storing the reservation in the second AV device, first reservation data storage means for storing the reservation data, first time holding means having a clock for holding the current time, reservation execution time notification means for notifying the arrival of the reservation execution time, reservation execution means for executing the reservation based on the reservation data, first status data storage means for storing the first status data indicating the operating condition of the clock, master time acquisition means for acquiring an accurate time from a source external to the system, first time adjusting means for adjusting the clock based on the accurate time acquired by the master time acquisition means, master information storage means for storing the master information on a specific source of the time (such as data on a satellite broadcast program) and acquisition timing (at regular intervals of time, say, once per hour, for example), time information acquisition requesting means for requesting to acquire the current time and the operating condition of the clock held in at least one second device, related device time checking means for checking whether or not the clock of the second device is suitable for executing the timer reservation based on the time information of the second device acquired from the time information acquisition requesting means, and check result notification means for notifying the user of a stumbling block, if any, to the execution of the timer reservation which may be found as a result of the check by the related device time checking means; and (2) a second device operatively interlocked with the first device for execution of the timer reservation by the first device, including second communication interface means for communicating data and control signals with other devices connected through a control bus, second reservation data storage means for storing a reservation in response to a reservation registration request from the first device, second time holding means having a clock for holding the current time, reservation execution time notification means for notifying the arrival of the reservation time, reservation execution means for executing the reservation based on the reservation data, second status data storage means for storing the second status data indicating the operating condition of the clock, time information response means for replying the time information indicating the current time and the operating condition of the clock held in the second device in response to the time information acquisition request from the first device, and second time adjusting means enabling the user to adjust the clock of the second device.

The operation for this system is performed in the following manner:

The use designates a timer reservation to the first device using the operation input means. Upon determination of a second device constituting a related device for reservation execution by the related device determining means, the first device gives a request to the second device for acquiring the current time and the operating condition indicated by the clock of the second device through the first communication interface means using the time information acquisition requesting means. In response to this request, the second device transmits the required information to the first device through the second communication interface means using the time information response means.

The first device that has acquired this time information checks whether or not the clock of the second device has no problem for execution of the timer reservation using the related device time checking means. If there is no problem found as a result of this check, the first device stores the reservation data in the first reservation data storage means, while at the same time registering the reservation data in the second device using the reservation data registration means. In the case where there is any problem, the first device displays on a monitor or the like notifying the user that the time information of the second device is not correct, using the check result notification means, and the user is instructed to adjust the time using the second time adjusting means.

The reservation is executed in the first and second devices by the reservation execution means after the reservation execution time notification means notifies the arrival of the reservation execution time or several minutes before it.

Also, the first device acquires the accurate time from a source external to the system through the master time acquisition means based on the contents of the master information stored in the master information storage means. The clock is adjusted by the first time adjusting means thereby to always hold the correct current time.

BRIEF DESCRIPTION OF THE DRAWINGS

FIG. 2 shows an example configuration of reservation data managed in an AV device making up an input device.

FIG. 3 shows an example configuration of the reservation data managed in an AV device making up a related device.

FIG. 4 is an actual example of the reservation data managed in an input device or a related device of an AV device system.

FIGS. 6A, 6B, 6C, 6D and 6E show example screens of an input device for processing the timer reservation.

FIG. 7 shows an example screen of an input device for notifying that the timer reservation cannot be executed.

FIG. 8 shows an example screen of an input device for displaying the reservation situation of a related device for timer reservation processing.

FIG. 9 shows an example screen of an input device for notifying that reservations are overlapped at the designated time in the timer reservation processing.

FIGS. 10A, 10B and 10C are example screens of an input device for displaying a list of programs that have been reserved by timer.

FIG. 11 is an example screen of a related device for displaying a list of programs that have been reserved by timer.

FIG. 13 shows an example screen for notifying that an input device or a related device cannot be used.

FIGS. 14A, 14B, 14C and 14D are example configurations of a command packet and a response packet for communication between the AV devices connected by a control bus.

FIG. 15 shows an example of timer reservation for recording a fee-charging program.

FIG. 16 shows an example screen for notifying that the next reserved program is overlapped as a result of change in the broadcast programs.

FIG. 17 shows an example configuration of an AV device system according to another embodiment of the invention.

FIG. 18 shows an example screen of an input device for displaying a list of programs that have been reserved by timer.

FIG. 19 shows an example screen of a related device for displaying a list of programs that have been reserved by timer.

FIG. 46 shows an example screen for notifying that the reservation is cancelled in the case where the reserved time set by timer arrives during recording or reproduction.

FIGS. 47A, 47B and 47C are diagrams showing devices and a device system for timer management according to the first embodiment of the invention.

FIG. 50 is a flowchart showing the steps of processing the timer reservation according to the first embodiment shown in FIGS. 47A, 47B and 47C.

FIGS. 51A, 51B, 51C, 51D and 51E are diagrams showing a specific example of the image displayed on the liquid crystal screen of a monitor or a remote controller in FIGS. 47A, 471B and 47C associated with the processing of steps 5001 and 5002.

FIG. 53 is a diagram showing a specific example of the screen for notifying that the clock will be adjusted in the case where the timer reservation may not be normally executed due to the malfunction of the clock of the integrated receiver/decoder in FIGS. 47A, 47B and 47C.

FIG. 54 is a diagram showing a specific example of the screen for notifying that the clock failed to be adjusted in the integrated receiver/decoder in FIGS. 47A, 47B and 47C.

FIGS. 55A and 55B are diagrams showing a specific example of time information managed in a device lacking the master time acquisition function in FIGS. 47A, 47B and 47C.

FIGS. 56A and 56B are diagrams showing a specific example of time information managed in a device lacking the master time acquisition function in FIGS. 47A, 47B and 47C.

FIG. 57 is a block diagram showing devices and a device system for timer management according to the second embodiment of the invention.

FIG. 58 is a flowchart showing the initial processing of an added device having no master time acquisition function according to the second embodiment of FIG. 57.

FIG. 59 is a block diagram showing a specific example of a configuration with a device removed or a power failure in the second embodiment shown in FIG. 57.

FIG. 60 is a flowchart showing the processing performed by a device other than the device which is removed or for which the power failed in the situation shown in FIG. 59.

FIGS. 62A and 62B are diagrams showing a specific example of a configuration of time information managed by the time management section of a device having no master time acquisition function according to the second embodiment shown in FIG. 57.

FIG. 63 is a flowchart showing the operation of processing the time information of a device having the master time acquisition function when the bus is reset according to the second embodiment of FIG. 57.

DESCRIPTION OF THE PREFERRED EMBODIMENTS

The present invention will be described in more detail with reference to the accompanying drawings. The embodiments described below refer to the cases of securing the use of a device by timer reservation as a technique for securing the use of a bus, but can apply to any case other than timer reservation which can avoid the overlapped use of devices.

Figure 1:
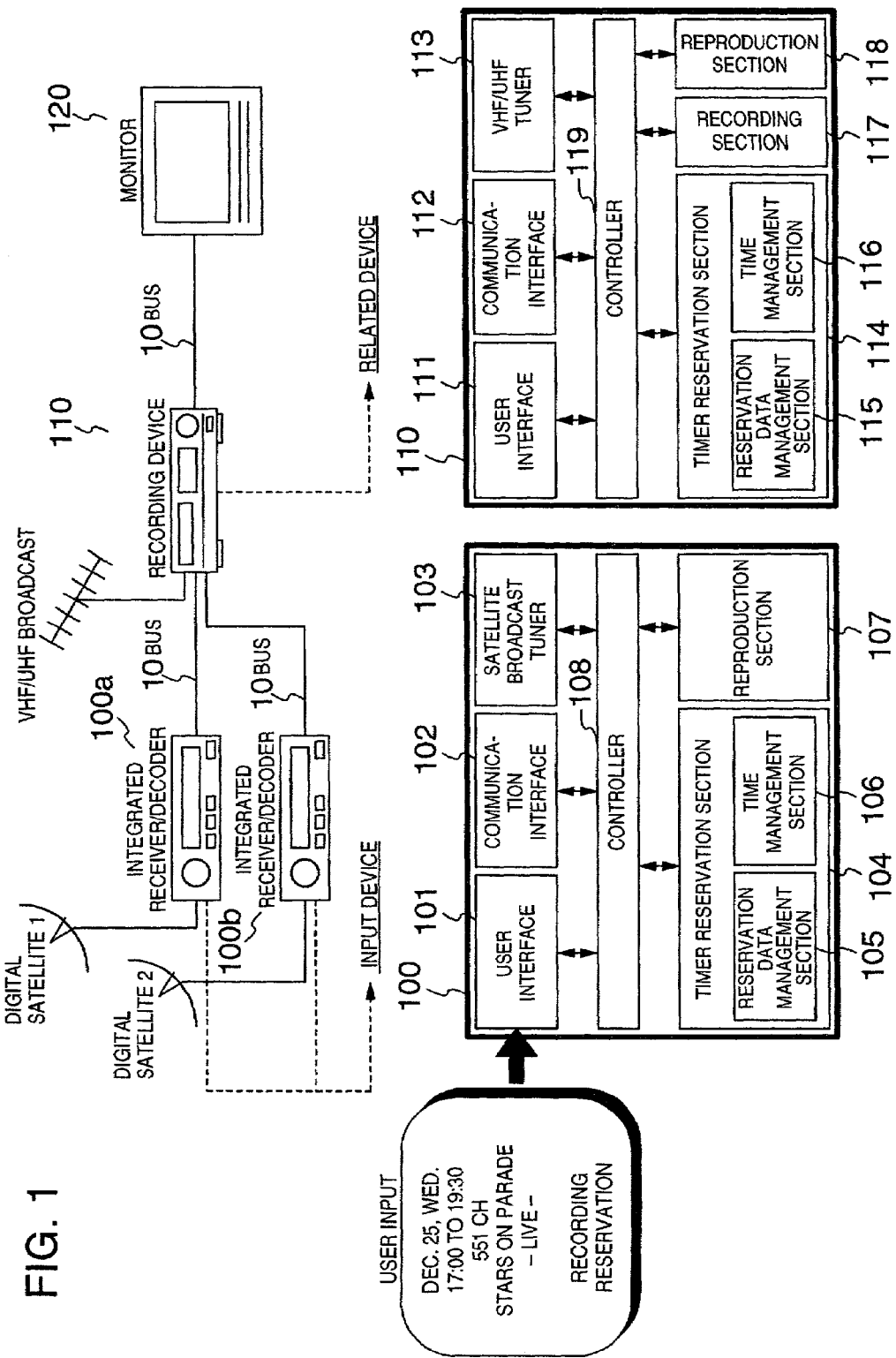
FIG. 1 shows an example configuration for timer reservation in an AV device system according to an embodiment of the invention.

FIG. 1 is a diagram showing an example configuration for timer reservation for an AV device system according to the present invention.

In this example, an AV device system comprises integrated receiver/decoders 100a, 100b for receiving broadcast programs using communication satellites, a recording device 110 such as a videotape recorder for recording AV data such image and voices on a magnetic tape and DVD, HD, MO for recording AV data on a magnetic or optical disk, and a monitor 120 such as a TV receiver or a display of a personal computer. These components are interconnected by a bus 10 such as an IEEE1394 serial bus or USB.

Explanation will be made below about a method in which the operator instructs the integrated receiver/decoder 100a to reserve "the timer recording of a satellite broadcast program in the recording device 110", and the integrated receive/decoder 100a and the recording device 110 set and execute the timer reservation.

First, the configuration of the integrated receiver/decoder 100a and the recording device 110 will be explained. The integrated receiver/decoder 100b has a similar configuration to the integrated receiver/decoder 100a The integrated receiver/decoder 100a includes a user interface section 101 for exchanging signals for setting and displaying the timer reservation with the operator using an input designation device such as a remote controller or a tablet, a communication interface section 101 for communicating AV data and control signals with other devices (the integrated receiver/decoder 100b, the recording device 110 and the monitor 120 in this case) through the bus 10, a satellite broadcast tuner 103 for receiving a satellite broadcast program, a timer reservation section 104 for processing the timer reservation, a reproduction section 107 for reproducing a received broadcast program on the monitor 120 and a control section 108 for controlling the operation of various internal parts of the integrated receiver/decoder 100a.

The timer reservation section 104 includes a reservation data management section 105 for managing the data on the timer reservation and a time management section 106 for issuing an alarm on or otherwise notifying the arrival of the reservation time.

The recording device 110 includes a user interface section 111 for exchanging signals for recording and reproduction, timer reservation, display, etc. with the operator using an input instruction device such as a remote controller or a tablet, a communication interface section 112 for communicating data and control signals with other devices (the integrated receiver/decoders 100a, 100b and the monitor 120 in this case) through the bus 10, a VHF/UHF tuner 113 for receiving a VHF/UHF broadcast program, a timer reservation section 114 for processing the timer reservation of VHF/UHF broadcast programs, a recording section 117 for recording AV data such as broadcast programs on a recording medium such as a magnetic tape or an optical disk, a reproduction section 118 for reproducing the AV data recorded on the recording medium, and a recording device control section 119 for controlling the operation of the recording device 110.

The timer reservation section 114 includes a reservation data management section 115 for managing the data on the timer reservation and a time management section 116 for notifying, by an alarm or the like, the arrival of the reserved time.

Now, explanation will be made about an example configuration of the reservation data managed by the reservation data management section 105 of the integrated receiver/decoder 100a and the reservation management section 115 of the recording device 110.

With the integrated receiver/decoder 100a(input device) instructed for timer reservation by the operator, the device operation information is constituted of such data as a reservation ID 201, a reservation time (starting and ending time) 202, a related device ID 203 and various setting information 204. These data constitute the, reservation data for managing one reservation.

The reservation ID 201 is an identifier of the reservation data managed in the input device 100a, and assigned a unique number according to the order of reservation setting and date and time. The reservation time 202 is the required reservation time (starting/ending time). The related device ID 203 is an identifier unique to a device (related device) operatively inter-locked for executing the reservation, which, in this embodiment, is an ID unique to the recording device 110. In the case where no device is required to be operatively interlocked, the local ID (ID of the integrated receiver/decoder 100a) or a value not used as an ID is set. In the case where there are a plurality of related devices, the IDs of all the devices are set. The various setting information 204 include information required for the input device and the related device to set and execute the timer reservation in mutual cooperation, such as the type of execution function such as reproduction or recording, the channel No., SP (standard play), LP (long play), EP (extra long play) or the like recording speed mode and the record mode such as analog or digital.

In the recording device 110 (related device) operatively interlocked with the integrated receiver/decoder 100a at the time of reservation execution, each reservation is constituted of data including a reservation ID 301, a reserved time (starting and ending time) 302, an input device ID 303 and various setting information 304 for the related device.

The reservation ID 301 is an identifier of the reservation data managed in the related device 110 and is assigned a unique number representing the order of reservation setting or the order of data and time. The reserved time 302 is the required time (starting and ending time) of a program. The input device ID 303 is an identifier unique to the device (input device) accepting the reservation and operatively interlocked at the time of execution of the reservation. According to this embodiment, it is an ID unique to the integrated receiver/decoder 100a. In the case where the integrated receiver/decoder 100a accepts a reservation by itself and there is no need of an operatively-interlocked device, a value other than the ID of the recording device 110 or a value not used as an ID of the recording device is set. The various setting information 304 are the information required for setting and executing a timer reservation such as the execution functions including reproduction or recording, the recording speed mode such as SP, LP or EP and the record mode such as analog or digital.

Figure 5:
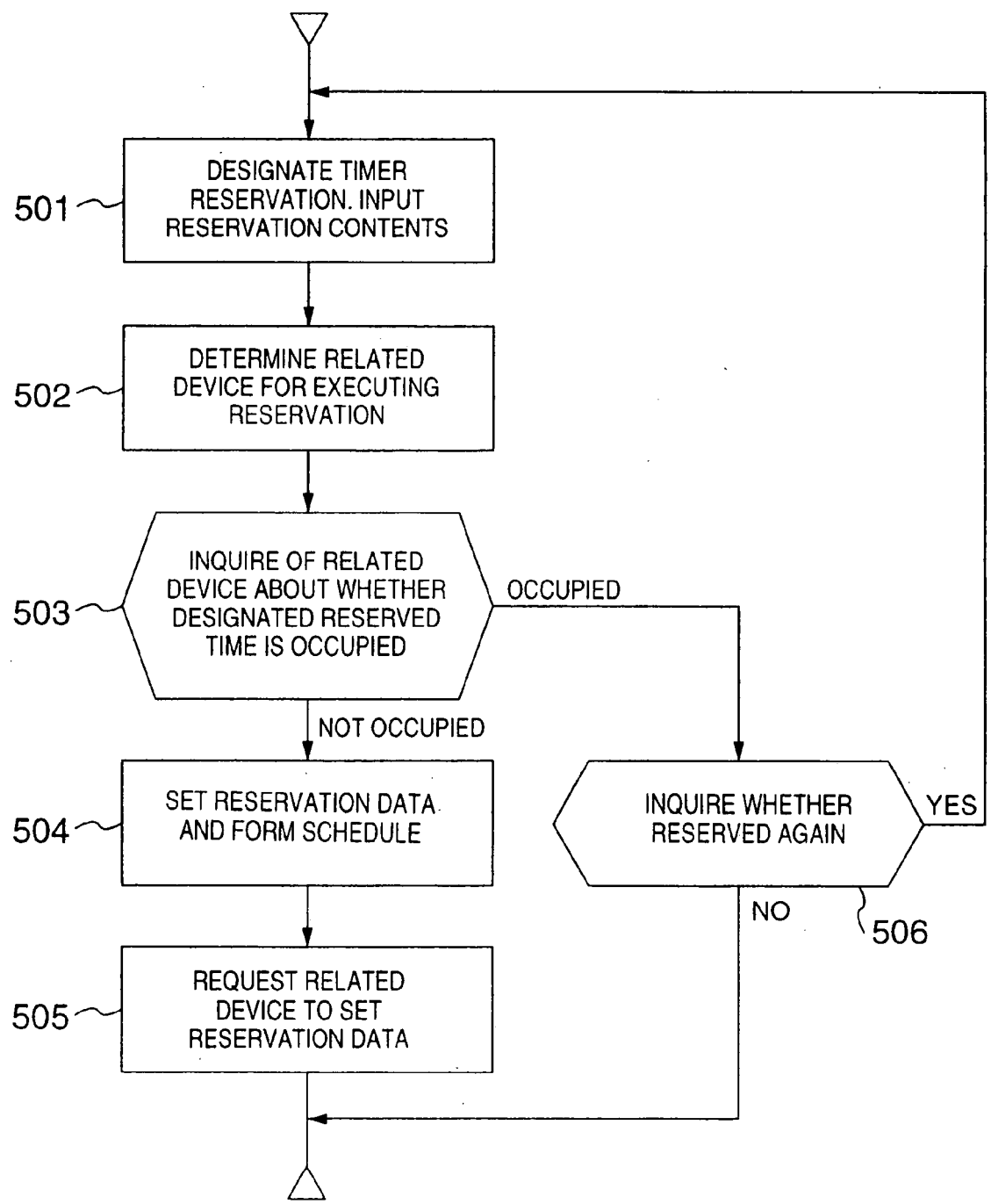
FIG. 5 is a flowchart showing the steps of processing a timer reservation.

Now, the steps of processing the timer reservation in the above-mentioned AV device will be explained with reference to FIGS. 4 and 5.

First, the operator inputs a timer reservation designation and a reservation content 400 to the integrated receiver/decoder 100a using an input designation device such as a remote controller or an input tablet through the user interface section 101 (step 501). In the case where the content of the reservation is to be executed in cooperation with other devices than the integrated receiver/receiver 100a, a related device to be controlled (the recording device 110 in this case) is determined (step 502).

FIG. 6 shows an example screen displayed on the liquid crystal display of the remote controller or the monitor 120 in step 502. First, the operator designates a program guide indicator 601 on the remote controller 600. The screen 610 displaying a program guide is displayed. A program to be reserved is selected using a direction indicator 602 on the screen 610. Upon designation of the registration by a registration indicator 606, a screen 620 for selecting the execution function is displayed. A reservation execution function (reproduce or record) is selected using the direction indicator 602 on the screen 620 and the determination of the result of selection is designated by a determination indicator 604. Upon selection of the recording, for example, a screen 630 for selecting a recording device, i.e. a related device is displayed. Among the devices connected to the bus 10, the information on devices having the recording function (the device type such as VTR or DVD, the name of the manufacturer, etc.) are displayed on the screen 630.

In the system according to this embodiment (FIG. 1), only one recording device is available on the bus and therefore only the information on the recording device 110 is displayed.

When the determination is indicated by the determination indicator 604, a screen 640 for selecting the tape speed and the record mode is displayed. When the tape speed and the record mode are selected on the screen 640 and the determination is indicated by the determination indicator 604, the information setting is complete for the recording reservation.

Next, the timer reservation section 104 in the integrated receiver/decoder 100a inquires of the timer reservation section 114 of the related device (the recording device 110) whether the designated reserved time is occupied or not, i.e. whether the reservation data can be stored in the reservation data management section 115 through the control section 108, the communication interface section and the bus (step 503). In the process, the inquiry is accompanied by the transmission of the information on at least the time of starting and ending the use of the related device. The inquiry can be made, however, while at the same time transmitting the contents of the reservation data.

Assume, as a result of the inquiry, that a notification is received from the recording device 110 that the designated time is not occupied and available for use. The reservation data management section 105 prepares and manages the reservation data 410 based on the reservation contents input thereto (step 504). The reservation data 410 include a reservation data ID 411 in the input device 100a, a reserved time 412 for the reservation contents 400, an ID 413 unique to the related device on the bus, and various setting information 414 such as the execution function, the channel No., the program title, the tape speed and the record mode.

At the same time, the input device 100a transmits the information required for preparing the reservation data 420 to the timer reservation section 114 of the related device 110 and issues a request for setting the reservation data 400 (step 505). The timer reservation section 114 of the related device 110 that has received the setting request prepares the reservation data 420, which is managed by the reservation data management section 115.

The reservation data 420 include a reservation data ID 421 in the related device 110, a reservation time 422 for the reservation contents 400, an ID 423 unique to the input device 100a on the bus, various setting information 424 such as the execution function, the channel No., the program title, the tape speed and the record mode.

In step 503, assume that the notification is received from the related device 110 that the designated time is occupied. The operator is inquired about whether the timer reservation is set again or not (step 506). In the case where the timer reservation is set again, the process returns to step 501. Otherwise, the process is terminated. FIG. 7 shows an example screen for inquiring of the operator. When a selection item 701 is designated on the screen 700, the process returns to step 501, while when the selection item 702 is designated, the process is terminated.

In step 502, the information on the related device 110 are secured in such a manner that a device existing on the bus and constituting a related device is acquired and managed by the control section 108 of the input device 100a at the time of resetting the bus or at regular time intervals. In the case where only one related device exists on the bus 10, the particular device can be automatically determined as the related device 110. In the case where there exist two or more related devices on the bus 10, these devices are displayed on the liquid crystal screen of the monitor 120 or the remote controller, and an appropriate related device can be determined by the operator each time of reservation. It is also possible to determine the order of priority in advance for the related devices managed by the control section 108 and to record the order in the control section 108, which is referred to for determining a device automatically. On the other hand, an appropriate device can automatically be determined from the related device information managed by the control section 108, according to the recording medium (VHS tape, SVHS tape, magnetooptical disk, etc.) mounted on the related device or the record mode (analog or digital) designated by the operator. When the operator designates the digital recording, for example, the control section 108 selects a related device capable of digital recording and with the SVHS tape mounted thereon from the related device information and determines it as a related device.

In step 503, it is also possible for the integrated receiver/decoder 100a to read out the reservation data 300 managed by the timer reservation section 114 of the related device 110 and to check whether the designated reserved time is occupied or not.

FIG. 8 shows an example screen 800 of the input device 100a displaying the reservation situation of the related device 110.

In step 505, it is also possible that the reservation data management section 105 of the integrated receiver/decoder 100a prepares the reservation data 420 and transmits it to the timer reservation section 114 of the recording device 110, which sets the reservation data 420 in the reservation data management section 115. As another alternative, the control section 108 in the integrated receiver/decoder 100a can directly set the reservation data 420 in the reservation data management section 115 of the related device 110.

In step 506, in the case where the recording device 110 is occupied at the designated time, the schedule can be notified to the operator to determine which reservation is given priority. When a reservation is cancelled, the device for which the reservation is cancelled deletes the reservation data for the cancelled reservation from all the devices having the reservation data. FIG. 9 shows an example screen 900 for notifying the operator that reservations are overlapped and requesting the operator to determine which reservation is given priority. When a selection item 901 is designated on the screen 900, the timer reservation section 104 of the integrated receiver/decoder 100a transmits a request to the timer reservation section 114 of the recording device 110 to delete the reservation previously set. The timer reservation section 114 of the recording device 110 acquires the reservation data for the cancelled reservation from the reservation data management section 115 and deletes the cancelled reservation data, while at the same time deleting the reservation data from all the devices having the reservation data for the cancelled reservation.

Upon designation of a selection item 902, on the other hand, the timer reservation designated on the screens 610 to 640 is cancelled. Various other arbitrations for the overlapped reservations are available. For example, the reservation for a fee-charging program such as a satellite broadcast program is automatically given priority, or the order of priority is stored in advance in the control section 108 of the input. device 100a and referred to at the time of timer reservation.

Figure 10A:
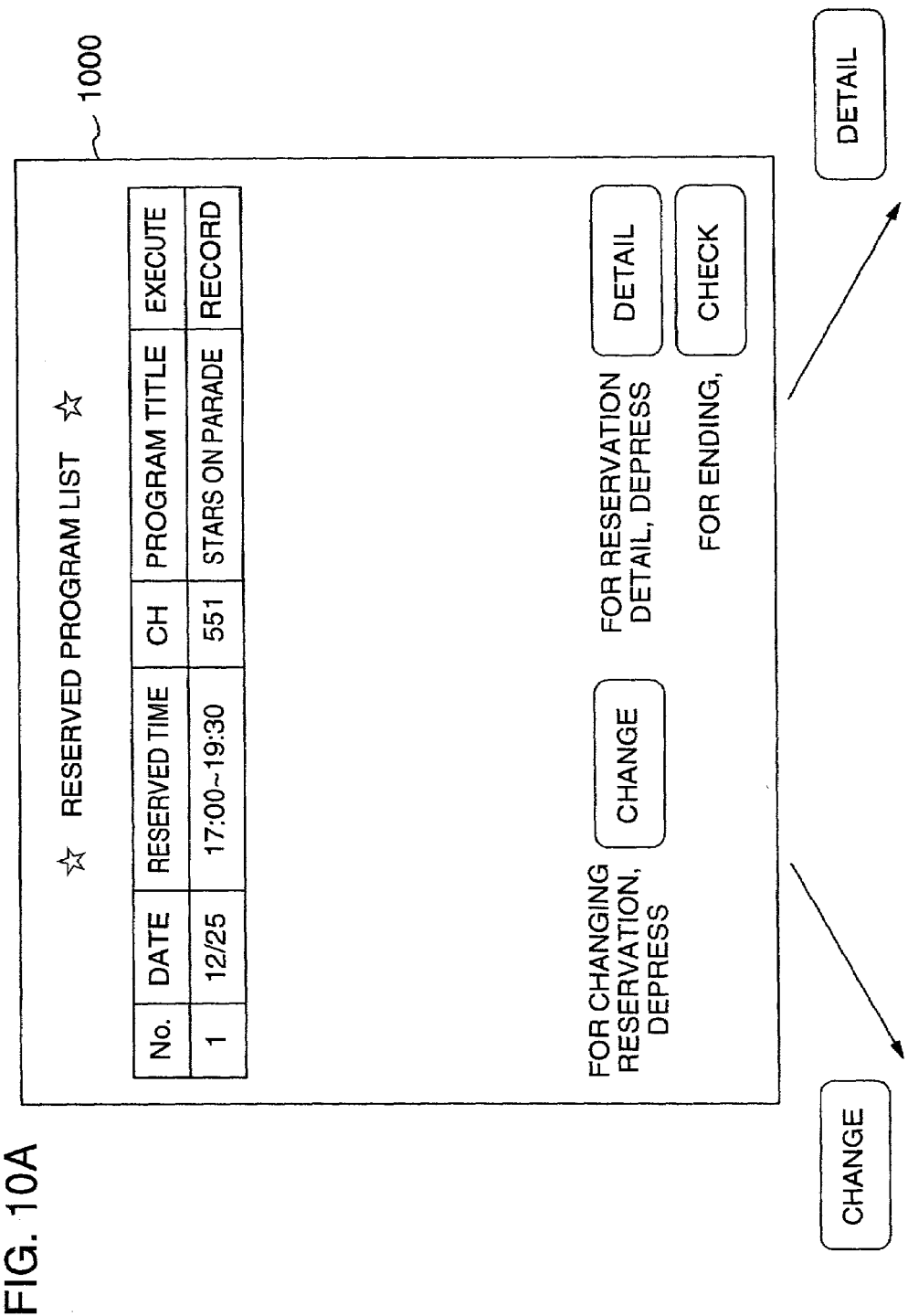
Figure 10B:
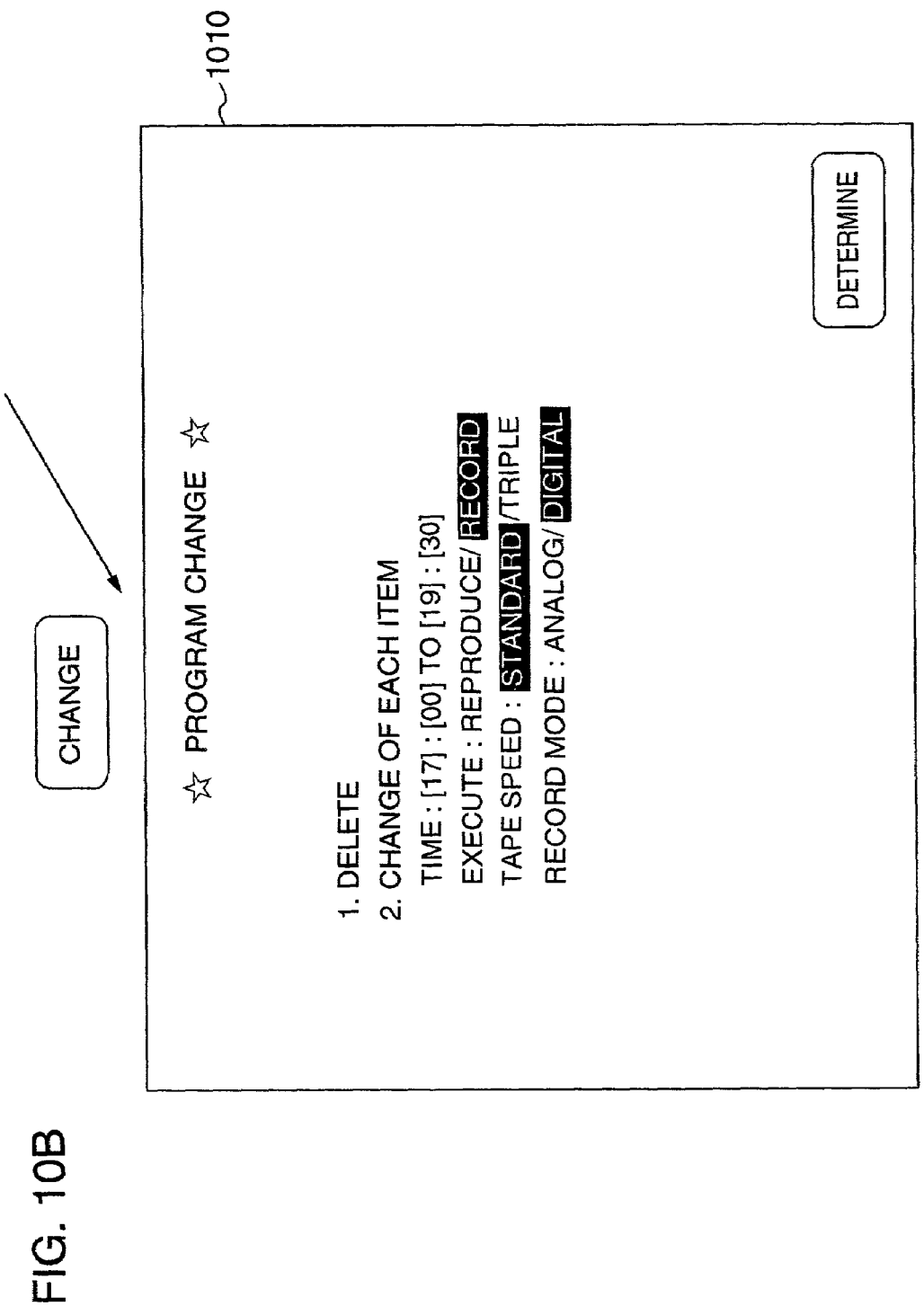

FIG. 10 shows a screen example for displaying a list of contents of a reservation already set as a timer reservation in the input device, i.e. the integrated receiver/decoder 100a.

First, the operator designates a check indicator 605 on the remote controller 600. The timer reservation section 104 reads out the reservation data 200 from the reservation data management section 105 in the integrated receiver/decoder 100a, and displays it on the screen 1000 of the monitor 120 through the user interface section 101. Such items as the reservation No., the reserved date and time, channel No., the program title and the function to be executed for each reservation are displayed on the screen 1000. For more detailed check, a detail indicator 603 is designated. Then, the screen 1020 is displayed. The contents including the items that could not be displayed on the screen 1000 are displayed on the screen 1020.

Now, explanation will be made about the process for changing the contents of the timer reservation already set. A given reservation is selected from the reservation contents displayed on the screen 1000, and the change thereof is designated by the change indicator 606. A reservation change screen 1010 is displayed. Assume that the deletion of a reservation or the change of the time or the execution function is designated on the screen 1010. The timer reservation section 104 in the integrated receiver/decoder 100a deletes or, as the case may be, changes the contents of the reservation stored in the reservation data management section 105. At the same time, the timer reservation section 114 of other devices (the recording device 110 in this case) operatively interlocked at the time of reservation execution is requested to delete or change the contents of the reservation data for the particular reservation.

In response to this request, the timer reservation section 114 of the recording device 110 searches for the reservation data of the particular reservation stored in the reservation data management section 115 and deletes or changes, as the case may be, the contents thereof. Alternatively, it is possible that the timer reservation section 104 of the integrated receiver/decoder 100a acquires the reservation data stored in the reservation data management section 115 of the recording device 110, searches for the reservation data for the particular reservation from them and deletes or changes the contents thereof, so that the resulting reservation data are written in the reservation data management section 115 again.

FIG. 11 shows an example screen for displaying a list of the contents of reservations already set by timer in the recording device 110 constituting a related device.

Upon designation of check or change of the contents of the reservation by the operator, the timer reservation section 114 in the recording device 110 reads the reservation information from the reservation data management section 115, and displays the screen 1100 on the monitor 120 through the user interface section 111. The timer reservation for recording a broadcast program received from the VHF/UHF tuner 113 built in the recording device 110 and the timer reservation for recording a broadcast program received by the integrated receiver/decoders 100a, 100b are displayed at the same time. The two types of programs are discriminated by attaching an asterisk 1110 in FIG. 8 or by indicating the name of the receiver.

Figure 12:
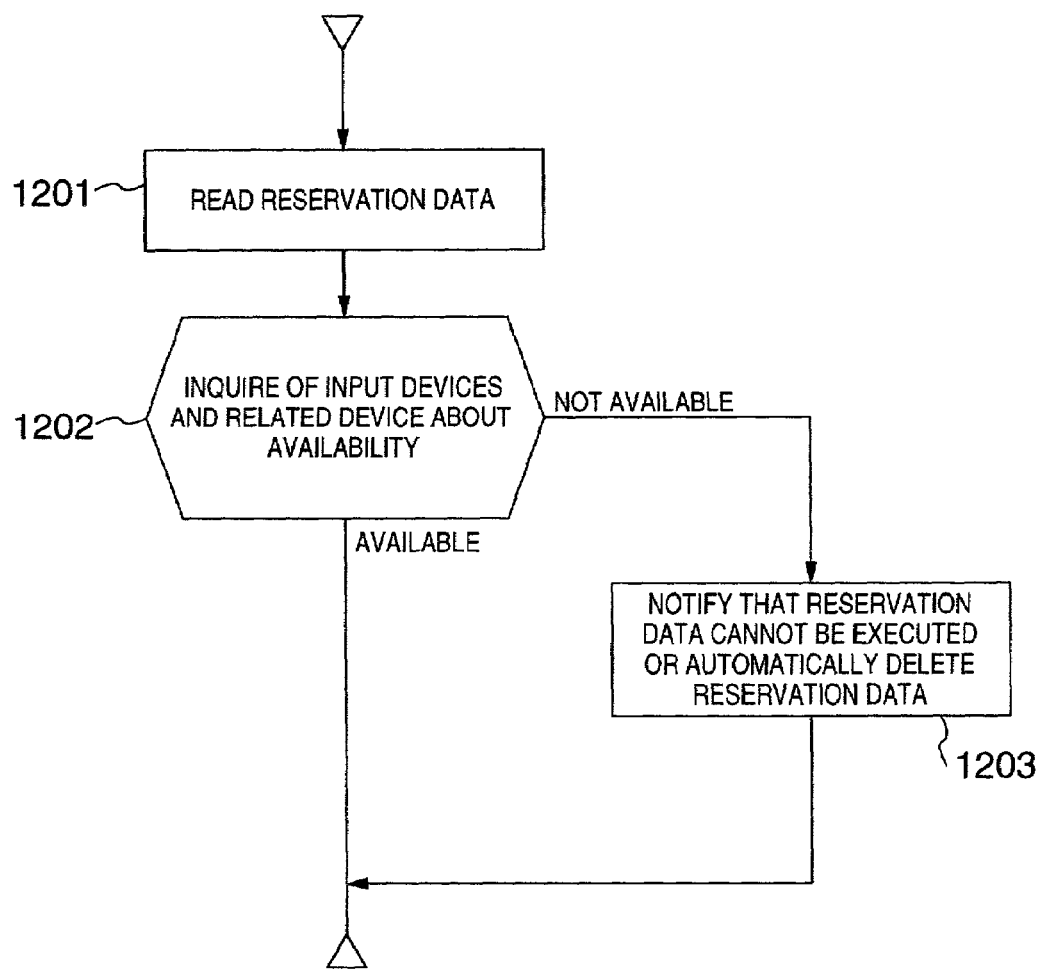
FIG. 12 is a flowchart showing the steps of each AV device checking the contents of the reservation when the AV device system configuration is changed.

Now, the processing performed when the AV device system configuration is changed as a result of the bus being reset (such as when the connected device configuration is changed by removal of a device) or the connected device being removed will be explained with reference to FIG. 12.

First, the timer reservation sections 104, 114 of the devices that have recognized the change of the AV device system configuration read (step 1201) the reservation data 200 or 300 managed by the reservation data management sections 105, 115 and check the contents thereof, and check the input device ID 303 or the related device ID 203 in the reservation data. If the value is other than the ID of the device associated with the timer reservation section 104 or 114, the timer reservation section 104 or 114 inquires of the input device indicated by the input device ID 303 or the related device ID 203 about the status thereof (about the existence or the availability for use thereof) (step 1202). If the device inquired of is occupied and not available for use, the operator is notified that the reservation data is impossible to execute and the reservation is cancelled or the reservation data is automatically deleted (step 1203). As a result, even when the system configuration is changed, the reservation data can be smoothly managed in accordance with the prevailing status. FIG. 13 shows an example screen 1300 for notifying the operator that the device inquired of is occupied. Upon designation of the selection item 1301 on the screen 1300, the timer reservation sections 104, 114 delete the reservation data. Upon designation of the selection item 1302, on the other hand, the screen 1300 is kept on display until the device inquired of becomes available for use.

FIG. 14 shows an example packet structure of the control signal for sending an inquiry to the recording device 110 from the integrated receiver/decoder 100*a* and transmitting a response to the integrated receiver/decoder 100*a* from the recording device 110 on the bus 10 in steps 503, 505 and 1202.

The integrated receiver/decoder 100*a*, when requesting the recording device 110 to set or acquire the reservation data, uses a command packet 1400.

The command packet 1400 includes a command source address 1401, a command source subunit address 1402, a command destination address 1403, a command destination subunit address 1404 and a data payload 1405.

The command source address 1401 indicates the sole address on the bus 10 of the device issuing a command to be transmitted. In the present embodiment, it is an address of the integrated receiver/decoder 100*a* on the bus 10.

The command source subunit address 1402 is an address of each function (tuner, timer reservation section, etc.) in the device issuing a command. In the present embodiment, it is an address of the timer reservation section 104 in the integrated receiver/decoder 100*a*.

The command destination address 1403 is the sole address on the bus 10 of the device receiving a command, and in the present embodiment, is an address of the recording device 110 on the bus 10.

The command destination subunit address 1404 is an address of each function (the tuner, the timer reservation section, etc.) in the device receiving the command, and in the present embodiment, is an address of the timer reservation section 114 in the recording device 110.

The data payload 1405 includes a request issued to the timer reservation section (in this case, the timer reservation section 114 in the recording device 110) at the command destination to write, read or change the reservation data and the content of such requests.

The response from the recording device 110 to the integrated receiver/decoder 100*a*, on the other hand, uses a response packet 1410.

The response packet 1410 includes a response source address 1411, a response source subunit address 1412, a response destination address 1413, a response destination subunit address 1414 and a response content 1415.

The response source address 1411 is the sole address on the bus 10 of the device issuing a response, and in the present embodiment, an address of the recording device 110 on the bus 10.

The response source subunit address 1412 is an address of each function (the tuner, the timer reservation section, etc.) in the device issuing a response. In the present embodiment, it is an address of the timer reservation section 114 in the recording device 110.

The response destination address 1413 indicates the sole address on the bus 10 of the device receiving the response, and in the present embodiment, is an address of the integrated receiver/decoder 100*a* on the bus 10.

The response destination subunit address 1414 is an address of each function (the tuner, the timer reservation section, etc.) in the device receiving the response, and in the present embodiment, is an address of the timer reservation section 104 in the integrated receiver/decoder 100*a*.

The response content 1415 is that of a response including the contents and the result of change of the reservation data transmitted to the timer reservation section (in this case, the timer reservation section 114 in the recording device 110) at the response destination meeting the request from the same timer reservation section to write, read or change the reservation data.

As described above, according to this embodiment, in a system with the integrated receiver/decoders 100*a*, 100*b* and the recording device 110 connected to each other by the control bus 10, the integrated receiver/decoders 100*a*, 100*b* and the recording device 110 include the timer reservation sections 104, 114, respectively, having the reservation data management sections 105, 115, and the timer reservations associated with a given device among those of all the devices existing on the bus 10 are managed by the particular device.

For example, when the timer reservation is designated by the integrated receiver/decoder 100*a* as described above, the timer reservation section 104 stores the contents of the reservation data in the reservation data management section 105, while at the same time storing them in the reservation data management section 115 of the recording device 110 operatively interlocked with the integrated receiver/decoder 100*a*.

As a result, assuming that a timer reservation is designated by a device other than the integrated receiver/decoder 100*a* and the recording device 110, such as the integrated receiver/decoder 100*b* operatively interlocked with the recording device 110, for example, the reservation situation in the recording device 110 on the bus 10 can be entirely grasped simply by inquiring of the reservation data management section 115 of the recording device 110.

Though described later, assume that a timer reservation is designated by another device operatively interlocked with the integrated receiver/decoder 100*a*. The reservation situation in the integrated receiver/decoder 100*a* on the bus 10 can be entirely grasped simply by inquiring of the reservation data management section 105 of the integrated receiver/decoder 100a.

Also, the reservation data stored in the reservation data management sections 105, 115 are configured to include the input device ID 303 or the related device ID 203.

As a result, it is possible to identify a device that has reserved any reservation data and a device executing the reservation in operatively interlocked relation with another device. A change in the system configuration or the overlap or change of reservations can thus be met readily by cancellation or otherwise handled appropriately.

In this case, a configuration can be employed in which the integrated receiver/decoder 100a and the recording device 110 each execute the reservation individually based on the respective stored reservation data with the arrival of the reservation execution time. Another configuration is also possible to employ in which the integrated receiver/decoder 100a has the function of remotely controlling the recording device 110 and with the arrival of the reservation execution time, remotely controls the recording device 110 for executing the reservation. In the latter case, data indicating whether a device is to be remotely controlled or not can be included in addition to the related device ID 203 in the reservation data 200 managed by the reservation data management section 105 of the integrated receiver/decoder 100a.

Further, the reservation data 300 managed by the reservation data management section 115 in the recording device 110 can include, in addition to the input device ID 303, the data indicating whether or not to be remotely controlled by a device.

Now, the reservation for timer recording of a fee-charging program such as a satellite broadcast program will be explained with reference to FIG. 15.

Assume that in accordance with the above-mentioned timer reservation procedure, the reservation data management section 105 in the integrated receiver/decoder 100a has stored therein the reservation data for a fee-charging program 1510 such as a live sport broad-casting with a scheduled starting time 1501 and a scheduled ending time 1502 and the reservation data for a subsequent program 1520 scheduled to start at time point 1504.

Several minutes before the scheduled starting time of the reserved fee-charging program 1501, the timer reservation section 104 acquires the latest one of the program guides transmitted constantly or regularly by satellite broadcasting, and checks whether or not the program 1510 is to be started at the scheduled time.

The timer reservation section 104 can alternatively be adapted to acquire a new program guide at regular intervals of time.

The program 1501, which starts at the scheduled time, begins to be recorded in cooperation with the recording device 110 with the arrival of the scheduled time 1501.

Suppose that the program 1510 starts to be broadcast behind time, on the other hand. The timer reservation section 104 acquires the ending time thereof and checks whether the scheduled starting time 1504 of the subsequently reserved program 1520 is overlapped with the ending time of the program 1510 reserved later. In the case where the starting time of the subsequent program is overlapped with the ending time of the program 1510, the operator is notified.

FIG. 16 shows a screen example 1600 displayed on the monitor 120. Upon designation of the selection item 1601 on the screen 1600, the timer reservation section 104 in the integrated receiver/decoder 100a changes the reservation time 202 in the reservation data 200 for the reserved program 1510 and deletes the reservation data 200 for the reserved program 1520. At the same time, a request for changing the reservation time 302 in the reservation data 300 for the reserved program 1510 and deleting the reservation data 200 for the reserved program 1520 are issued to the timer reservation section 114 in the recording device 300.

The timer reservation section 114 in the recording device 110 changes the reserved time 302 in the reservation data for the reserved program stored in the reservation data management section 115, and deletes the reservation data 300 for the reserved program 1520. In the case where the selection item 1602 is designated, on the other hand, the reserved program 1520 begins to be recorded. Which is given priority can also be left to the operator.

Then, the recording of the reserved program 1510 is started at the scheduled starting time 1501, and several minutes before the scheduled ending time 1502, the timer reservation section 104 in the integrated receiver/decoder 100a acquires the latest new program guide and checks whether or not the program 1510 ends at the scheduled time point 1502. The timer reservation section 104 can alternatively be configured to acquire a new program guide at regular time intervals.

In the case where the program 1510 ends at the scheduled time, the recording of the program is ended with the arrival of the scheduled ending time 1502 in cooperation with the recording device 110.

In the case where the program 1510 such as a live sport casting is extended beyond the scheduled ending time, in contrast, the timer reservation section 104 in the integrated receiver/decoder 100a displays the screen 1600 on the monitor 120 or otherwise notifies the operator. Upon designation of the selection item 1601 on the screen 1600, the timer reservation section 104 in the integrated receiver/decoder 100a deletes the reservation data 200 for the reserved program 1520 and transmits a request for deleting the reservation data 200 for the reserved program 1520 to the timer reservation section 114 in the recording device 110.

The reserved program 1510 is monitored to the end, and as soon as it ends, the fact is transmitted to the timer reservation section 114 in the recording device 110. The timer reservation section 114 in the recording device 110 deletes the reservation data 300 for the reserved program 1520 stored in the reservation data management section 115. The recording thus is continued until the end of the program is notified from the integrated receiver/decoder 100a. Upon designation of the selection item 1602, the operator is required to determine whether the reserved program 1520 is to be recorded midway or which program is given priority.

As seen from above, an unexpected requirement that may occur to extend the broadcasting time for a given program can be flexibly met. In the example described above, the operator is notified to delete the reservation data 200. As an alternative, the reservation data 1510 is ranked in the order of priority in advance when it is set, and in the case of an unexpected change of the reservation data such as the extension of the broadcasting of a program, the reservation data 200 is deleted automatically by the timer reservation section in accordance with the order of priority.

In the above-mentioned system configuration, the integrated receiver/decoder 100a constitutes an input device, and the recording device 110 a related device. Instead, the opposite configuration is possible in which the recording device 110 makes up an input device while the integrated receiver/decoder 100a constitutes a related device. In the latter case, the timer reservation is designated on the recording device 110, and the reservation data are stored in the reservation data management section 115 in the recording device 110 and the reservation data management section 105 in the integrated receiver/decoder 100a. The only difference is that the reservation data 200 are managed by the reservation data management section 115 in the recording device 110 and the reservation data 300 are managed by the reservation data management section 105 in the integrated receiver/decoder 100a. The series of the processing steps are similar to those described above with reference to the preceding embodiment.

Explanation will be made about a system with various devices connected by a bus as shown in FIG. 17.

The system comprises a personal computer (PC) 1701, a DVD recording-reproducing device 1702 for reproducing or recording DVD, an MD recording-reproducing device 1703 for reproducing or recording MD, an integrated receiver/decoder 1704 for receiving the satellite broadcast programs, a VTR 1705 for reproducing or recording the magnetic tape, a cable broadcast receiver 1706 for receiving the cable broadcast programs, and a monitor 1707 such as a TV for displaying the AV data.

The devices 1701 to 1707 each have a timer reservation section. The device constituting an input device, upon receipt of a timer reservation designated by the operator, generates reservation data 200 and stores it in the timer reservation section in the input device, while at the same time requesting a related device operatively interlocked to generate reservation data 300 and store it in the timer reservation of the latter. What is required of the device making up the input device at the time of timer reservation of an intended related device, therefore, is only to inquire of the timer reservation section of the related device whether or not the related device is available for use as reserved.

FIG. 18 shows a screen 1800 for a list of reserved programs displayed when checking the integrated receiver/decoder 1704 for the timer reservation situation. The reservation data 200 managed by the timer reservation section are read out and the information on the reserved data (such as the date, the reservation time, the channel, the name of the program, and the execution function) are displayed on the screen 1800. In this system, the recording devices include the DVD 1702, the MD 1703 and the VTR 1705. In the case where the execution function is "record", the device type used for recording is displayed on the screen 1800 with reference to the related device ID 203 in the reservation data 200 as shown by 1801.

In similar fashion, the DVD 1702 can be supplied with information from the PC 1701, the integrated receiver/decoder 1704 or the cable broadcast receiver 1706. As shown in FIG. 19, therefore, when checking the timer reservation situation for the DVD 1702, the information 1901 for the devices supplying the reservation contents can be displayed on the screen 1900 with reference to the input device ID 303 in the reservation data 300.

Figure 20:
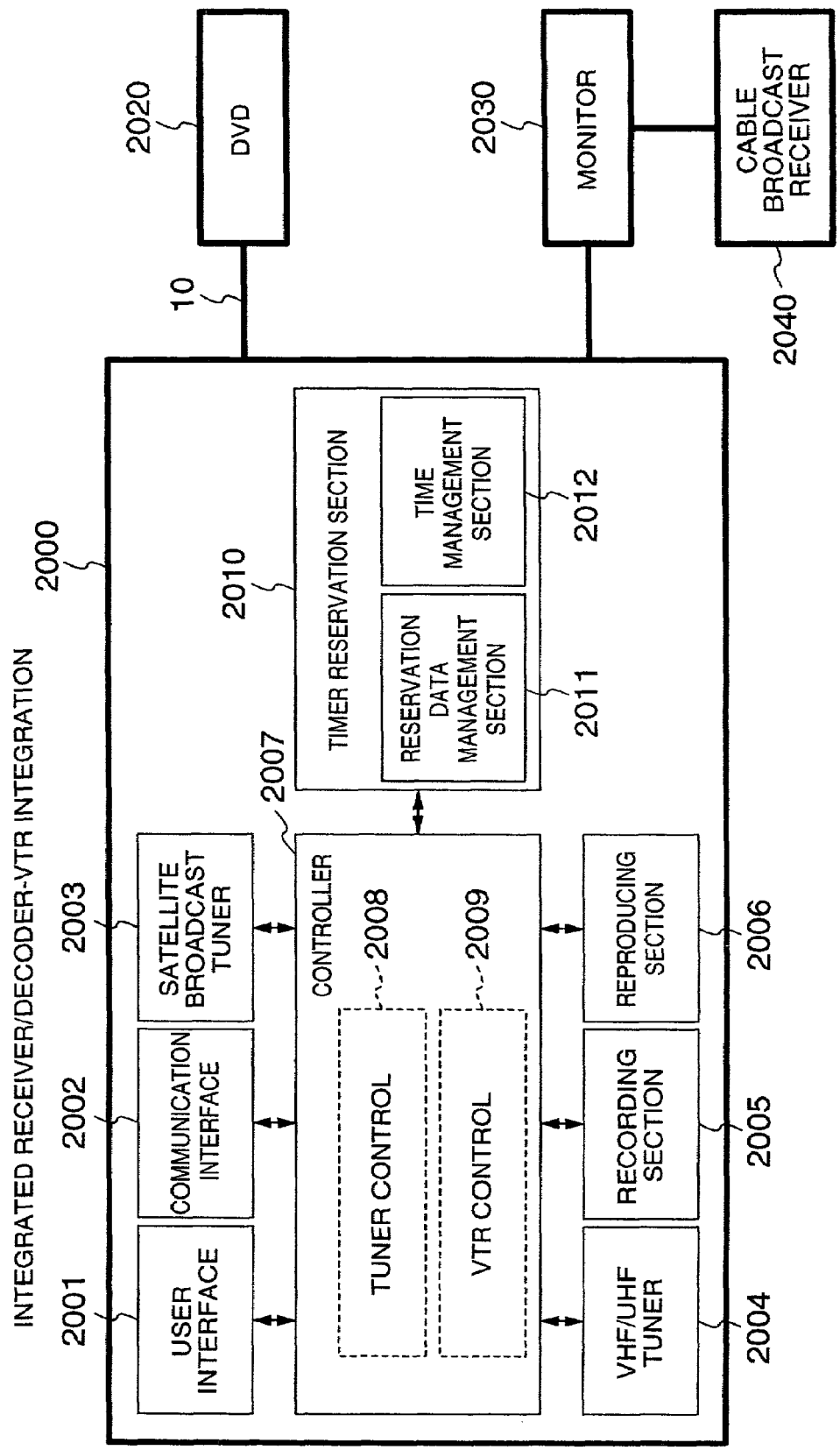
FIG. 20 shows an example configuration of an AV device system according to still another embodiment of the invention.

Further, explanation will be made about the case in which the integrated receiver/decoder and the VTR are integrated and have the function of both an input device and a related device, as shown in FIG. 20. This system comprises the integrated receiver/decoder and the VTR 2000 integrated with each other, a DVD 2020, a monitor 2030 and a cable broadcast receiver 2040.

First, reference is made to the configuration of the integrated receiver/decoder and the VTR 2000 integrated with each other. The integrated device 2000 includes a user interface section 2001 for exchanging the signals for the recording or reproduction, timer reservation and the display with the operator using an input designation device such as a remote controller or a tablet, a communication interface section 2002 for communicating data and control signals to other devices (such as the DVD 2020, the monitor 2030 and the cable broadcast receiver 2040 in this case) through a bus, a satellite broadcast tuner 2003 for receiving satellite broadcast programs, a VHF/UHF tuner 2004 for receiving the VHF/UHF broadcast signal, a recording section 2005 for recording the broadcast programs in magnetic tape or the like, a reproducing section 2006 for reproducing the AV data from the magnetic tape or reproducing a broadcast program actually on the monitor 2030, a control section 2007 for controlling the operation of each component part, and a timer reservation section 2010 for processing the timer reservation of a satellite broadcast program and a VHF/UHF broadcast program. The control section 2007 includes a tuner controller 2008 for performing the control operation for viewing a satellite broadcast program or a VHF/UHF broadcast program, and a VTR control section 2009 for performing the control operation for recording or reproducing a broadcast program. The timer reservation section 2010 includes a reservation data management section 2011 and a time management section 2012 as in the above-described case.

Figure 21:
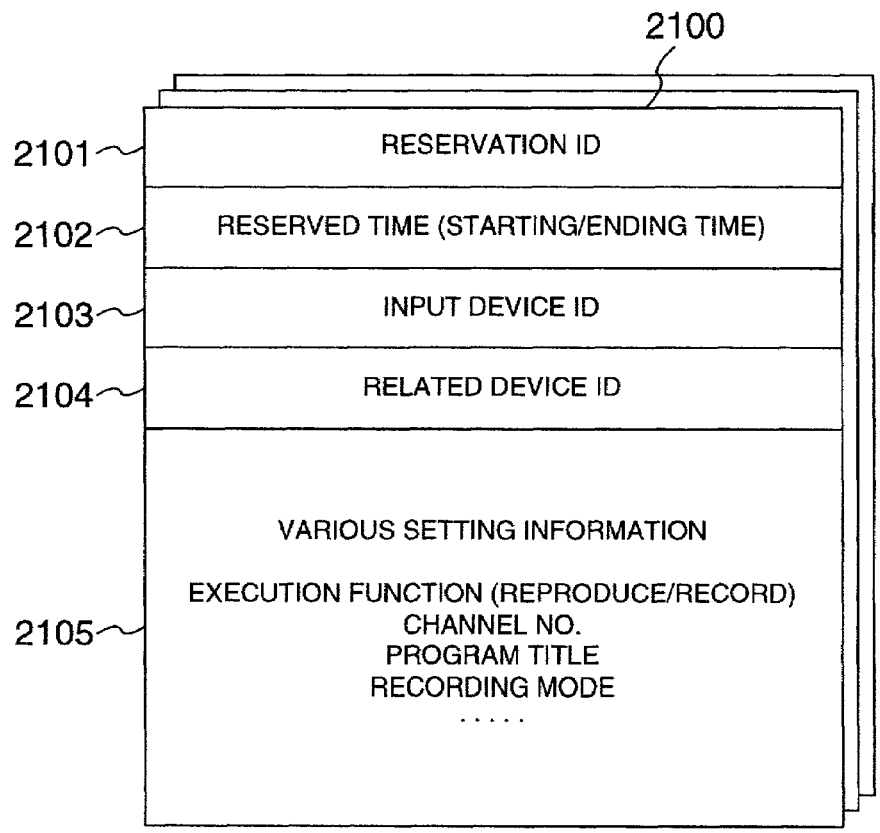
FIG. 21 shows an example configuration of the reservation data managed in each AV device.

The integrated device 2000 can operate as an input device when recording by timer a broadcast program in the DVD 2020. Also, in the case where a program received by the cable broadcast receiver 2040 is recorded by timer in the integrated device 2000, the integrated device 2000 can operate as a related device. A configuration example of the reservation data managed by the reservation data management section 2011 in the latter case is shown in FIG. 21.

The reservation data 2100 includes a reservation ID 2102, a reserved time (starting/ending time) 2102, an input device ID 2103, a related device ID 2104 and various setting information 2105.

The reservation ID 2101 is the sole identifier of the reservation data managed by the reservation data management section 2011. The reserved time 2102 is the one when the recording is required (starting/ending time).

The input device ID 2103 is the sole identifier on the bus 10 for a device accepting and executing a reservation. When recording a broadcast program by timer in the DVD 2020, an integration ID is set as the input device is the integrated device 2000. In the case where the program received by the cable broadcast receiver 2040 is recorded by timer in the integrated device 2000, the ID of the cable broadcast receiver 2040 is set as the input device is the cable broadcast receiver 2040.

The related device ID 2104 is the sole identifier on the bus 10 for a device operatively interlocked for reservation. In the case where a broadcast program is recorded by timer in the DVD 2020, ID of the DVD is set as the related device is the DVD 2020. When recording by timer a program received by the cable broadcast receiver 2040 in the integrated device 2000, on the other hand, the ID of the integrated device 2000 is set as the related device is the integrated device 2000.

The various setting information 2105 include the information required for setting and executing a timer reservation, such as the record or reproduction execution function, the channel No., the recording speed mode such as SP, LP or EP, and the analog or digital record mode.

As described above, the reservation data 2100 including the input device ID 2103 for accepting and executing the reservation and the related device ID 2104 for the device operatively interlocked are managed by the reservation data management section 2011. In this way, where the reservation is executed and which device is operatively interlocked can be grasped, thereby facilitating the timer reservation management between devices.

Now, explanation will be made about a method of reserving and executing a fee-charging program such as a satellite broadcast program more positively by timer with reference to FIGS. 22 to 42.

Figure 22:
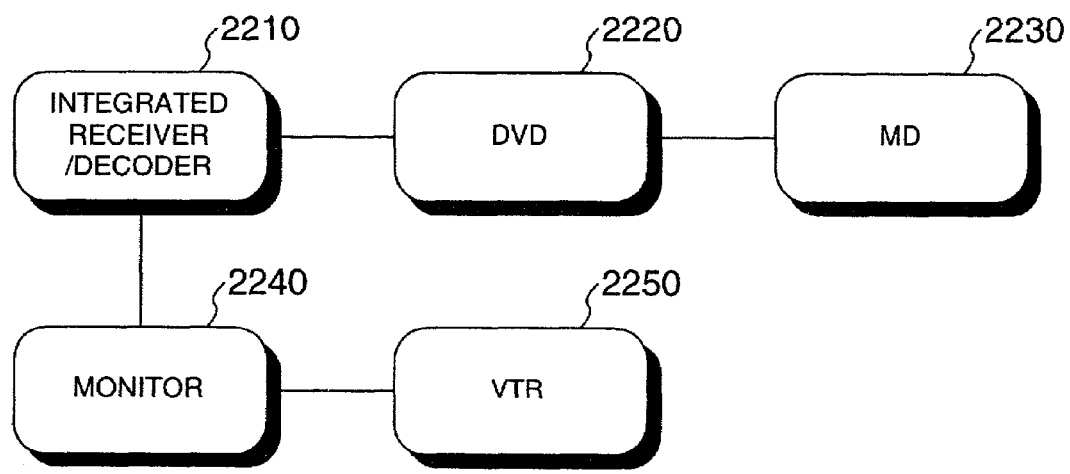
FIG. 22 shows an example configuration of an AV system according to a further embodiment of the invention.

FIG. 22 shows an example of an AV device system using this method. This system is configured of an integrated receiver/decoder 2210 for receiving satellite broadcast programs, a DVD recording-reproducing device 2220 for reproducing or recording the DVD, a MD recording-reproducing device 2230 for reproducing or recording the MD, a monitor 224 such as a TV for displaying the AV data, and a VTR 2250 for reproducing or recording the magnetic tape. The devices 2210 to 2250 each have a timer reservation section and are the same as the corresponding device of the aforementioned AV device system in that data are transmitted and received by way of the communication interface section, the control section and the timer reservation section.

This embodiment will be explained with reference to the case in which the operator designates the timer reservation screen by way of the integrated receiver/decoder 2210 constituting an input device.

Figure 23:
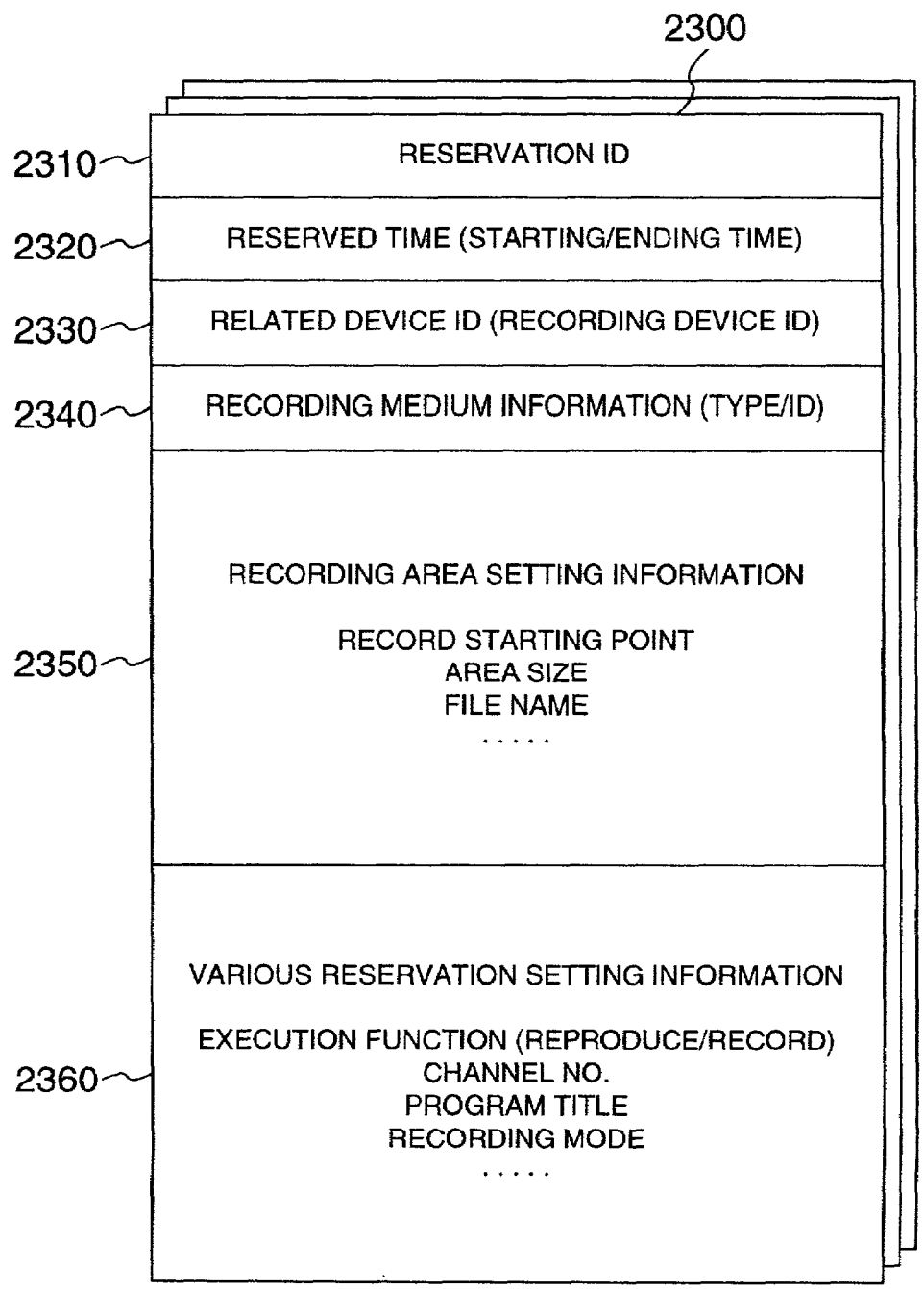
FIG. 23 shows an example configuration of the reservation data managed in an AV device making up an input device.
Figure 24:
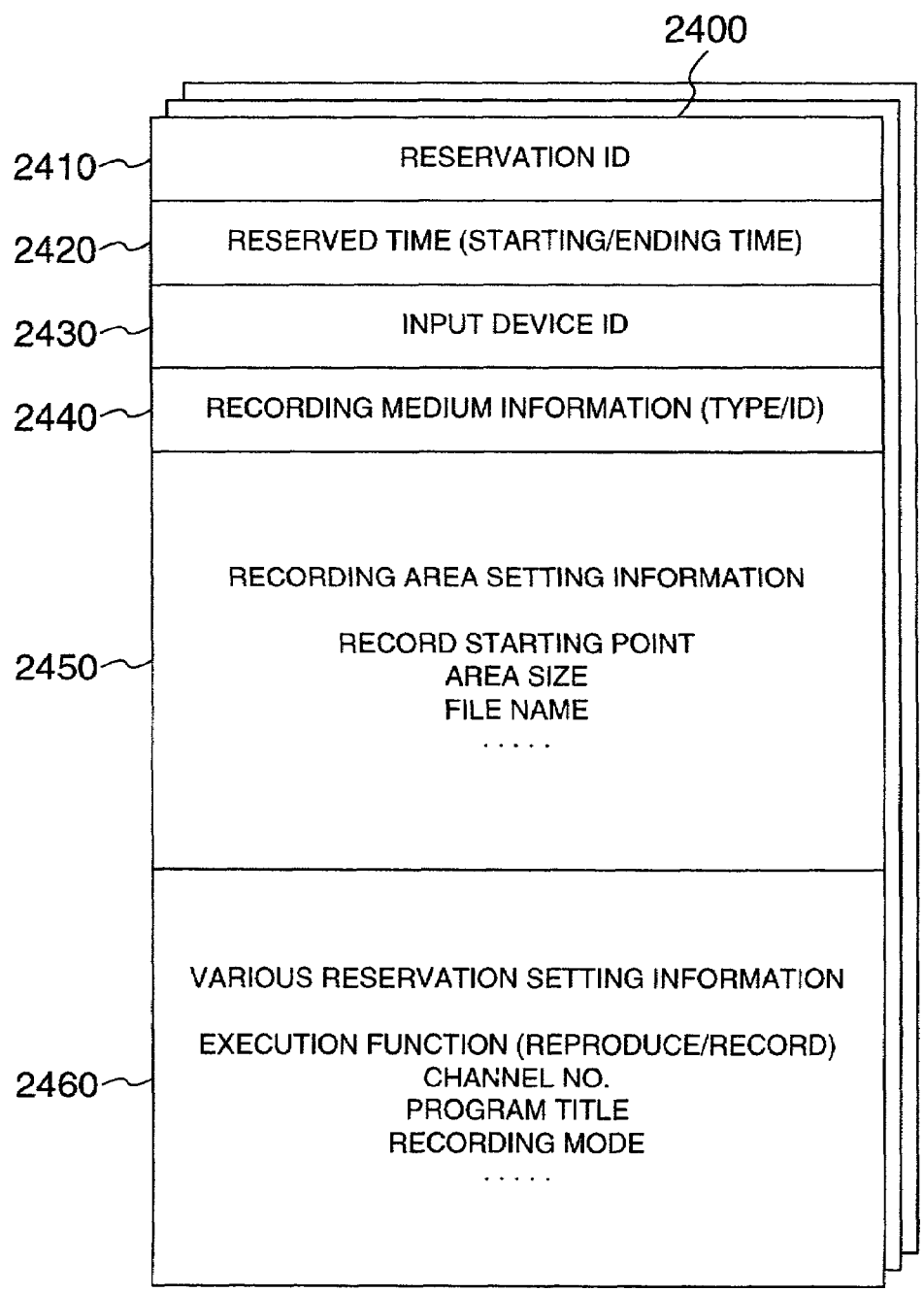
FIG. 24 shows an example configuration of the reservation data managed in an AV device making up a related device.

First, an example configuration of the record execution information managed by the input device 2210 providing the integrated receiver/decoder will be explained with reference to FIG. 23. The record execution information 2300 includes a reservation ID 2310, a reserved time (starting/ending time) 2320, a related device ID 2330, recording medium information (type/ID) 2340, various information 2350 of recording areas, and various reservation setting information 2360. These elements constitute a single reservation data.

The reservation ID 2310 is an identifier of the reservation data managed in the input device 221 providing the integrated receiver/decoder. This reservation ID 2310 is assigned a unique number based on the order of reservation setting and date/time. The reserved time 2320 is the one required of recording (starting/ending time). The related device ID 2330 is an identifier of a related device operatively interlocked for reservation execution, and in this system, is an ID of the recording device such as the DVD recording-reproducing device 2220, the MD recording-reproducing device 2230 or the VTR 2250. The recording medium information 2340 is the information on the recording medium including the type of the recording medium (such as DVD, MD, VHS tape, S-VHS tape, etc.), the identifier of individual media (such as the unique number or the serial number written in the medium). The recording area setting information 2350 is the information on the required recording area secured for recording a reserved program, such as a record starting position, an area size secured and the name of the file produced. The various setting information 2360 include the information required for the recording devices 2220, 2230, 2250 to set and execute the timer reservation such as reproduction or recording, the SP, LP or EP recording speed mode and the analog or digital recording mode.

Now, an example configuration of the record execution information managed by the recording devices 2220, 2230, 2250.

The record execution information 2400 include such data as the reservation ID 2410, the reservation time (starting/ending time) 2420, the input device ID 2430, the recording medium information (type/ID) 2440, the recording area setting information 2450 and the various setting information 2460, all of which combine to constitute a single reservation data.

The reservation ID 2410 is an identifier of the reservation data managed in the related devices 2220, 2230, 2250 providing the recording devices, and assigned a unique number such as the order of reservation setting and date/time. The reserved time 2420 is the one required of recording (starting/ending time). The input device ID 2430 is an identifier of the input device operatively interlocked for accepting and executing the reservation, which in this system is the ID of the integrated receiver/decoder 2210. The recording medium information 2440 is the information on the recording medium and is an identifier (such as a unique number or a serial number written in each medium) of the type of the recording medium (for example, the DVD, MD, VHS tape, S-VHS tape) and individual ones of such media. The recording area setting information 2450 is the information on the required recording area secured for recording a reserved program such as the record starting point, the size of the area secured and the name of the file prepared, for example. The various reservation setting information 2460 is the information required for the recording devices 2220, 2230, 2250 to set and execute a timer reservation, such as the reproduction or recording execution function, the SP, LP or EP recording speed mode and the analog or digital recording mode.

Now, explanation will be made about the steps of processing the timer-reserved recording in this system. First, the procedure performed by the integrated receiver/decoder 2210 designating a timer reservation will be explained.

First, the operator inputs the timer-reserved record designation and the reservation contents into the integrated receiver/decoder 2210 by use of an input designation device such as the remote controller or the input tablet (step 2501). The integrated receiver/decoder 2210 extracts a recording device capable of recording the program from among the devices connected on the bus 10 (step 2502). These recording devices are inquired whether the designated reserved time is available for use, and extracts any one of them available for use (step 2503). Then, these recording devices are inquired as to whether the currently-set recording medium (tape or disk) has a capacity required for recording the designated program, and extracts a recording device set with a recording medium having the recording capacity (step 2504). From among these recording devices, a related device for recording the program at the time of executing the reservation is determined (step 2505).

Figure 26:
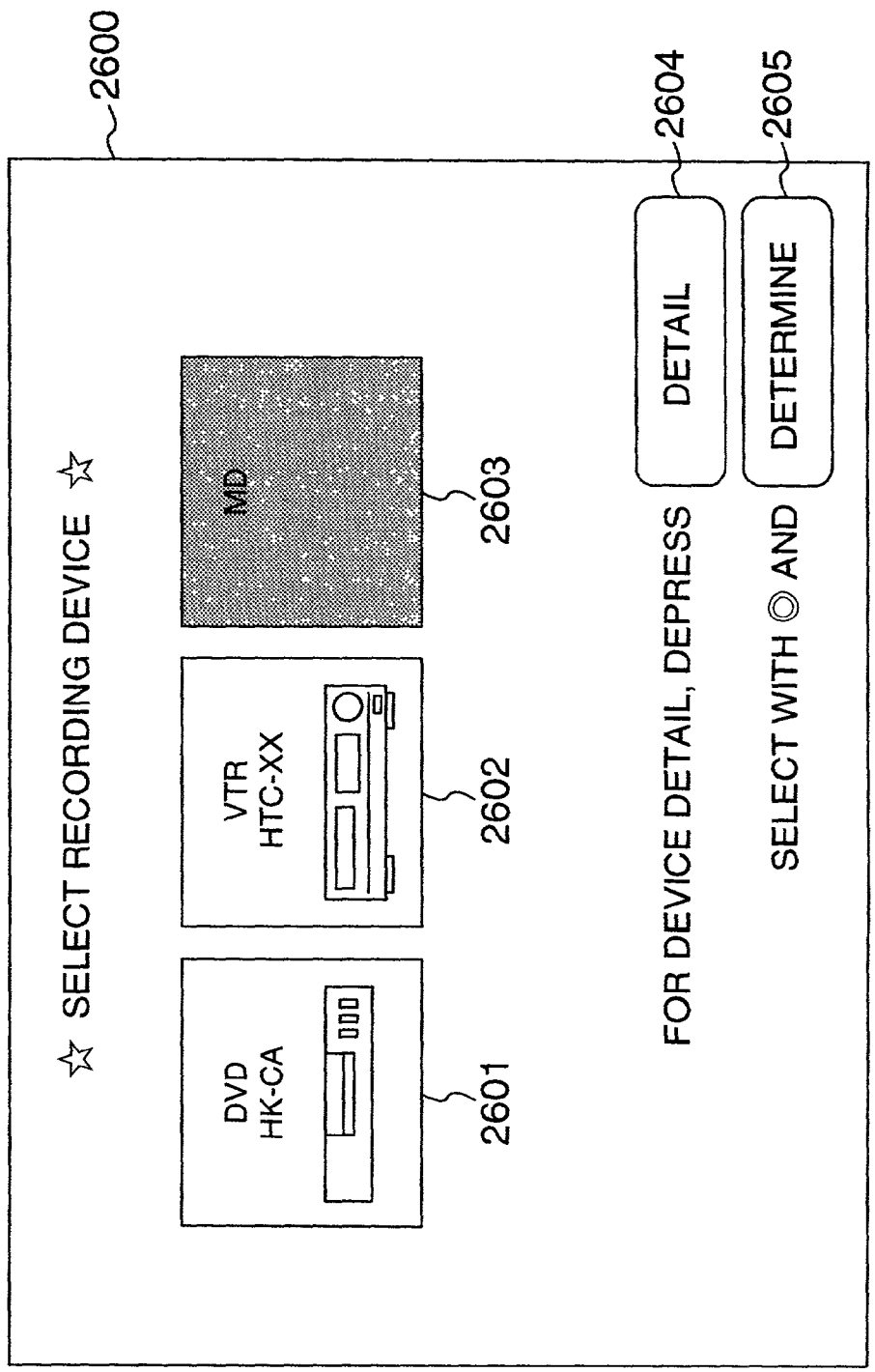
FIG. 26 shows an example screen (input device) for selecting a recording device (related device) for timer reservation processing.

FIG. 26 shows a screen example displayed on the liquid crystal screen of a monitor 2240 or a remote controller or the like as shown in FIG. 6. The information on the recording devices 2220, 2230, 2250 connected on the same bus 10 are displayed on the screen 2600. An icon 2601 shows a DVD video recording-reproducing device 2220, an icon 2602 a VTR 2250 and an icon 2603 a MD recording-reproducing device 2230. Each icon indicates whether the recording device involved can be selected. An icon for a recording device in which no recording medium is set, which fails to support the data format of the program to be recorded or which is currently locked, for example, cannot be selected and is displayed in half-brightness or in gray on the screen 2600. The icon 2603 of the MD audio recording-reproducing device 2230 on the screen 2600 is an example. Alternatively, such an icon 2603 can be arranged not to be on display.

An icon is selected using a direction indicator 602 of the remote controller 600 on the screen 2600, and "DETAIL" is designated by the detail indicator 603 of the remote controller 600 (guideline 2604 on the screen). Then, the information on the recording device corresponding to the selected icon is displayed.

Figure 27:
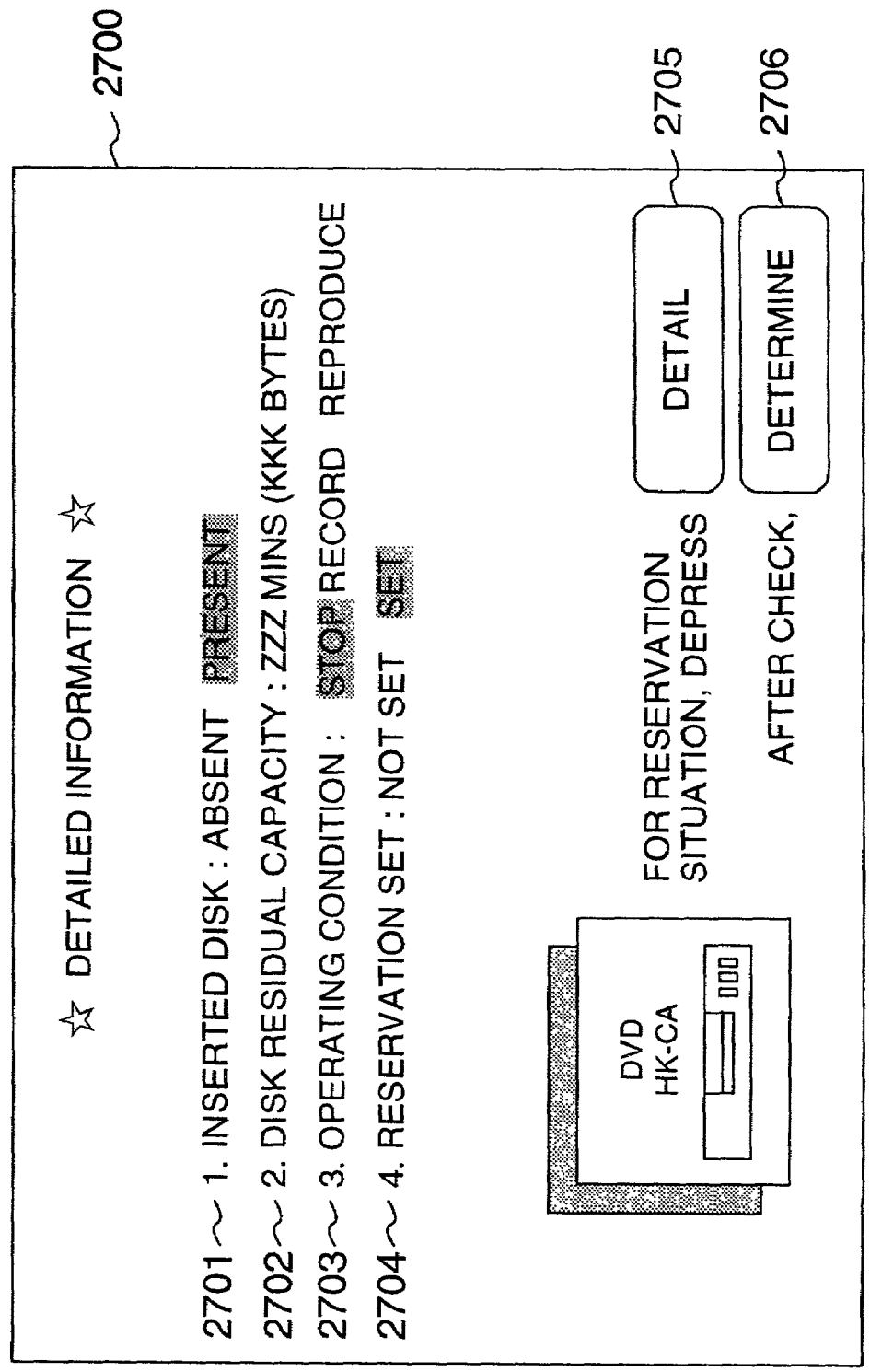
FIG. 27 shows an example screen for displaying detailed information of a recording device (related device) for timer reservation processing.

FIG. 27 shows the screen 2700 for displaying the information on the DVD recording-reproducing device 2220 displayed when the icon 2601 is selected. An insertion disk item 2701 indicating whether the DVD is set or not, a disk residual capacity item 2702 indicating the residual capacity of the DVD, an operating condition item 2703 indicating the current operating condition of the DVD recording-reproducing device 2220 and a reservation setting item 2704 indicating whether other program is reserved by timer or not. When the detail indicator 603 of the remote controller 600 indicates t"DETAIL" (the guideline 2705 on the screen), the screen indicating a list of timer-reserved programs set in the DVD recording-reproducing device 2220 is displayed.

Figure 28:
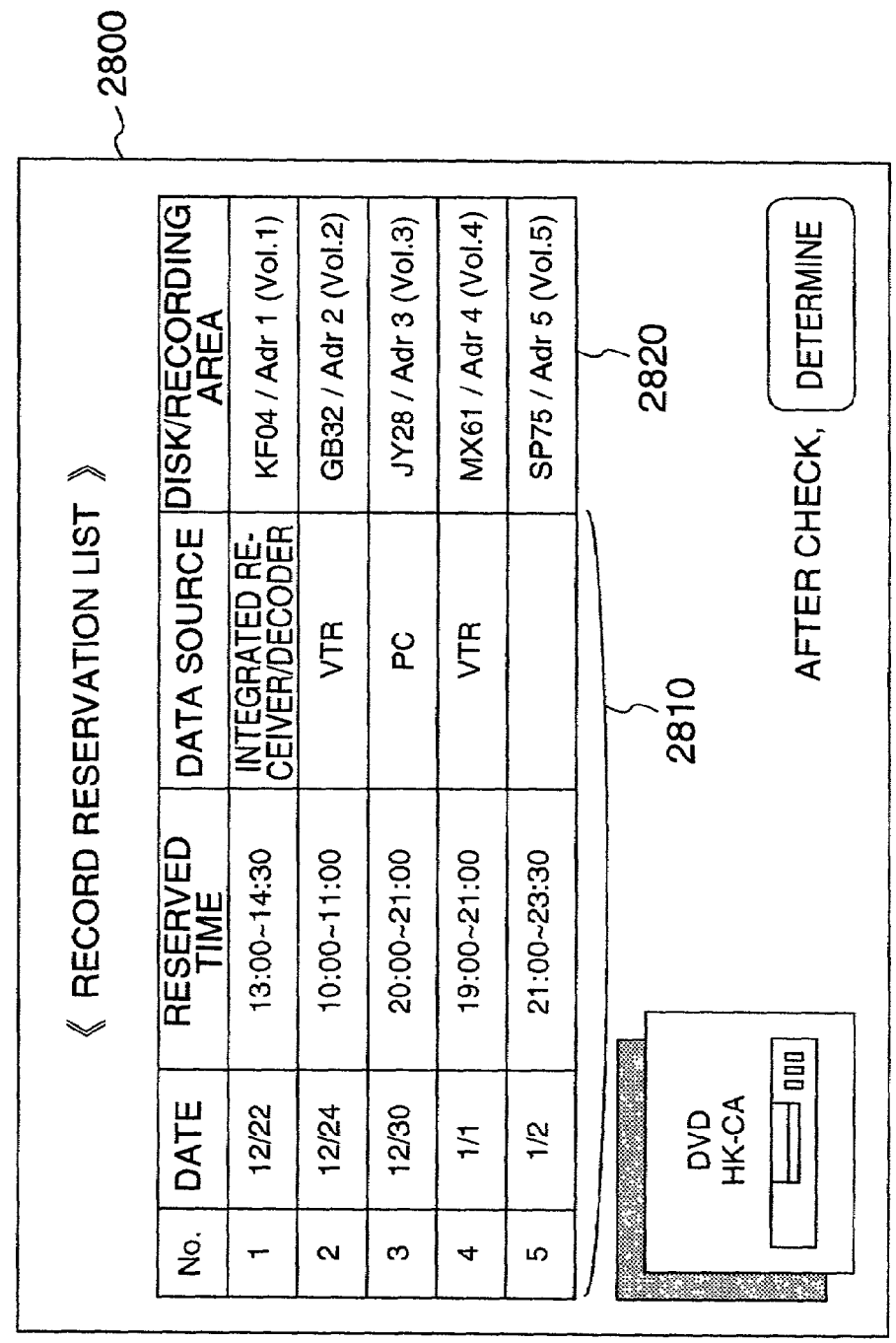
FIG. 28 shows an example screen for displaying a list of programs that have been reserved by timer.

FIG. 28 shows an example of this screen. The data 2810 on the reserved date and time and the input device and the data 2820 on the recording area secured for each reservation are displayed on the screen 2800 with reference to the reservation data that have been set. The data 2820 include the unique number used for identifying the DVD with the recording area secured therein, the address indicating the starting point and the size of the recording area. The unique number for identifying the DVD includes the number written at the time of manufacture or formatting or the password written at the time of reservation setting. Upon designation of DETERMINE on the determination indicator 604 of the remote controller 600, the screen 2700 is restored.

When DETERMINE is designated on the determination indicator 604 of the remote controller 600 on the screen 2700 (the guideline 2706 on the screen), the display on the screen 2600 is restored.

Figure 29:
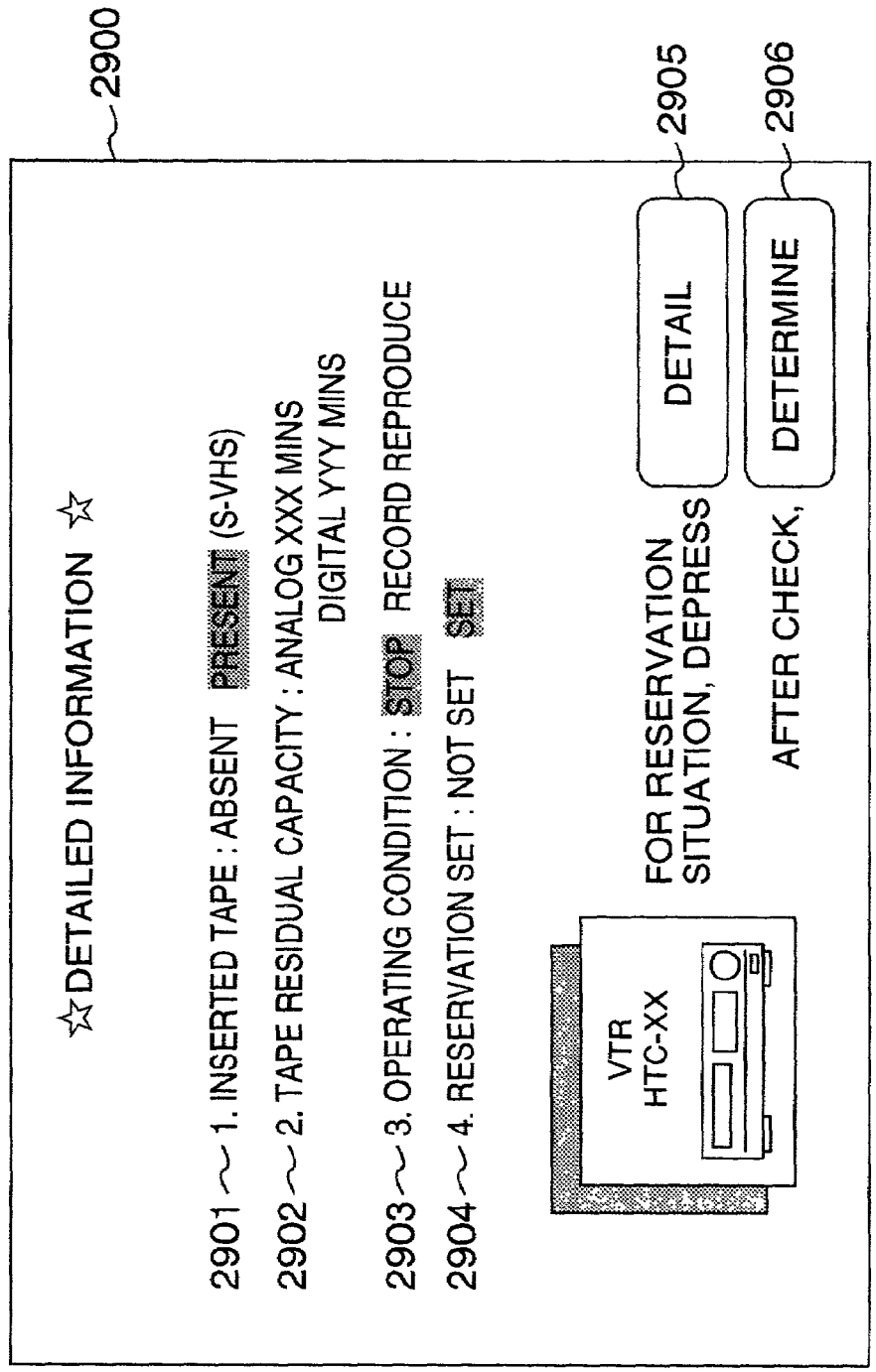
FIG. 29 shows an example screen for displaying detailed information of a recording device (related device) for timer reservation processing.

FIG. 29 shows the screen 2900 for displaying the information on the VTR 2250 displayed upon selection of an icon 2602. The information including an insertion tape item 2901 indicating whether the tape is set or not, a tape residual capacity item 2902 indicating the residual capacity of the tape, an operating condition item 2903 indicating the current operating condition of the VTR 2250 and a reservation setting item 2904 indicating whether other timer reservations are set or not. When DETAIL is designated on the detail indicator 603 of the remote controller 600 (the guideline 2905 on the screen), a list of timer-reserved programs set in the VTR 2250 is displayed.

Figure 30:
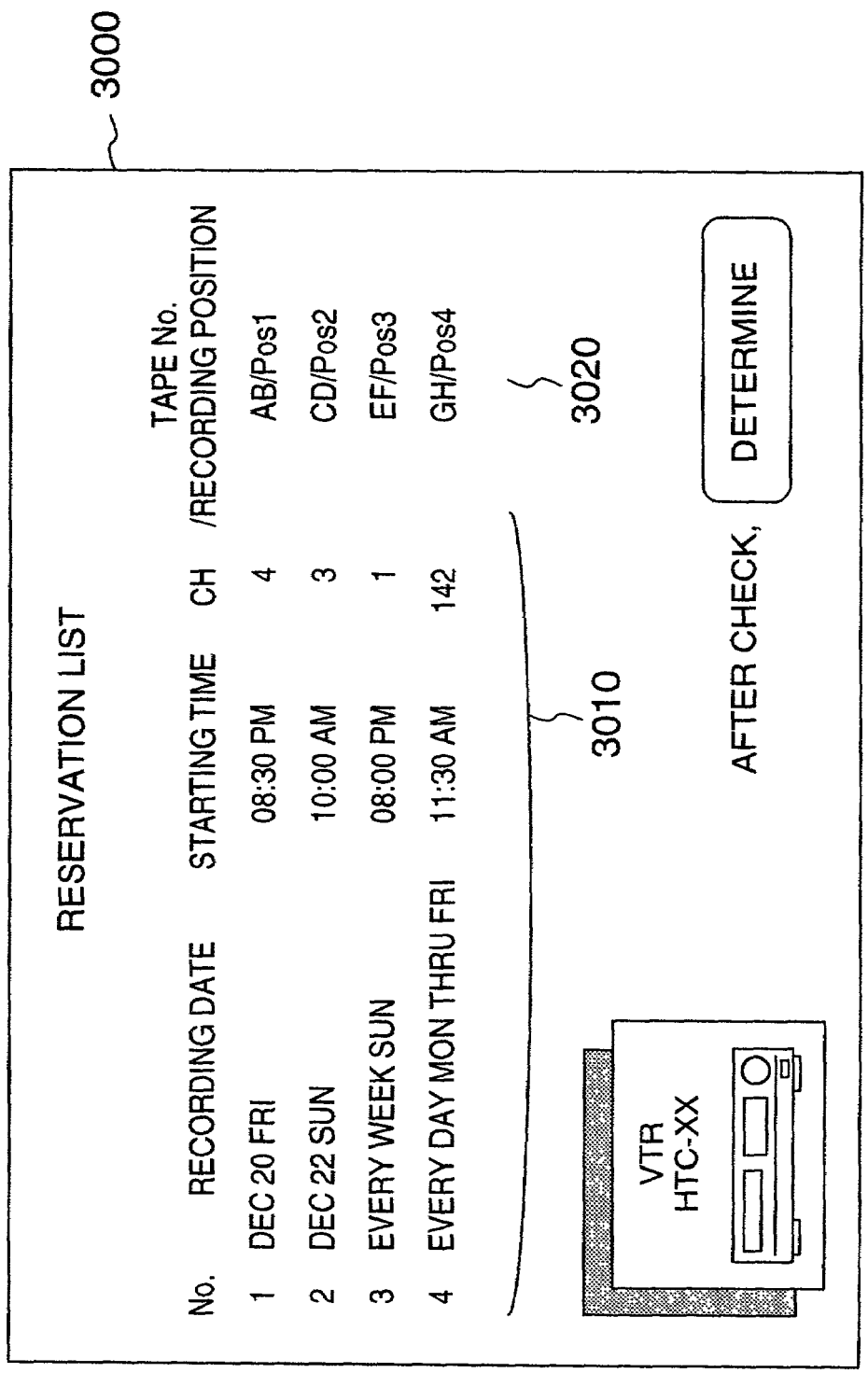
FIG. 30 shows an example screen for displaying a list of programs that have been reserved by timer.

FIG. 30 shows an example screen. The data 3010 on the reserved date and time, the input device and the channel and the data 3020 on the recording area secured for each reservation are displayed on the screen 3000 with reference to the reservation data already set. The data 3020 include the unique number for identifying the tape with the recording area secured therein and the address representing the starting point. The unique number for identifying the tape is the number written at a predetermined time point and a predetermined position when the tape begins to be used or the password written at the time of reservation setting. Upon designation of the determination indicator 604, the screen 2900 is restored.

When DETERMINE is designated on the determination indicator 604 of the remote controller 600 on the screen 2900 (the guideline 2906 on the screen), the screen 2600 is restored.

Upon determination of the related device for recording the reserved program in step 2505, the area required for recording in the recording medium set in the related device is secured, and the information on the particular area is acquired (step 2506). In one method for securing the recording area, the input device 2210 issues a request to the related device to secure the required recording area, and the related device, in response to the request, secures a sequential area on the recording medium set therein, and notifies the input device 221 of success or failure in so securing, the starting position of the recording area and the area size. In another method, when the input device 2210 designates the reservation screen to the related device, the related device, in response thereto, secures a sequential area on the recording medium set therein and notifies the input device 2210 of the starting point and the size of the area.

After that, the input device 2210 prepares and manages the reservation data 2300 based on the information on the contents of the reservation input in step 2502 and the recording area acquired in step 2506 (step 2507). At the same time, the input device 2210 transmits the information required for preparing the reservation data 2400 to the related device and issues a request for setting the reservation data 2400 (step 2508). The related device that has received the setting request prepares and manages the reservation data 2400.

In step 2508, the input device 2210 can alternatively prepare and transmit the reservation data 2400 to the related device, which can set and manage the data as it is. Also, once the designated reserved time and the recording medium having the capacity capable of recording are ascertained, the timer reservation can be positively accomplished. Thus, the order of steps 2503 and 2504 can of course be reversed.

Although only the recording devices in which the designated reserved time and a recording medium having the recordable capacity can be selected on the screen 2600 in step 2504, all the recording devices can be displayed and any one of them selected on the bus 10. In such a case, if a recording device is selected which has no recording medium set therein or the recording medium set is short of capacity, the warning screens as shown in FIGS. 31 and 32 are displayed.

Figure 31:
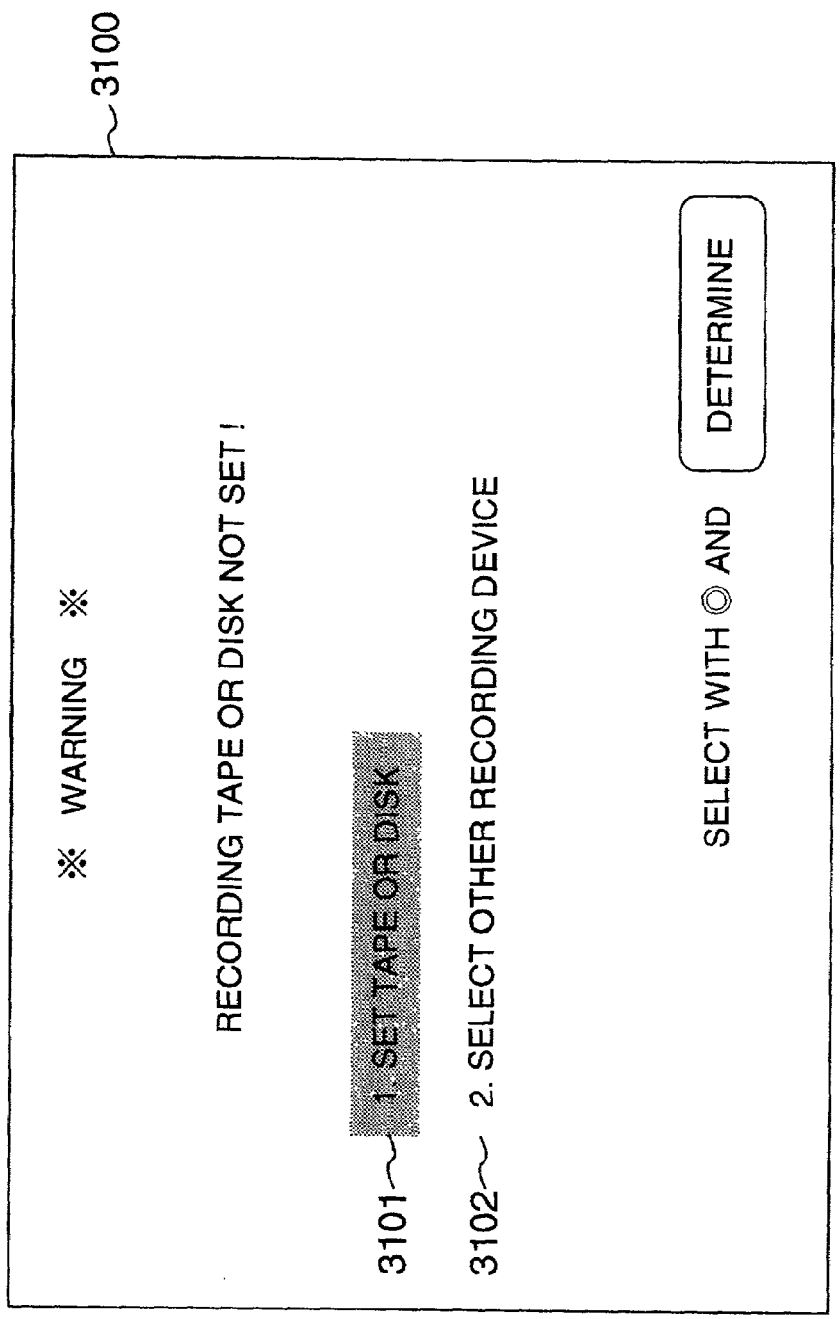
FIG. 31 shows an example screen for notifying that no recording medium is set for timer reservation processing.

In the case where no recording medium is set, the warning screen 3100 is displayed as shown in FIG. 31. The selection item 3101 prompting the operator to set the recording medium and the selection item 3102 for selecting other recording device are displayed on the screen 3100.

Assume that the operator, after setting a recording medium, designates the determination indicator 604 by selecting the selection item 3101. The capacity of the particular recording medium is checked and the process in and after step 2506 is performed. When the operator selects the selection item 3102 and designates the determination indicator 604, the screen 2600 is restored thereby making other recording devices selectable. The capacity of the recording medium is displayed in terms of the residual available time of the VTR tape previously recorded. As for the unused VTR tape, on the other hand, the residual available time may be set by the user as required.

Figure 32:
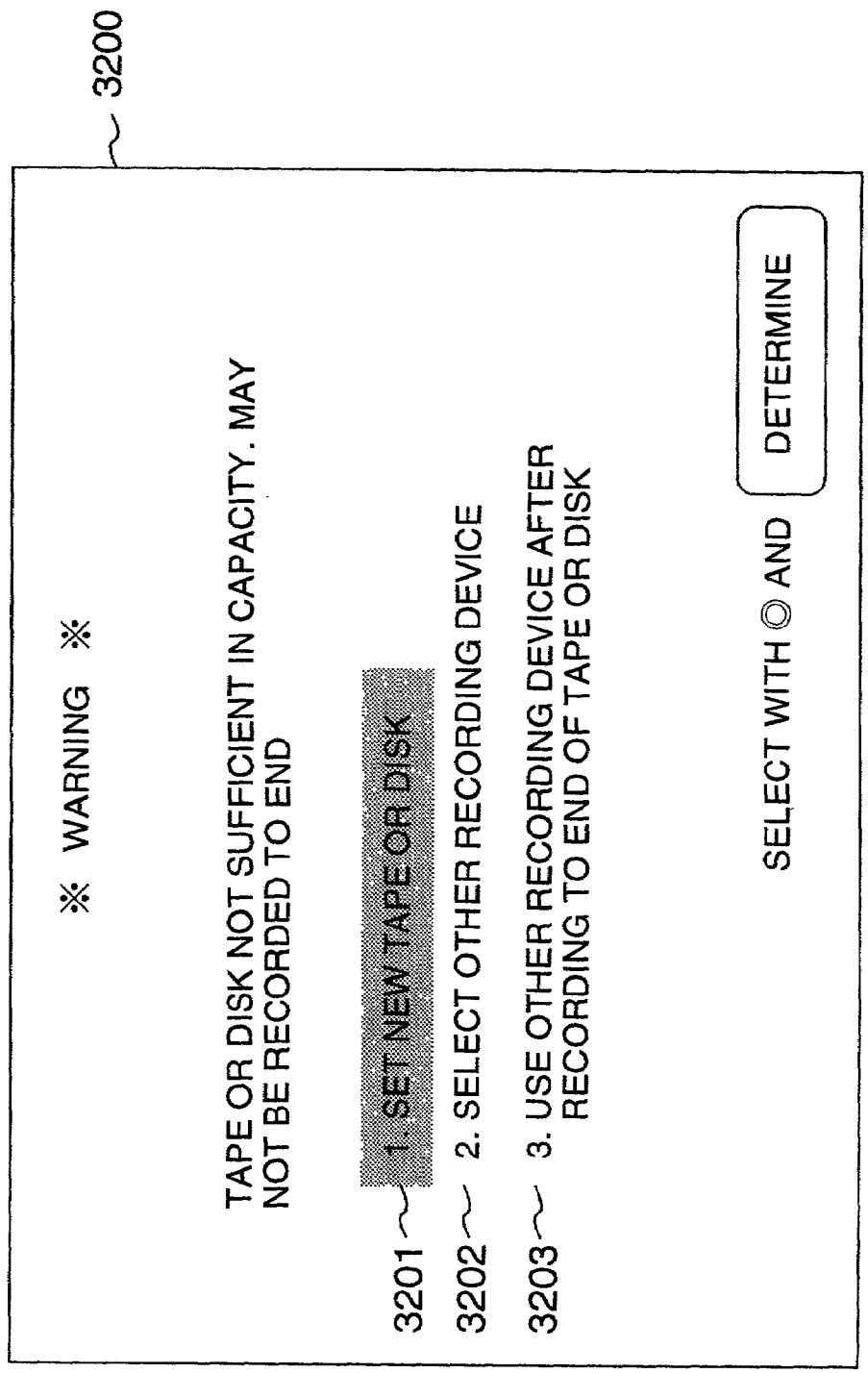
FIG. 32 shows an example screen for notifying that the capacity of the recording medium is insufficient for timer reservation processing.

In the case where the recording medium set is short of capacity, the warning screen 200 of FIG. 32 is displayed. The screen 3200 has displayed thereon a selection item 3201 for prompting the operator to set a new tape or disk, a selection item 3202 prompting the operator to select other recording device, and a selection item 3203 prompting the operator to record in other recording device after completely recording to the end of the tape or the disk.

When the operator, after setting a new recording medium, designates the determination indicator 604 by selecting the selection item 3201, the capacity of the particular recording medium is checked and the steps including and subsequent to step 2506 are executed. When the operator selects the selection item 3202 and designates the determination indicator 604, the screen 2600 is restored, thereby making other recording devices selectable.

When the operator selects the selection item 3203 and designates the determination indicator 604, the currently-set recording area of the recording medium is secured while at the same time restoring the screen 2600 thereby permitting selection of other recording devices. The operator thus selects another recording device and secures the recording area similarly in the recording medium set in the particular recording device. In this case, the data on two or more related devices are included in the related device IDs 2320, 2420, the recording medium information 2340, 2400, the recording area setting information 2350, 2450 and the various setting information 2360, 2460 in the reservation data 2300, 2400.

Figure 43:
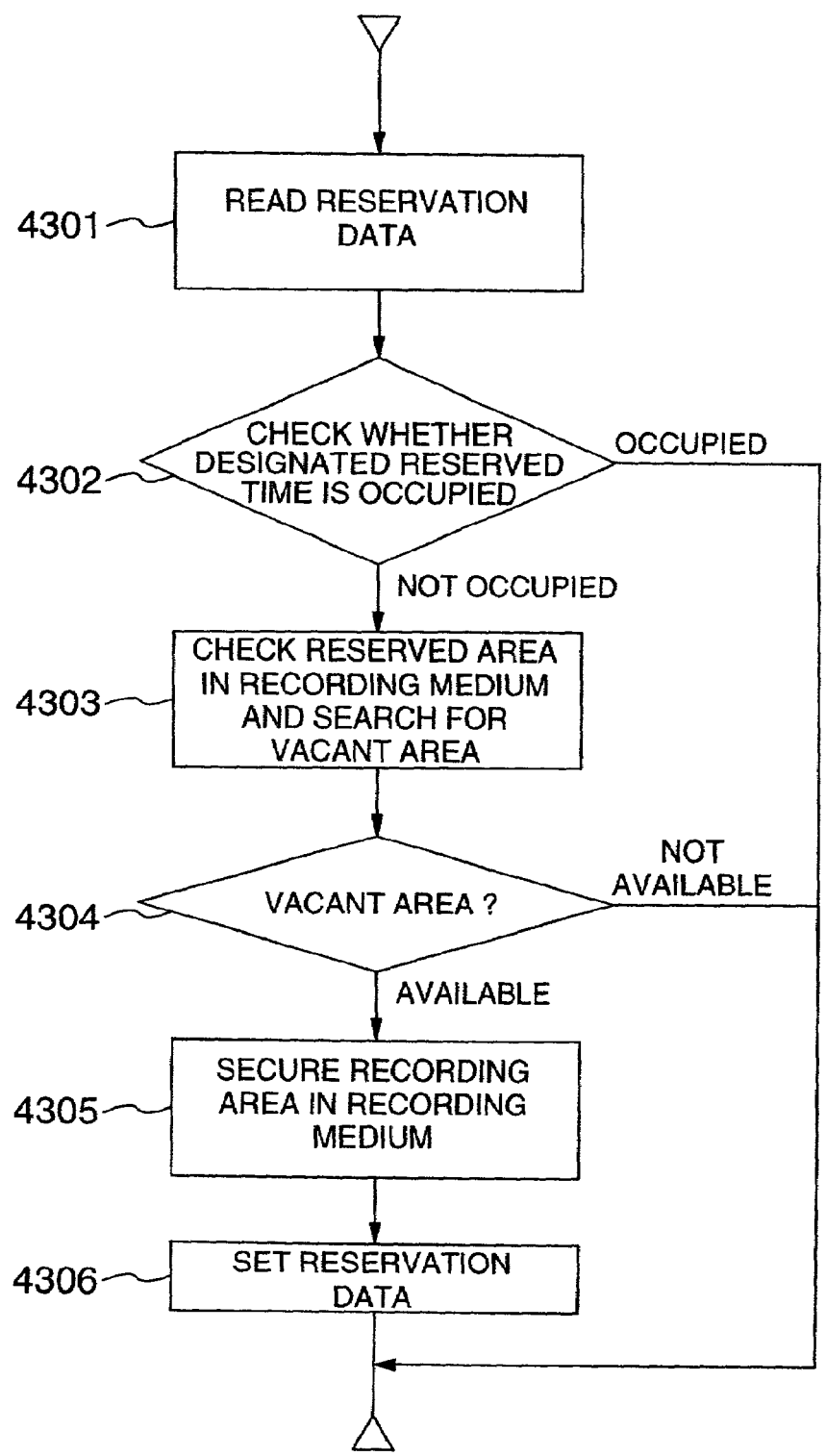
FIG. 43 is a flowchart for setting a timer reservation in a related device.

Now, the steps of processing the timer-reserved recording by the related device will be explained with reference to FIG. 43.

Figure 25:
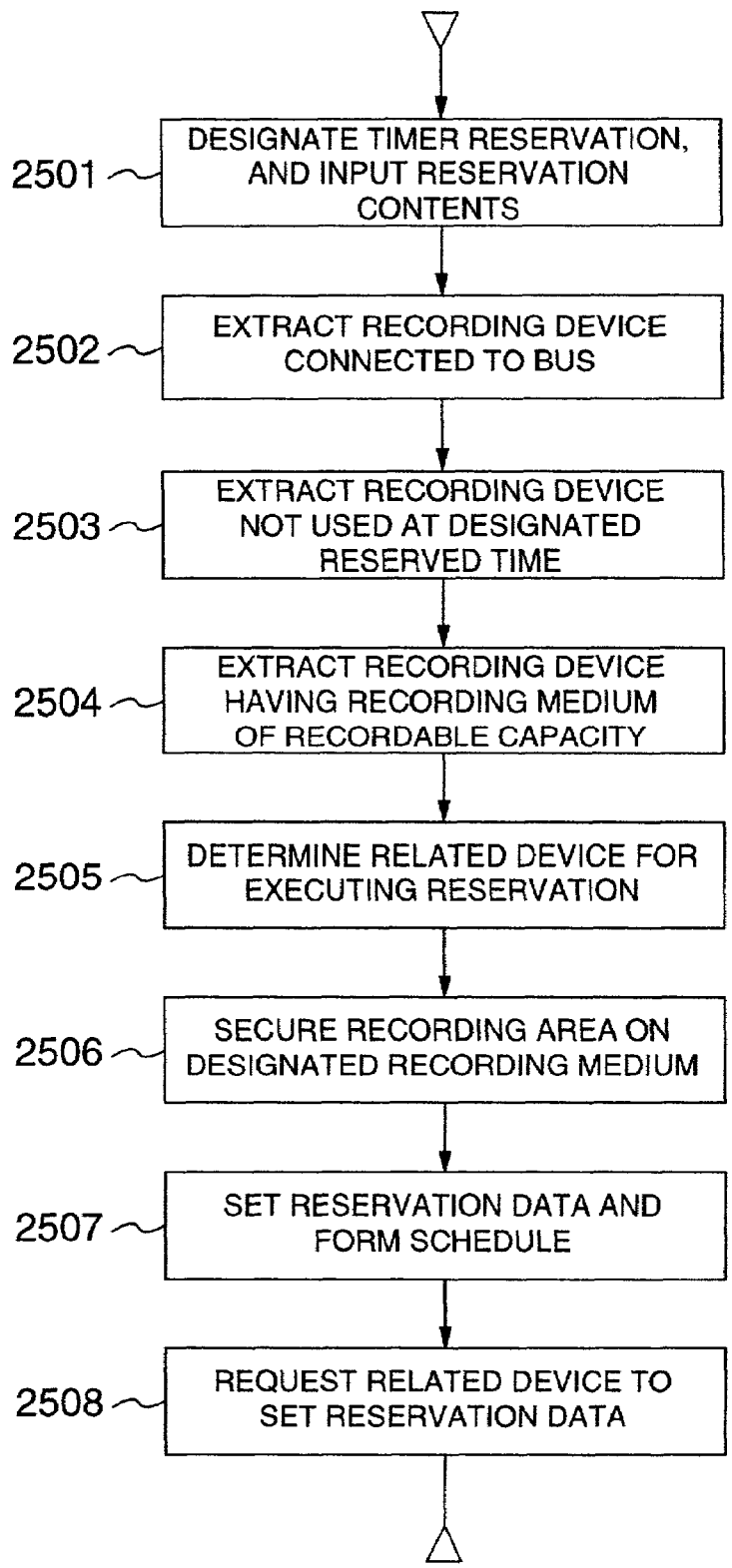
FIG. 25 is a flowchart showing the steps of setting a timer reservation.

Upon receipt of an inquiry from the input device as to whether the designated reserved time is available for use in step 2503 of FIG. 25, the related device reads the reservation data 2400 already set (step 4301), and referring to the reserved time 2420 in the reservation data 2400, checks whether or not the designated reserved time is available for use, i.e. not occupied (step 4302). If the designated reserved time is occupied, the input device is notified that the designated reserved time cannot is not available for use. Otherwise, the input device is notified of the availability of the designated time.

In step 2504, assume that the related device receives an inquiry from the input device as to whether or not the capacity required for recording the designated program is available in the currently-set recording medium. The related device searches for a vacant area in the currently-set recording medium by reference to the recording medium information 2440 and the recording area setting information 2450 in the reservation data 2400 (step 4303). The presence or absence of a vacant area is determined (step 4304). If there is any vacant area, the input device is notified that the required recording area is available. Otherwise, the input device is notified that there is no sufficient recording area.

Upon receipt of a request from the input device to secure the required recording area in step 2506, the related device secures a sequential area in the currently-set recording medium, and notifies the input device whether the required recording area has been secured or not and such other information as the starting point of the recording area and the size of the recording area (step 4305). After that, upon receipt of a request from the input device to set the reservation data, the related device prepares and manages the reservation data 2400. Alternatively, the related device that has received the reservation data 2400 prepared by the input device can set and manage as it is (step 4306).

Now, a method for securing the recording area of a recording medium in step 4305 will be explained with reference to FIGS. 33 and 34.

Figure 33:
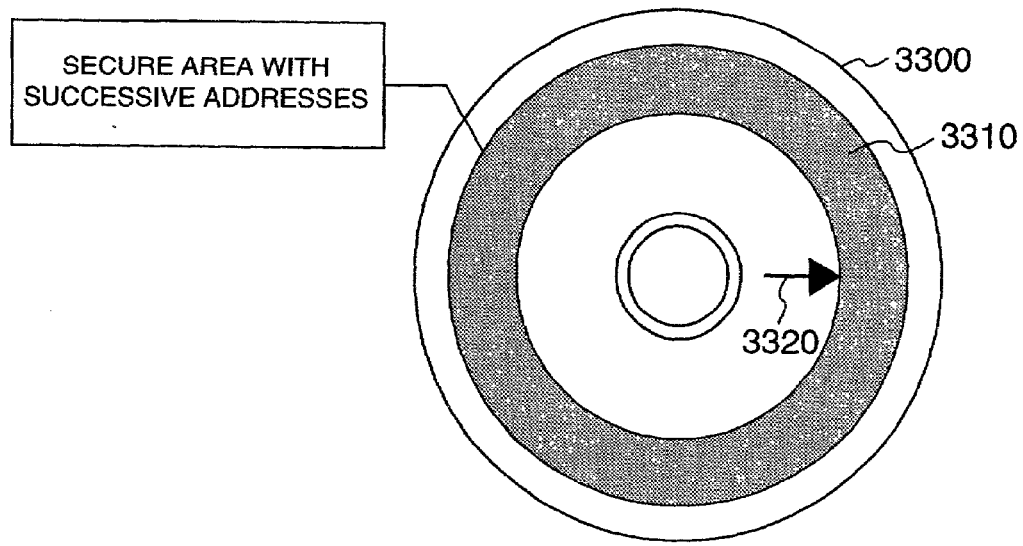
FIG. 33 shows an example configuration of a recording area secured on a recording medium (disk) for timer reservation processing.

FIG. 33 shows a recording area 3310 secured on the DVD 3300. A recording area 3310 of a capacity required for recording is secured sequentially (i.e. in such a manner as to assure successive addresses) from a record starting address 3320. In the DVD 3300, data are written in spiral form progressively outward from the inner side thereof, and therefore has more vacant areas in outward areas. At the time of reservation, therefore, outer portions are secured. Also, the required capacity is calculated from the standard transfer speed (4 Mbps for PerfecTV) of the reserved program data, the data such as the header added at the time of recording and the maximum recording speed of the DVD recording-reproducing device 2210. This is also the case with MD.

Figure 34:
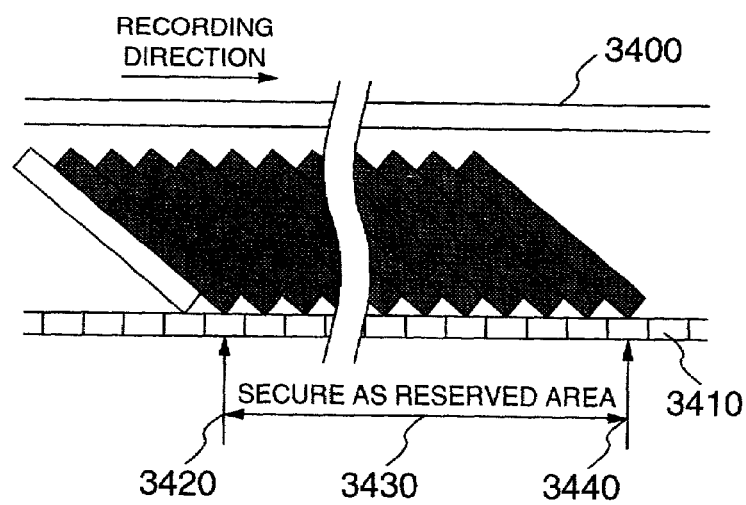
FIG. 34 shows an example configuration of a recording area secured on a recording medium (tape) for timer reservation processing.

FIG. 34 shows a recording area 3430 secured on the magnetic tape 3400. The capacity required for recording is secured continuously from the record starting point 3420 to the record ending point 3440. In the case where nothing is recorded in the magnetic tape, the record starting point 3420 and the record ending point 3440 are determined in the following manner. First, a control track 3410 of the record starting point 3420 is written at the time of reservation setting, and VISS (VHS index serial system) is set or a linear time counter value is recorded at the particular point. After reservation setting, the control track 3410 for the required capacity is written, and VISS is set or the linear counter value is recorded at the record ending point 3440. A method is also available in which the magnetic tape is formatted and the control track 3410 is written in advance. Still another method is to manage the record starting point 3420 and the record ending point 3440 using the absolute track number and the time code. The required capacity is calculated from the write speed of the magnetic tape or the tape running time calculated from the reel rotational speed.

The above-mentioned operation of the input device and the related device can assure more positive timer recording reservation and the execution of the reservation. It may happen, however, that the recording medium fails to be set or a different recording medium is set in the related device due to the operator's fault during the period from the reservation setting to the reservation execution. The processing to be executed in such a case will be explained below.

Figure 44:
FIG. 44 shows an example screen for notifying that the recording medium is not set for executing the timer reservation.

First, upon receipt of the time set for the timer-reserved recording from the time management section in the input device or the related device for which the timer servation is set, the related device checks whether a predetermined recording medium is set or not by reference to the recording medium information 2440 in the reservation data 2400 corresponding to the same reservation. In the case where the recording medium is not set, a warning screen 4400 as shown in FIG. 44 is displayed. The selection item 4401 prompting the operator to set the recording medium, the selection item 4402 for selecting other recording devices and the selection time 4403 for cancelling the reservation execution are displayed on the screen 4400.

The operator, after setting a predetermined recording medium, designates DETERMINE on the determination indicator 604 of the remote controller 600 by selecting the selection item 4401. Then, the reservation execution is continued. When the operator selects the selection item 4402 and designates DETERMINE on the determination indicator 604 of the remote controller 600, on the other hand, the screen 2600 is displayed thereby to make ready for selecting other recording devices. When the operator selects the selection item 4403 and designates DETERMINE on the determination indicator 604 of the remote controller 600, the reservation execution is cancelled. This processing will be described later with reference to FIG. 41.

Figure 45:
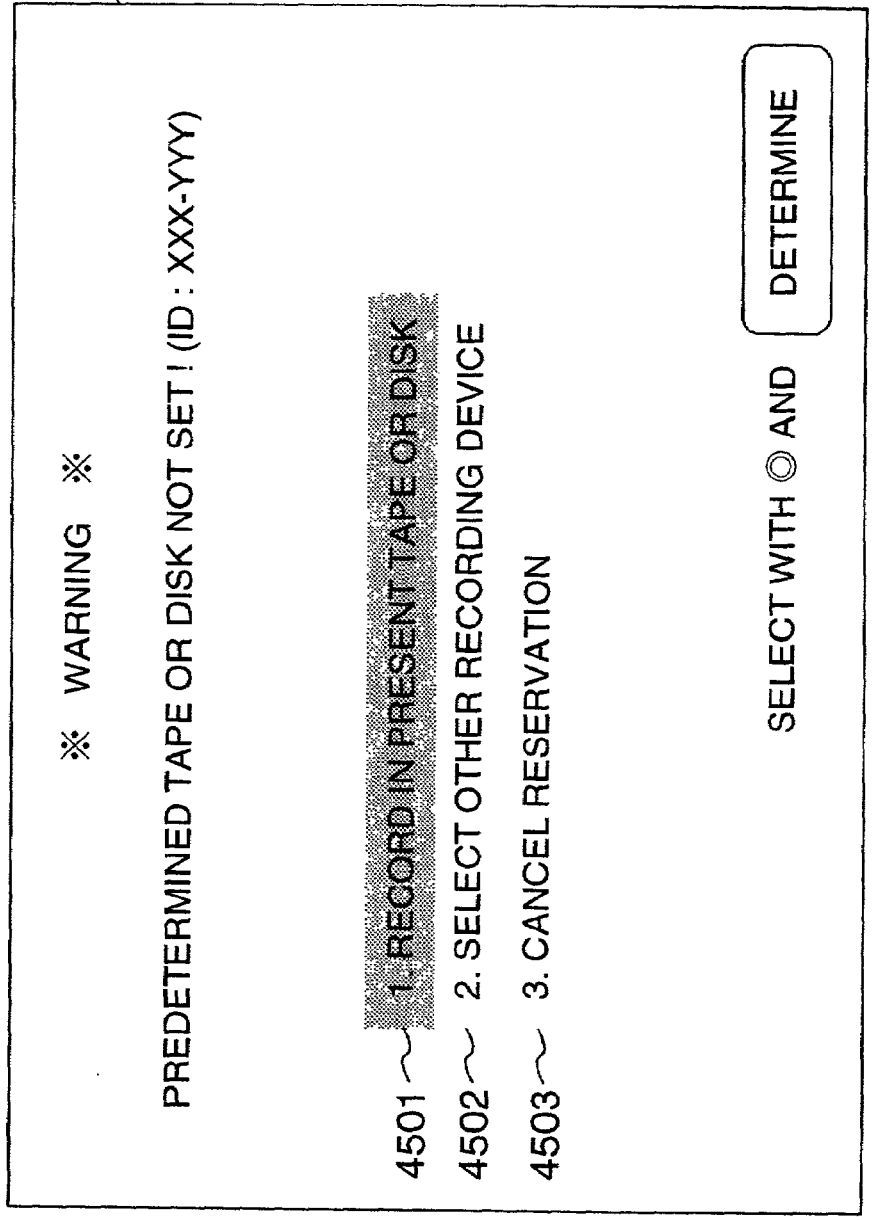
FIG. 45 shows an example screen for notifying that a predetermined recording medium is not set for executing the timer reservation.

In the case where a predetermined recording medium is not set, on the other hand, the warning screen 4500 as shown in FIG. 45 is displayed. The selection item 4501 for recording in the currently-set recording medium, the selection item 4502 for selecting other recording devices and the selection item 4503 for cancelling the reservation execution are displayed to the operator on the screen 4500.

Assume that the operator, after setting a predetermined recording medium, selects the selection item 4501 and designates DETERMINE on the determination indicator 604 of the remote controller 600. The process for reservation execution is continued. When the operator, after setting a recording medium different from the predetermined recording medium, selects the selection item 4501 and designates DETERMINE on the determination indicator 604 of the remote controller 600, on the other hand, the recording medium is checked for a required vacant area and in the presence of a required vacant area, the reservation execution is continued. In the absence of the required vacant area, on the other hand, the warning screen 3200 is displayed. In the case where the operator selects the selection item 4502 and the designates DETERMINE on the determination indicator 604 of the remote controller 600, the screen 2600 is displayed making ready for selecting other recording devices. When the operator selects the selection item 4503 and designates DETERMINE on the determination indicator 604 of the remote controller 600, the reservation execution is cancelled.

Figure 35:
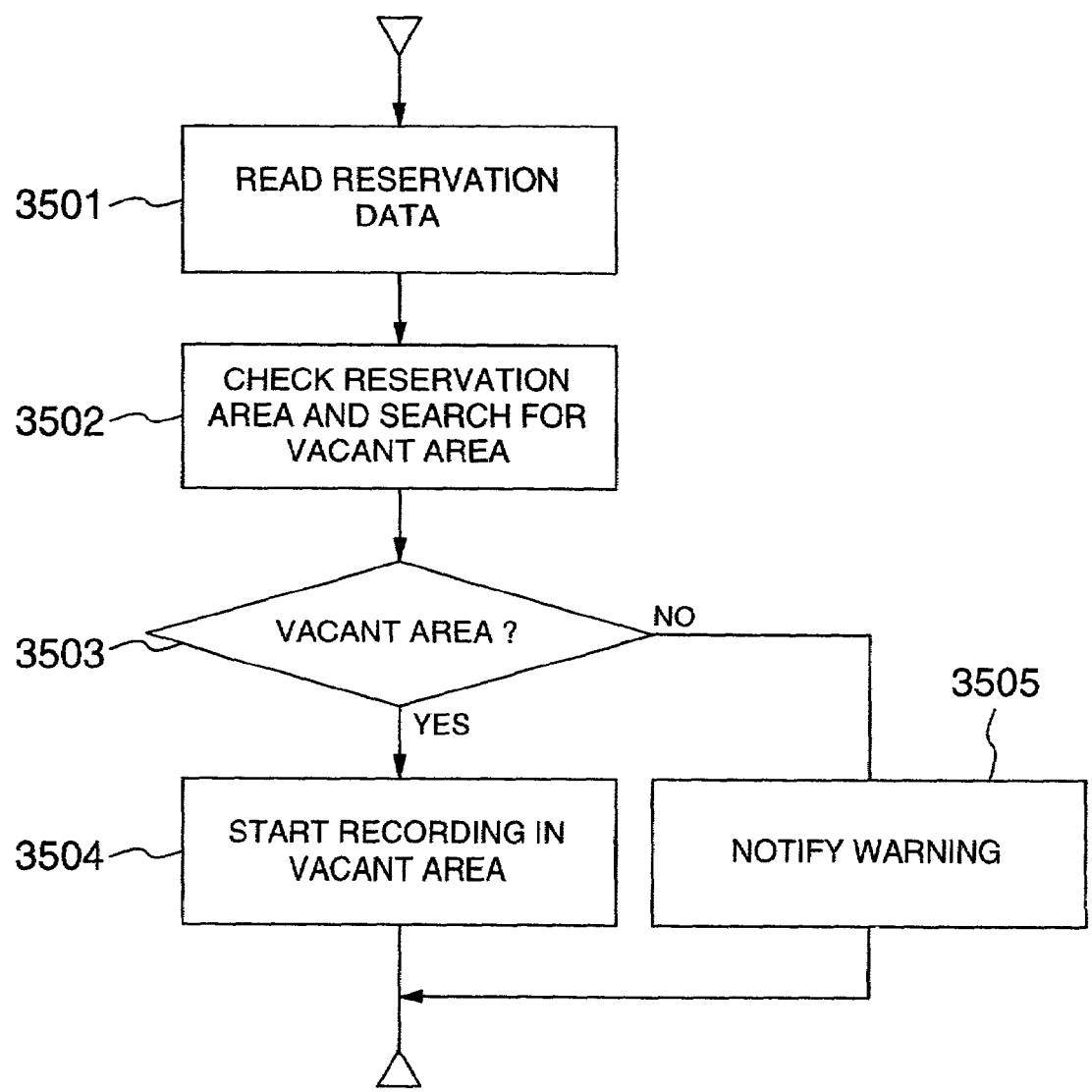
FIG. 35 is a flowchart showing the steps performed by a recording device when a recording request is issued from another device after a timer reservation is set.

Now, with reference to FIG. 35, explanation will be made about the processing performed by the related device in the case where a recording request is issued from other devices to the related device after timer reservation setting. Specific examples in FIG. 22 include the case in which the timer reservation for a satellite broadcast program is set between the integrated receiver/decoder 2210 and the VTR 2250, and after that, a request is issued from the DVD 2220 to record the contents of a movie or music in the VTR 2250.

Upon receipt of a recording request from other devices connected to the bus 10, the related device reads the reservation data 2400 already set therein (step 3501). Referring to the recording medium information 2440 and the recording area setting information 2450 in the reservation data 2400, the related device searches for a vacant area in the currently-set recording medium (step 3502). Thus the related device determines as to whether there is a vacant area or not (step 3503). If there is a vacant area, the recording request is accepted and the recording is started (step 3504). In the absence of a vacant area, on the other hand, the device that has issued the recording request and the operator are notified by displaying a warning screen or the like (step 3505).

Figure 36:
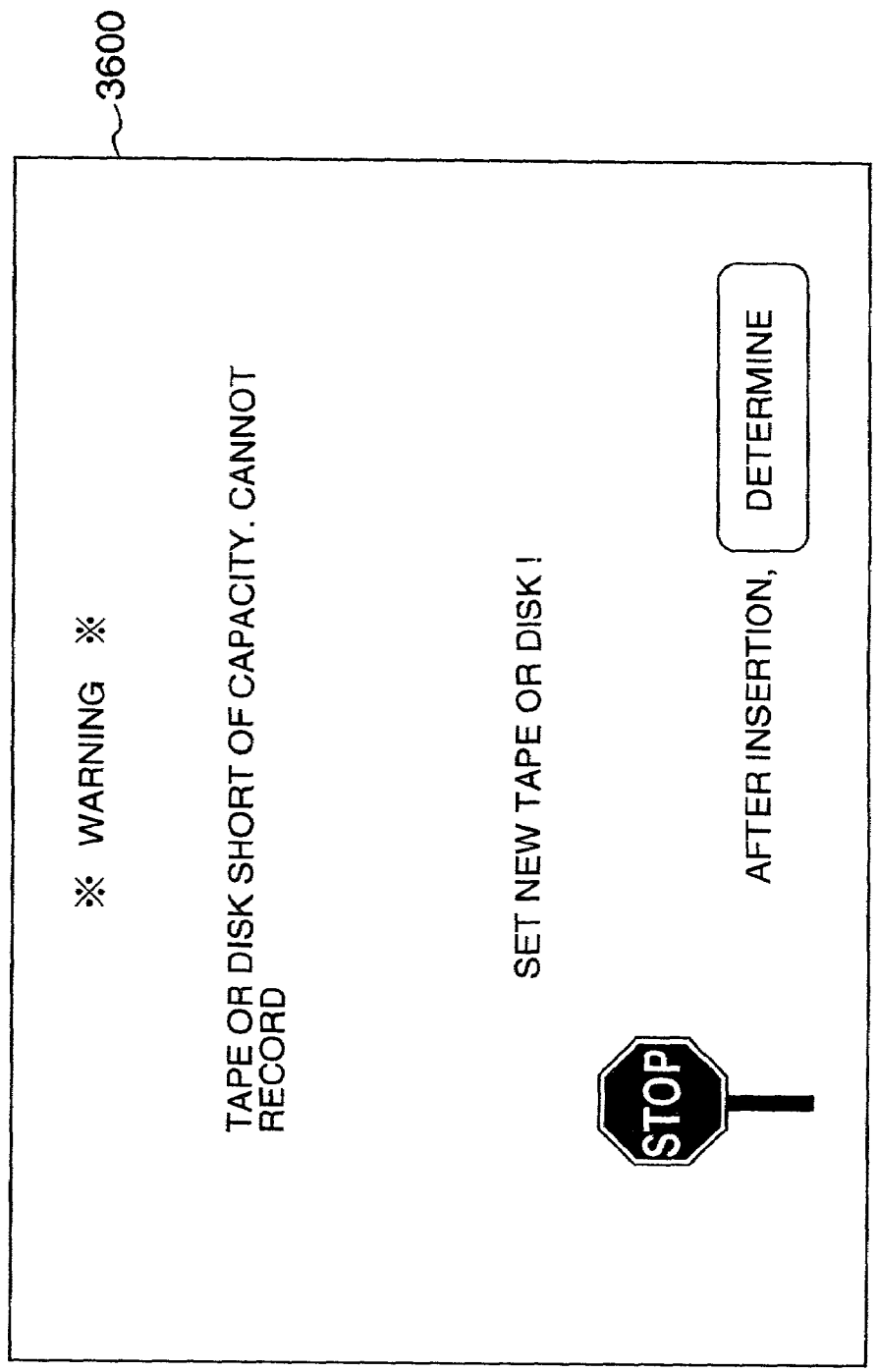
FIG. 36 shows an example screen for notifying that the capacity of the recording medium is insufficient when a recording request is issued from another device after the timer reservation is set.

FIG. 36 shows a warning screen example displayed in step 3505. The operator, after setting another recording medium, designates DETERMINE on the determination indicator 604 of the remote controller 600 on the screen 3600. The recording request is then accepted and the recording is started.

In the foregoing case, the recording request from other devices has been accepted in the presence of a vacant area. An arrangement can be made, however, in which the recording request from other devices can never be accepted in the case where a timer reservation is set. Also, the DVD recording-reproducing device 2220 can be so configured that a read request from other devices is accepted but a record request is not accepted or accepted if there is any vacant area.

Figure 37:
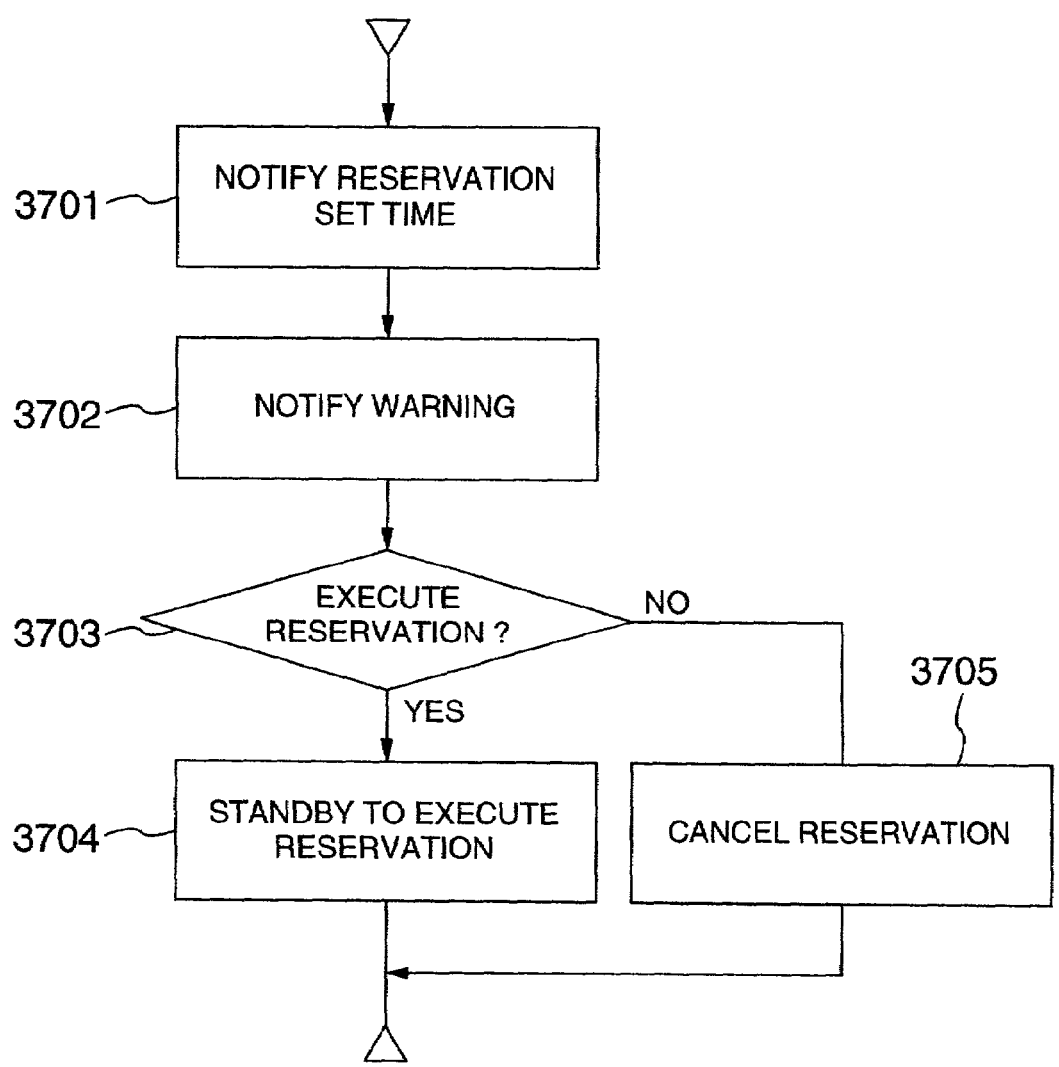
FIG. 37 is a flowchart showing the steps performed by the recording device when the reserved time set by timer has arrived during the recording or reproduction operation.

Now, with reference to FIG. 37, explanation will be made about the processing performed in the case where the timer-reserved time arrives during the recording or reproduction of the DVD recording-reproducing device 2220 (or the VTR 2250).

Figure 38:
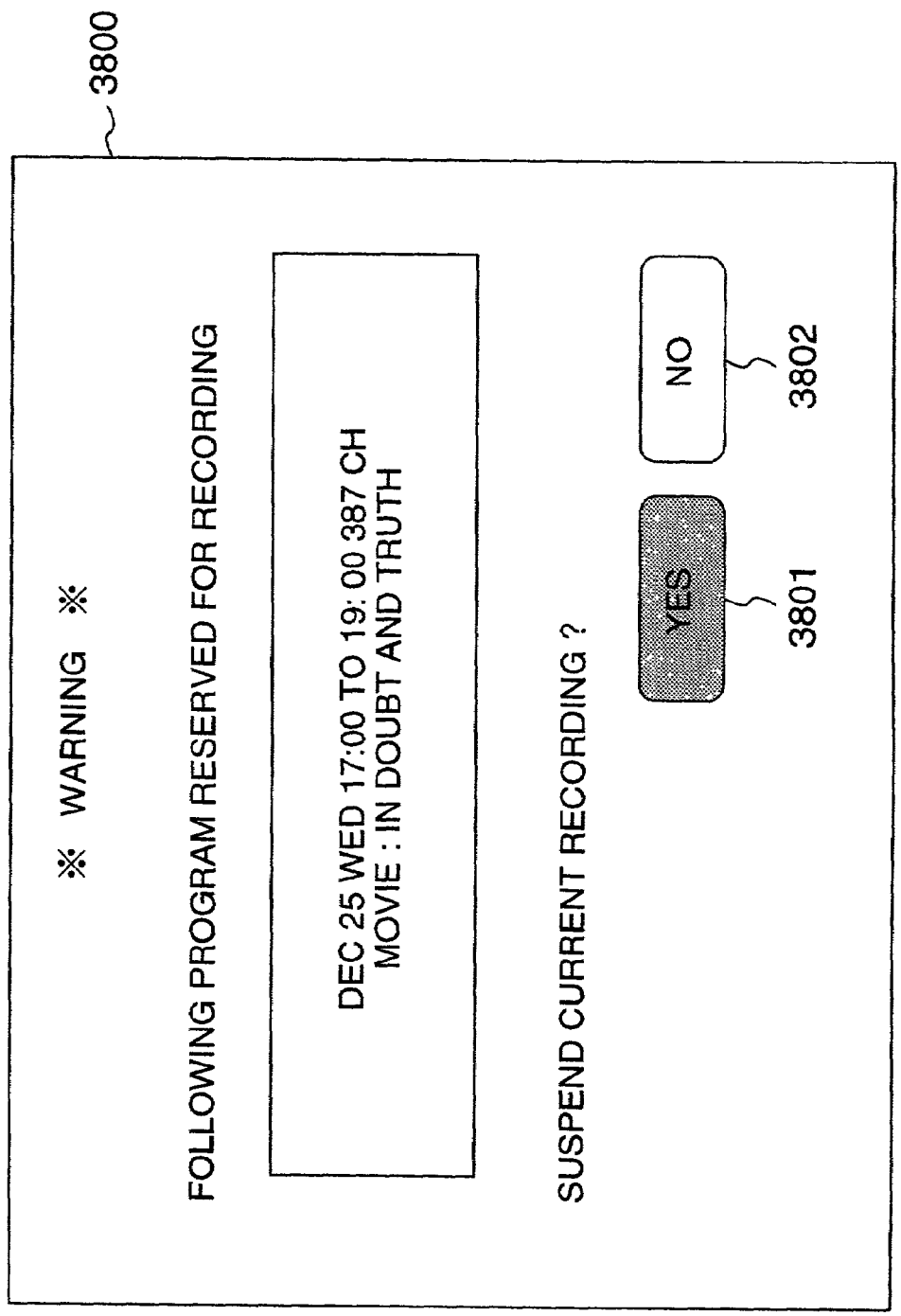
FIG. 38 shows an example screen for notifying that the current recording or reproduction is suspended in the case where the reserved time set by timer arrives during recording or reproduction.

First, the DVD recording-reproducing device 2220 (VTR 2250) is notified of the time set for the timer-reserved recording from the time management section in the input device 2210 or the DVD recording-reproducing device 2220 (VTR 2250) set for timer reservation (step 3701). The DVD recording-reproducing device 2220 (VTR 2250) then displays a warning screen or issues a sound by a buzzer or the like to the operator for determining whether or not the timer reservation set is to be executed (step 3702). FIG. 38 shows an example warning screen displayed in step 3702. The operator decides whether or not to continue the current recording operation or to execute the timer reservation on the screen 3800 (step 3703).

Figure 39:
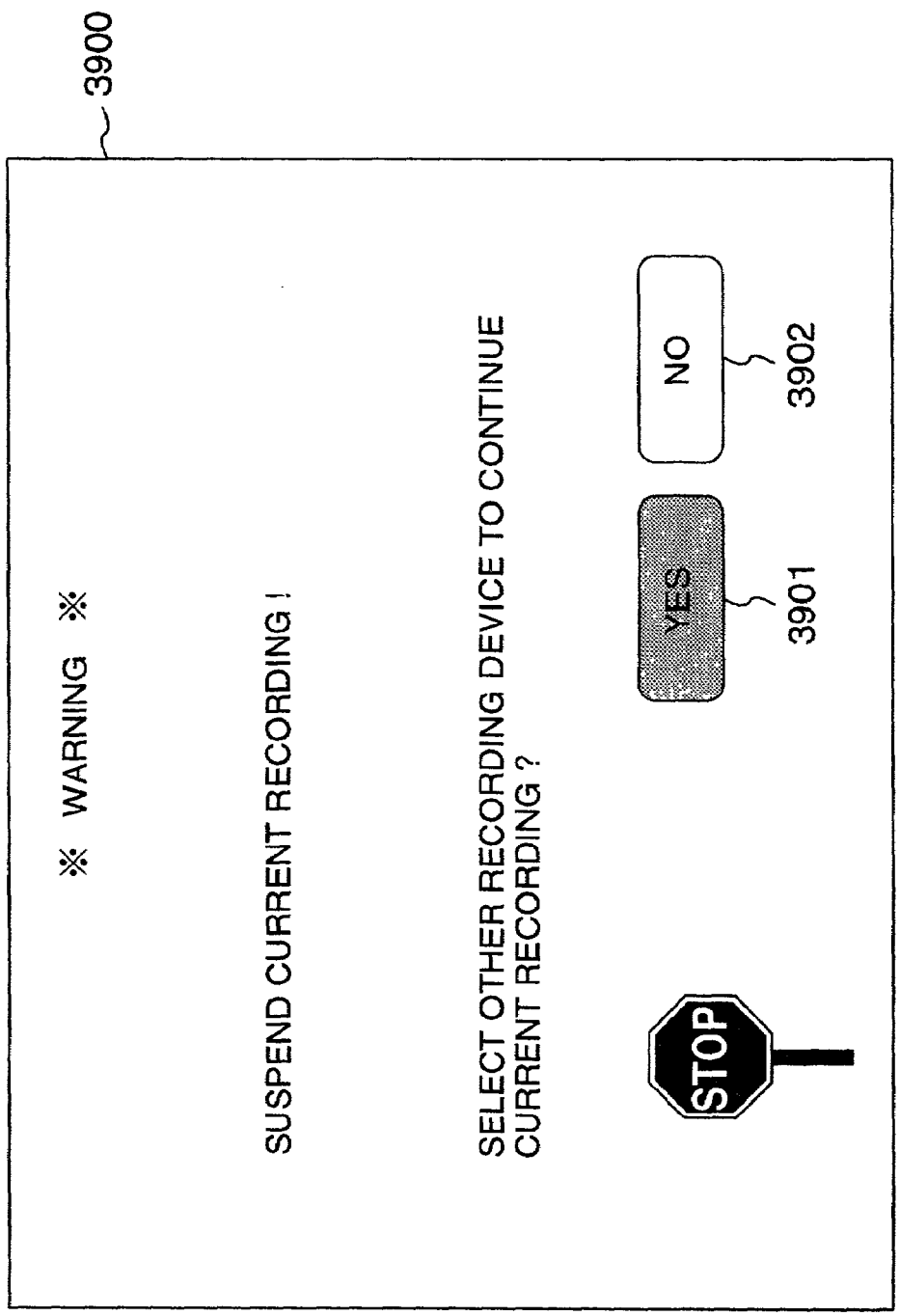
FIG. 39 shows an example screen for notifying that the current recording or reproduction is suspended in the case where the reserved time set by timer arrives during recording or reproduction.

When the operator designates the selection item 3801 on the screen 3800, the current recording is suspended and the processing required for executing the timer reservation is started (step 3704). In order to continue the current recording operation, as shown in FIG. 39, a screen for causing the operator to select other recording devices can be displayed. Upon designation of the selection item 3901 on the screen 3900, the screen 2600 is displayed and the device for continuing the recording operation is selected. When the selection item 3902 is designated, on the other hand, the current recording is suspended or other recording devices can be automatically selected.

Figure 40:
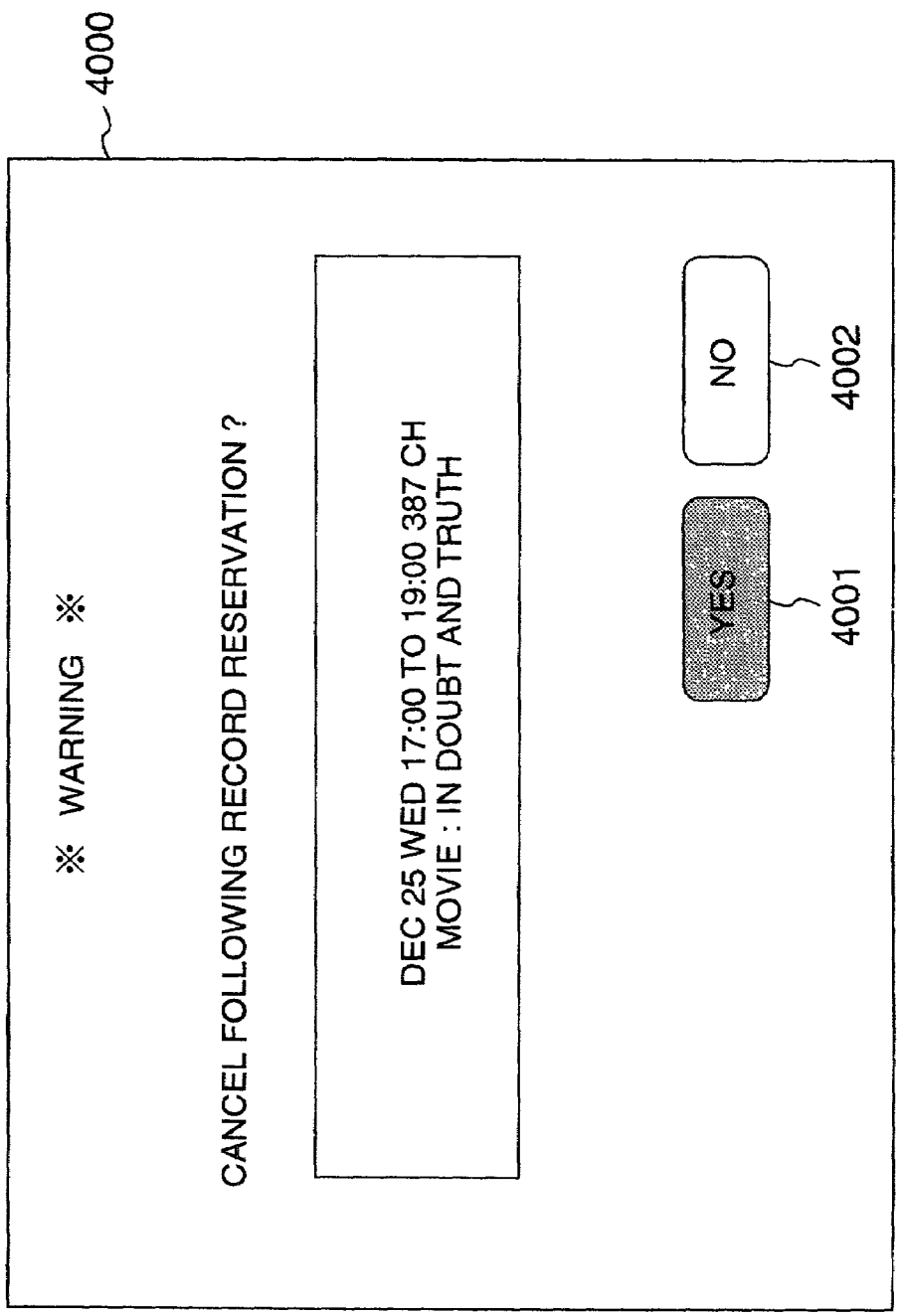
FIG. 40 shows an example screen for notifying that the reservation is cancelled in the case where the reserved time set by timer arrives during recording or reproduction.

When the operator selects the selection item 3802 on the screen 3800, the timer reservation already set is cancelled (step 3705). FIG. 40 shows an example warning screen displayed in step 3705. When the operator designates the selection item 4001 on the screen 4000, the timer reservation is cancelled. Upon designation of the selection item 4002, on the other hand, the screen 3800 is restored.

In order to execute the timer reservation in step 3705, it is also possible to display the screen allowing the operator to select other recording devices as shown in FIG. 46. When the selection item 4601 is designated on the screen 4600, the screen 2600 is displayed, and a device for executing the timer reservation is selected. Upon designation of the selection item 4602, on the other hand, the timer reservation is cancelled.

Figure 41:
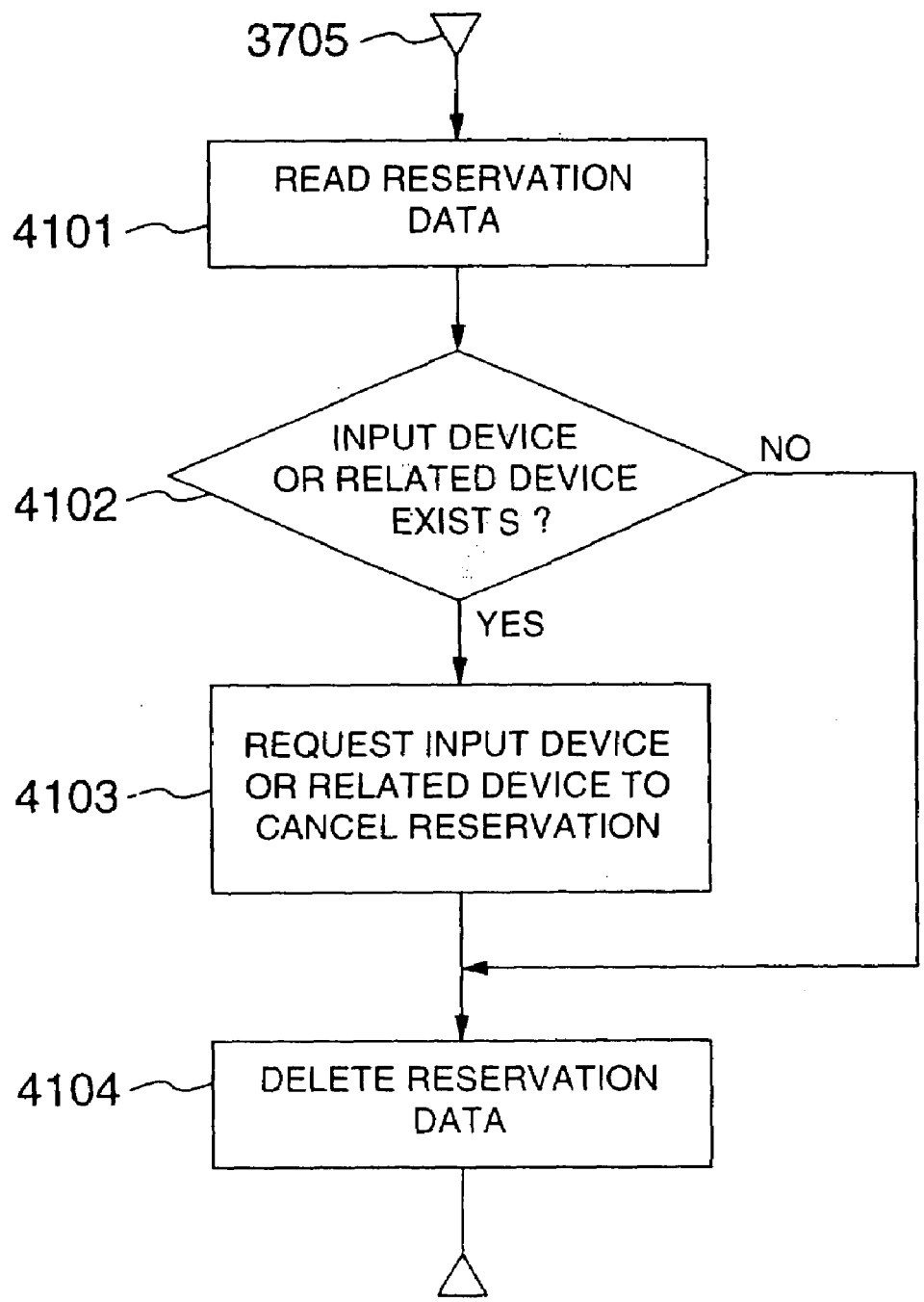
FIG. 41 is a flowchart showing the steps of cancelling the timer reservation.

Lastly, explanation will be made about the steps of cancelling the timer reservation of step 3705 with reference to FIG. 41.

First, the reservation data is read from the reservation data management section (step 4101) and the contents thereof are checked. Referring to the input device ID 2430 or the related device ID 2330, it is determined whether the reservation data is for the devices other than the local device (step 4102). If the reservation data is for other devices also, a reservation cancellation (i.e. the reservation data deletion) request is issued to all such devices (step 4103). The reservation data managed by the local device is deleted (step 4104). Unless the reservation data is for other devices, step 4104 is executed.

As described above, the required recording area is secured on the recording medium set in the recording device beforehand at the time of setting a timer reservation. In this way, the reservation data are so configured as to include the information on both the recording medium and the recording area. Thus, before starting to execute the reservation, the situation, if any, can be grasped in which a different recording medium is set or the capacity is insufficient. At the time of executing the reservation, therefore, the recording operation can be performed to the end on the designated recording medium accurately. Also, in the case where a recording request is issued from other devices after setting a reservation, the particular reservation is not affected and such requests can be handled flexibly.

According to this embodiment, the size of the recording area secured in the recording device is calculated from the standard transfer rate or the maximum recording rate of the program data. An alternative method is for the broadcasting station to contain the full capacity of the program data or the data on the maximum transfer rate in the various data and transmit them, so that the required size is secured based on these data in the recording device.

Figure 42:
FIG. 42 shows an example screen for displaying the details of a program on a program guide.

FIG. 42 shows a screen example for displaying the data capacity of the program received from the broadcasting station. When an arbitrary program is designated on the broadcast program guide screen 4200, the screen 4210 is displayed for explaining the program in detail. The data capacity of the program as well as the contents and the purchase price of the program are displayed on the screen 4210. As a result, a recording area can be secured efficiently and accurately in the recording device.

A timer reservation requires time adjustment between various devices. According to a method of time adjustment for the above-mentioned timer reservation system, a device for controlling the bandwidth, channel and power for isochronous transfer (a device having a bus manager or an isochronous resource manager and constituting a route, for example, for the system using IEEE1394) or a device such as a tuner capable of acquiring time information from an external broadcasting station for time adjustment makes up an input device for the time management sections 106, 116, which performs regular time adjustment for various devices interconnected on the bus. Such a method will be explained with reference to the embodiments shown in FIGS. 46 and subsequent drawings.

In another alternative method, when a timer reservation is designated, a device operatively interlocked with the device for executing a timer reservation requests the input device of the timer to adjust the time or acquires the time and adjusts it by itself.

Another embodiment of the invention will be explained below with reference to the drawings.

FIGS. 47A, 47B, 47C are diagrams showing a device system and a device for managing the timer according to a first embodiment of the invention. FIG. 47A shows the device system, FIG. 47B shows an integrated receiver/decoder providing a device of the system, and FIG. 47C shows a recording-reproducing device providing another device of the system. Numeral 4710 designates a bus, numeral 4700 the integrated receiver/decoder, numeral 4810 the recording-reproducing device, numeral 4820 a monitor, numeral 4701 a user interface section, numeral 4702 a communication interface section, numeral 4703 a satellite broadcast tuner, numeral 4704 a reservation data management section, numeral 4705 a time management section, numeral 4706 a reproducing section, numeral 4707 a control section, numeral 4711 a user interface section, 4712 a communication interface section, numeral 4713 a VHF/UHF tuner, numeral 4714 a reservation data management section, numeral 4715 a time management section, numeral 4716 a recording section and numeral 4717 a reproducing section.

In the description that follows, this embodiment is assumed to be an AV system and an example of timer reservation for this system will be explained.

In FIG. 47A, an AV system includes an integrated receiver/decoder 4700 for receiving broadcast programs using a communication satellite, a recording-reproducing device 4810 such as a VTR for recording AV data on a magnetic tape or a DVD, HD or MO for recording AV data in a magnetic disk or an optical disk, a monitor 4820 such as a TV receiver or a display unit of a personal computer, and a bus 4710 such as the IEEE1394 serial bus or USB for connecting the components.

Now, a method of a timer reservation and executing the timer reservation will be explained in the integrated receiver/decoder 4700 and the recording-reproducing device 4810 upon designation of reservation for "RECORDING BY TIMER SATELLITE BROADCAST PROGRAM IN RECORDING-REPRODUCING DEVICE 4810" from the user to the integrated receiver/decoder 4700. First, the configuration of the integrated receiver/decoder 4700 and the recording-reproducing device 4810 will be explained.

The integrated receiver/decoder 4700, as shown in FIG. 47B, includes a user interface section 4701 for exchanging signals for setting a timer reservation or display with the user by way of an input designation device such as a remote controller or a tablet, a communication interface section 4702 for communicating AV data and control signals with other devices (the recording-reproducing device 4810 and the monitor 4820 in this case) through a bus 4710, a satellite broadcast tuner 4703 for receiving a satellite broadcast program, a reservation data management section 4704 for managing the information on timer reservation, a time management section 4705 for managing the clock and notifying the arrival of a reserved time, a reproducing section 4706 for reproducing the received broadcast program on the monitor 4820, and a control section 4707 for controlling the operation of various internal parts of the integrated receiver/decoder 4700.

The recording-reproducing device 4810, on the other hand, includes, as shown in FIG. 47C, a user interface section 4811 for exchanging signals for recording and reproduction, timer reservation or display with the user by way of an input designation device such as a remote controller or a tablet, a communication interface section 4812 for communicating data and control signals with other devices (the integrated receiver/decoder 4700 and the monitor 4820 in this case) through the bus 4710, a VHF/UHF tuner 4813 for receiving a VHF/UHF broadcast program, a reservation data management section 4814 for managing the information on the timer reservation of a VHF/UHF broadcast program, a time management section 4815 for managing the clock and notifying the arrival of the reserved time, a recording section 4816 for recording the AV data of a broadcast program, etc. in a recording medium such as a magnetic tape or an optical disk, a reproducing section 4817 for reproducing the AV data recorded in the recording medium, and a recording-reproducing device control section 4818 for controlling the operation of the recording-reproducing device 4810.

Now, with reference to FIGS. 48A, 48B and 49A, 49B, explanation will be made about the information on the clock (hereinafter referred to as the clock information) managed by the time management section 4705 of the integrated receiver/decoder 4700 and the time management section 4815 of the recording-reproducing device 4810.

Figure 48A:
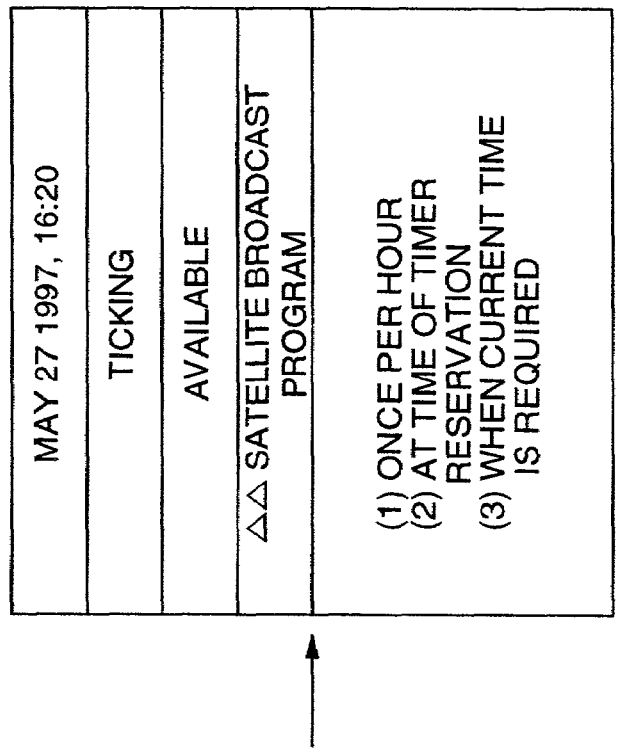
FIGS. 48A and 48B are diagrams showing a specific example of the clock information managed by the time management section of the integrated receiver/decoder in FIGS. 47A, 47B and 47C.
Figure 48B:
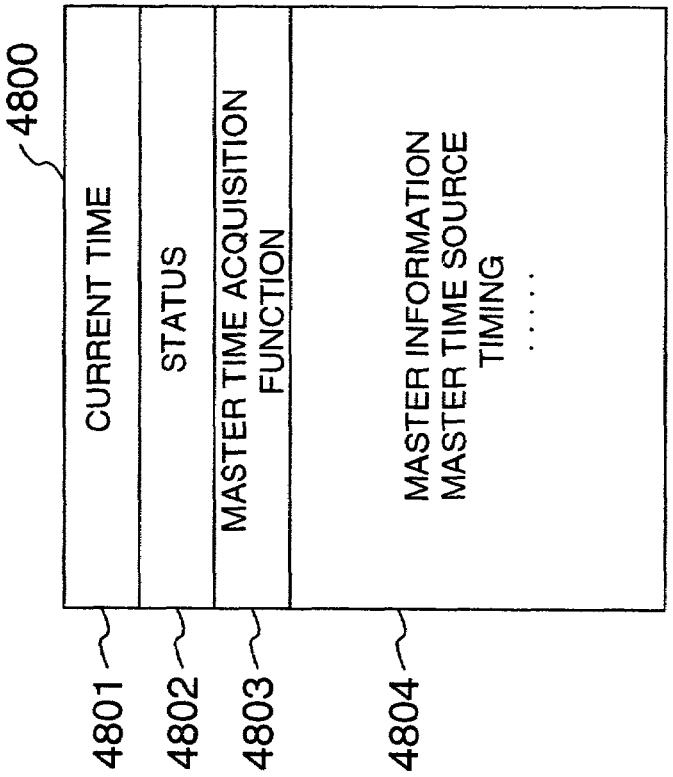

FIGS. 48A, 48B are diagrams showing a specific example of the clock information 4800 managed by the time management section 4705 of the integrated receiver/decoder 4700. FIG. 48A shows a configuration of the clock information and FIG. 48A shows specific contents of the clock information.

The time management section 4705 of the integrated receiver/decoder 4700 designated for timer reservation by the user, as shown in FIG. 48A, manages the clock information 4800 including the current time 4801, the status 4802, the master time acquisition function 4803 and the master information 4804. Specific contents of these data are shown in FIG. 48B.

The current time 4801 is the present date and time indicated by the clock in the integrated receiver/decoder 4700. (In the present case, as shown in FIG. 48B, it is May 27, 1997, 16:20) The status 4802 is the operating condition of the clock which may be ticking or stationary (FIG. 48B shows the clock ticking). The master time acquisition function 4803 indicates whether or not the integrated receiver/decoder 4700 has the function of acquiring accurate time from a source external to the device system (In FIG. 48B, the receiver 4700 is assumed to have such a function). The master information 4804 indicates, when the integrated receiver/decoder 4700 has the master time acquisition function, from what and in what timing the accurate time is acquired (In FIG. 48B, the accurate time is acquired from a received satellite broadcast program once every hour, at the time of reservation or upon receiving a request for acquiring the current time).

Figure 49A:
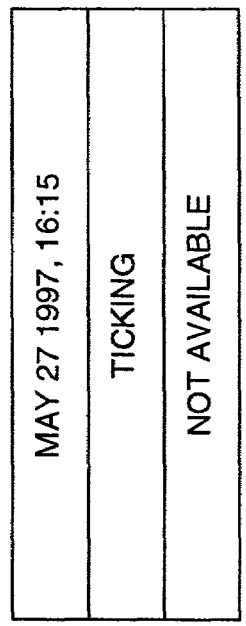
FIGS. 49A and 49B are diagrams showing a specific example of the clock information managed by the time management section of the recording-reproducing device in FIGS. 47A, 47B and 47C.
Figure 49B:
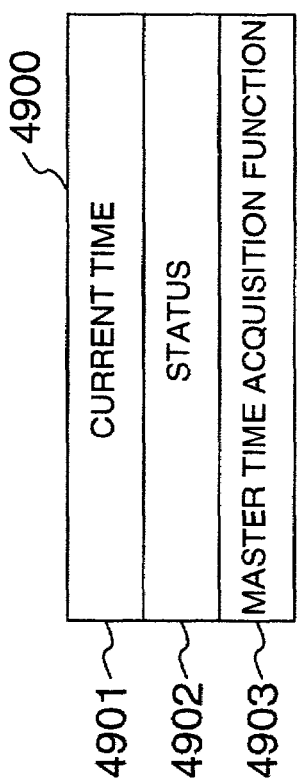
Figure 51E:
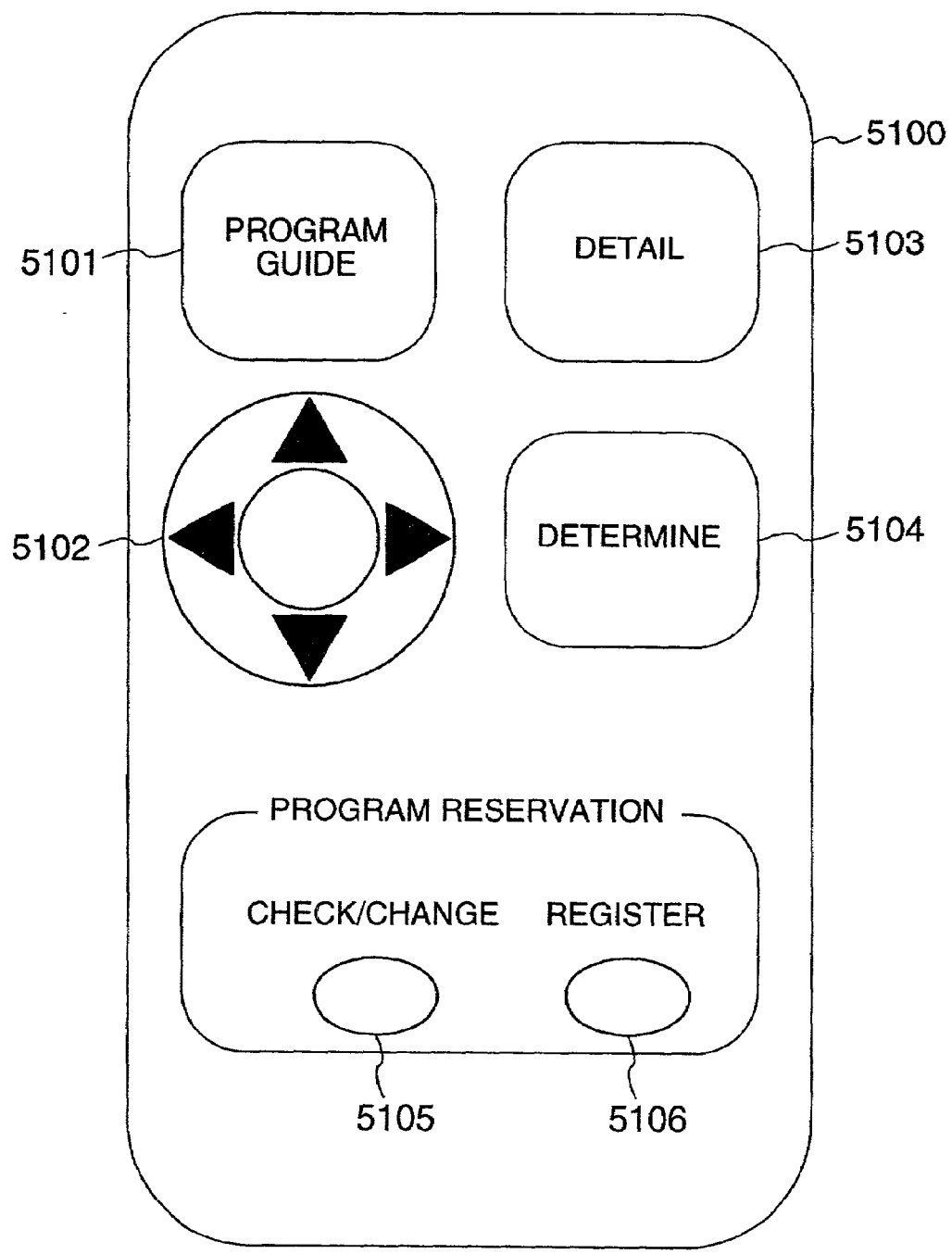

FIGS. 49A, 49B are diagrams showing a specific example of the clock information 4900 managed by the time management section 4815 of the recording-reproducing device 4810. FIG. 48A shows a configuration of the clock information, and FIG. 48B specific contents of the clock information.

The time management section 4815 of the recording-reproducing device 4810 operatively interlocked with the integrated receiver/decoder 4700 at the time of executing a reservation manages the clock information 4900 including the current time 4901, the status 4902 and the master time acquisition function 4903 as shown in FIG. 49A.

The current time 4901 indicates the present time on the clock in the recording-reproducing device 4810 (May 27, 1997, 16:15, in FIG. 48B). The status 4902 indicates the operating condition of the clock whether it is ticking or stationary (ticking in the case of FIG. 49B). The master time acquisition function 4903 indicates whether or not the integrated receiver/decoder 4700 has the function of acquiring accurate time from a source external to the device system (has no such function in FIG. 49B).

In the case where the integrated receiver/decoder 4700 has the master time acquisition function 4903, the time management section 4705 acquires accurate time from an external source based on the contents of the master information 4804 and adjusts the clock. Therefore, the integrated receiver/decoder 4700 can always keep accurate time.

Now, the steps of processing the timer reservation of the AV system according to the first embodiment shown in FIGS. 47A, 47B, 47C will be explained with reference to FIG. 50.

First, the user inputs a timer reservation designation and the reservation contents into the integrated receiver/decoder 4700 through the user interface section 4701 using an input designation device such as a remote controller or a tablet (step 5001). In the case where the reservation is executed in cooperation with other device than the integrated receiver/decoder 4700, a related device constituting such other device (the recording-reproducing device 4810 in this case) is determined (step 5002).

FIGS. 51A, 51B, 51C, 51D are diagrams showing a specific example of the image displayed on the liquid crystal screen of a monitor 4820 or a remote controller in steps 5001 and 5002. FIG. 51E is a model diagram showing a specific example of the operating section of the remote controller 5100.

In these diagrams, first, the user pushes a program guide button 5101 of the remote controller 5100. A program guide screen 5110 is displayed. A program to be reserved is selected on the screen 5110 using a direction button 5102 of the remote controller 5100. A registration button 5106 is depressed, and the screen 5120 for selecting the execution function is displayed. On the screen 5120, the reservation execution function (VIEW or RECORD) is selected using the direction button 5102 of the remote controller 5100, and the determine button 5104 is depressed. In the case where RECORD is selected, the screen 5130 for selecting a recording device, i.e. a related device is displayed. Information on the devices having the recording function (the device type such as VTR or DVD, and the name of the manufacturer) among the devices connected to the bus 4710 is displayed on the screen 5130. In the present embodiment shown in FIG. 47A, only one recording-reproducing device is connected to the bus 4710, and therefore only the information on the recording-reproducing device 4810 is displayed. When the determine button 5104 is depressed as described above, the screen 5140 for selecting the tape speed and the recording mode in the recording-reproducing device 4810 is displayed. On this screen 5140, the tape speed and the recording mode are selected, and then the determine button 5104 is depressed. The information on the record reservation is thus completely set.

Returning to FIG. 50, the time management section 4705 in the integrated receiver/decoder 4700 inquires of the time management section 4815 of the recording-reproducing device 4810 constituting a related device about the operating condition of the clock and the current time through the control section 4707 (step 5003). Based on the operating condition of the clock thus acquired in response, the clock of the recording-reproducing device 4810 is checked to see whether it is operating normally (step 5004). Also, the acquired current time in the recording-reproducing device 4810 is compared with the current time in the integrated receiver/decoder 4700, and the time error is checked to determine whether it is within a tolerable range (step 5005). In the case where the clock of the recording-reproducing device 4810 is sufficiently accurate to permit execution of the timer reservation, the input reservation data are set in the reservation data management section 4804 of the integrated receiver/decoder 4800 and the reservation data management section 4814 of the recording-reproducing device 4810 (step 5006).

Figure 52:
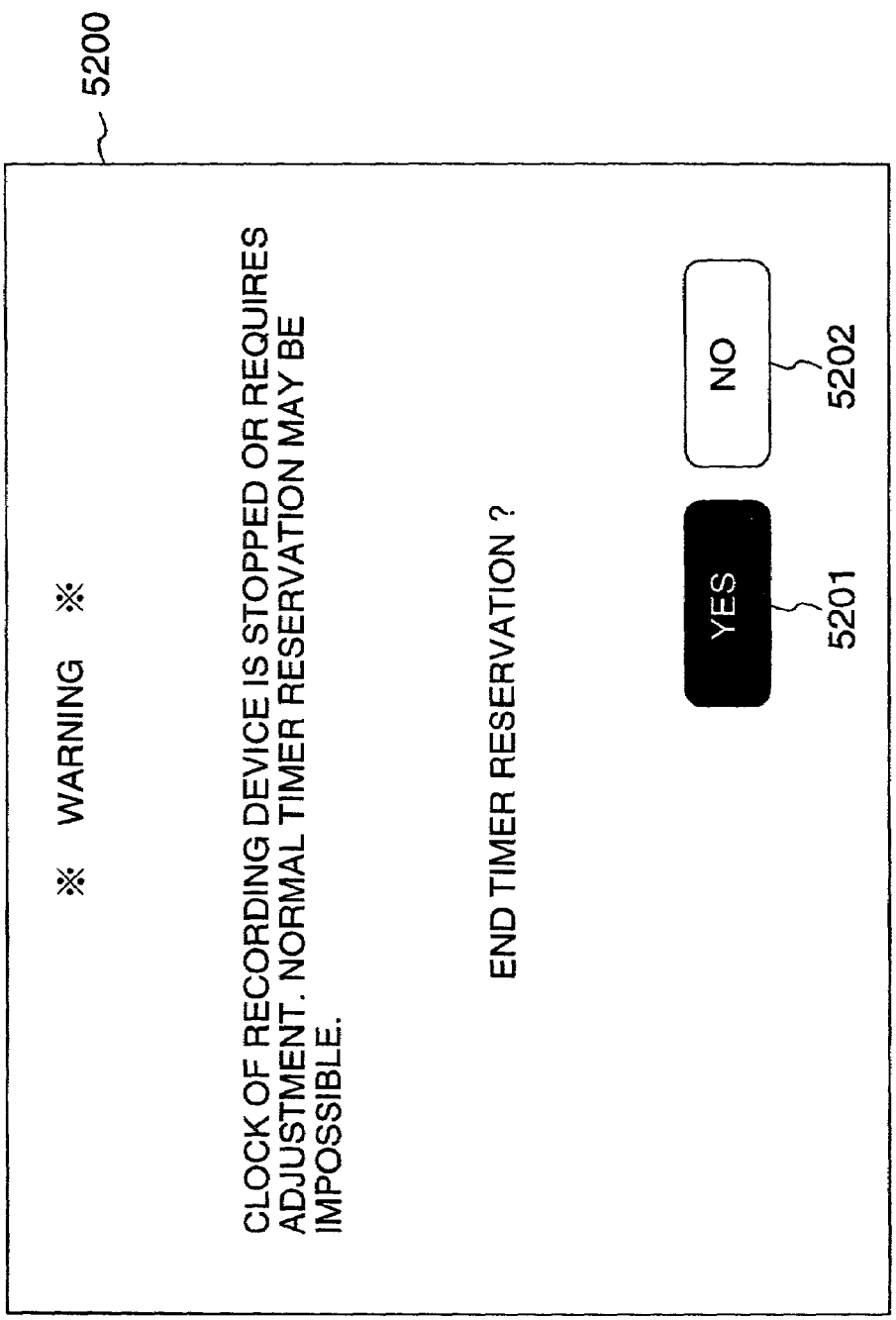
FIG. 52 is a diagram showing a specific example of the screen for notifying that the timer reservation may not be normally executed due to the malfunction of the clock of the integrated receiver/decoder in FIGS. 47A, 47B and 47C.

In the case where the clock of the recording-reproducing device 4810 is determined to have some problem in steps 5004 and 5005, the fact is displayed on the liquid crystal screen of the monitor 4820 or the remote controller and thus notified to the user (step 5007). FIG. 52 is a diagram showing a specific example of the screen 5200 displayed by the integrated receiver/decoder 4700. Depress the YES button 5201 on this screen 5200, and the timer reservation setting is complete. When the NO button 5202 is depressed, on the other hand, the screen 5200 is displayed again or the timer reservation is set as it is.

As shown in FIGS. 48A, 48B, 49A, 49B, the integrated receiver/decoder 4700 has the master time acquisition function 4803 for keeping accurate time, but the recording-reproducing device 4810 has no such function. In the case where the condition of the clock in the recording-reproducing device 4810 is determined to have some problem in steps 5004, 5005, therefore, not only the fact is notified in step 5007 of FIG. 50 but the integrated receiver/decoder 4700 in normal operation can control the current time and the operating condition of the clock of the recording-reproducing device 4810.

Specifically, in step 5007 of FIG. 50, the user is notified that the clock of the recording-reproducing device 4810 has some problem while at the same time making an inquiry whether the integrated receiver/decoder 4700 can correct the clock of the recording-reproducing device 4810. FIG. 53 shows a specific example of the screen 5300 displayed on the integrated receiver/decoder 4700 in such a case.

In FIG. 53, when the YES button 5301 is depressed, the time management section 4705 of the integrated receiver/decoder 4700 issues a command to the time management section 4815 of the recording-reproducing device 4810 to set the current time or to activate the clock. In response, the time management section 4815 of the recording-reproducing device 4810 corrects the current time or activates the clock, as the case may be, and notifies the result to the time management section 4705 of the integrated receiver/decoder 4700. If the result is that the clock is normal, the integrated receiver/decoder 4700 continues to set the timer reservation (step 5006). Otherwise, the result is notified to the user, who is requested to select the subsequent process.

FIG. 54 is a diagram showing a specific example of the screen 5400 displayed on the integrated receiver/decoder 4700 in such a case.

In FIG. 54, whether the timer reservation is ended or continued is selected on the screen 5400. When [1] is selected, the screen 5300 (FIG. 53) is displayed again, or the timer reservation is set or ended.

The data indicating whether other devices have the right to control the clock of the time management section 4815 of the recording-reproducing device 4810 is added to the time information 4900 managed by the time management section 4815.

FIG. 55A is a diagram showing a specific example of a configuration of the time information 5500 involved. FIG. 55B is a diagram showing specific contents thereof.

In step 5004 of FIG. 50, the time management section 4705 of the integrated receiver/decoder 4700 refers to the access right 5510 of the time information 5500 shown in FIGS. 55A, 55B in the time management section 4815 of the recording-reproducing device 4810. In the case where other devices have the right to access for adjusting the clock, the time management section 4705 of the integrated receiver/decoder 4700 can automatically adjust the clock of the time management section 4815 of the recording-reproducing device 4810. In the absence of such access right, on the other hand, the screen 5200 (FIG. 52) is displayed to notify the user.

In the process, a clock-adjusting request issued from a device such as the integrated receiver/decoder 4700 having the master time acquisition function (FIG. 48A) can be accepted. In such a case, DEVICE HAVING MASTER TIME ACQUISITION FUNCTION is set in the access right 5510.

Also, assume that the time management section 4815 of the recording-reproducing device 4810 has data on the devices acquiring a reference time. When the time management section 4815 adjusts the time, the time can be acquired from such devices. FIG. 56A is a diagram showing a specific example of a configuration of the time information 5600 managed by the time management section 4815 in such a case, and FIG. 56B is a diagram showing specific contents thereof.

In step 5004 of FIG. 50, the time management section 4705 of the integrated receiver/decoder 4700 refers to the time acquisition device data 5610 in the time information 5600 shown in FIG. 56A in the time management section 4815 of the recording-reproducing device 4810. The time management section 4705 of the integrated receiver/decoder 4700, if it is the time acquirer, automatically adjusts the clock of the time management section 4815 of the recording-reproducing device 4810. If the time acquirer is other device, on the other hand, the time management section 4705 of the integrated receiver/decoder 4700 requests the time management section 4815 of the recording-reproducing device 4810 to adjust time.

The time management section 4815 acquires the time from the device indicated in the time acquisition device data 5610 and adjusts it. As an alternative method, the time management section 4815 of the integrated receiver/decoder 4700 requests the device indicated in the time acquisition device data 5610 to adjust the time of the recording-reproducing device 4810. In the case where no device is indicated in the time acquisition device data 5610 or such a device, if any, is inoperative due to a power failure or for some other reason, the screen 5200 (FIG. 52) is displayed and the user is notified. A plurality of time acquisition device data 5610 may exist.

Further, the time information 5500 shown in FIG. 55A can be combined with the time information 5600 shown in FIG. 56A. In this case, a device for acquiring the time at default is set in the time acquisition device data 5610. In the case where the device indicated in the time acquisition device data 5610 is absent or a clock adjust request is issued from other device and if the requesting device satisfies the conditions shown in the access right 5510 (for example, a device having the master time acquisition function), then the time is adjusted based on the time from such a device.

According to this embodiment, a timer reservation is designated to the integrated receiver/decoder 4700 having the master time acquisition function 4803 (FIG. 48A). As an alternative, a timer reservation designation can be issued to the recording-reproducing device 4810 having no master time acquisition function 4903 (FIG. 49A). In such a case, as in the foregoing case, the time management section 4815 of the recording-reproducing device 4810 issues a request to the time management section 4705 of the integrated receiver/decoder 4700 to acquire the time information 4800. The time information 4800 thus acquired is compared with the time information 4900, and if there is any problem, the time of the device with a normally-operating clock and having the master time acquisition function is given priority (in this case, the integrated receiver/decoder 4700). This series of processing steps are similar to the one described above.

As described above, according to the first embodiment, the integrated receiver/decoder 4700 and the recording-reproducing device 4810 of a device system are connected to each other by the control bus 4710, and include the time management sections 4705 and 4815, respectively. Upon designation of a time reservation by the integrated receiver/decoder 4700, as described above, the time management section 4705 thereof issues a request to the time management section 4815 of the recording-reproducing device 4810 operatively interlocked therewith to acquire the data on the operating condition of the clock and the current time, and checks whether the clocks of the two time management sections have no problem in executing the particular timer reservation. If there is any problem, the user is notified on the monitor screen, etc. As a result, the setting of a timer reservation which may be impossible to execute normally can be prevented.

Also, the time information data 4800, 4900 shown in FIGS. 48A, 48B, 49A, 49B are provided with the master time acquisition functions 4803, 4903 so that a device may be checked as to whether it has the function of acquiring accurate time from an external source and adjusting it. In this way, a device capable of keeping accurate time (i.e. a device having the master time acquisition function) is given the ability to control the clock of the devices unable to keep accurate time. As a result, the clock can be automatically adjusted, thereby reducing the burden on the user and the chance of failure to execute the timer reservation.

FIG. 57 is a block diagram showing a device and a device system subjected to timer management according to a second embodiment of the invention. Numeral 5701 designates a personal computer (PC), numeral 5702 a DVD recording-reproducing device, numeral 5703 a MD recording-reproducing device, numeral 5704 an integrated receiver/decoder, numeral 5705 a VTR, numeral 5706 a cable broadcast receiver, numeral 5707 a monitor and numeral 5708 a VTR.

According to the second embodiment, an AV system is provided, which, in addition to the configuration of the first embodiment, comprises a plurality of AV devices connected on a bus and which is capable of managing the time flexibly against the change in system configuration as well as at the time of timer reservation.

The embodiment shown in FIG. 57 comprises the PC 5701, the DVD recording-reproducing device 5702 for reproducing or recording a DVD, a MD recording-reproducing device 5703 for reproducing or recording a MD, an integrated receiver/decoder 5704 for receiving a satellite broadcast program, a VTR 5705 for reproducing or recording the magnetic tape, a cable broadcast receiver 5705 for receiving a cable broadcast program and a monitor 5707 such as a TV for displaying AV data.

The devices 5701 to 5707 each include the time management section described in the first embodiment.

Also, each device having the master time acquisition function described in the fist embodiment (the integrated receiver/decoder 5704, the cable broadcast receiver 5706 and the monitor 5707 in the second embodiment) has the time information 4800 shown in FIG. 48A. The devices lacking the master time acquisition function (the PC 5701, the DVD 5702, the MD 5703 and the VTR 5705 in FIG. 57) have the time information 5600 shown in FIG. 56A.

This second embodiment can further comprise the VTR 5708 providing an AV device having not master time acquisition function. The operation of the VTR 5708 will be explained with reference to FIG. 58.

In FIG. 58, first, the buses are reset as required by the change in the AV system configuration due to the addition of the VTR 5708. Once the buses are reset entirely and the configuration of all the devices interconnected is determined with each device assigned an address (ID) (step 5801), the time management section 4815 of the VTR 5708 (FIG. 47C) inquires of all the devices 5701 to 5707 existing in the AV system about whether they have the function of acquiring the master time and the clock is current normally ticking or not (step 5802). Then, the time management section 4705 (FIG. 47B) of the devices having the master time acquisition function (the integrated receiver/decoder 5704, the cable broadcast receiver 5706 and the monitor 5707 in this AV system) notifies the VTR 5708 that the time management section 4705 has such a function. In the presence of a plurality of devices having the master time acquisition function with a clock normally ticking, the time management section 4815 of the VTR 5708 selects one of such devices and sets the address (ID) of the selected device in the time acquisition device data 5610 in the time information 5600 (FIG. 56A) (step 5804). In the absence of such a device, the user is notified and prompted to adjust the clock (step 5805).

The device that could normally set the time acquisition device data 5610 always acquires the current time from the device indicated in the data 5610 and adjusts the clock.

In the case where there are a plurality of devices in step 5804, the first device that has received the notification or the device having the largest address (ID) number can be determined as a time acquisition device.

Further, in step 5802, an arrangement can be made in which a request for acquiring the time information is issued to each device on the AV system, and after acquisition of such data, the time management section 5815 of the VTR 5708 can extract the device having the master time acquisition function from such devices.

In this second embodiment, also assume that as shown in FIG. 59, the VTR 5705 is extracted from the AV system or power fails. Then, the devices having no master time acquisition function on the AV system (the PC 5701, the DVD 5702 and the MD 5703 in FIG. 59) perform the processing shown in FIG. 60.

In FIG. 60, first, all the buses are completely reset and the connection of all the devices is determined with each device assigned an address (ID) (step 6001). The time management section 4815 of the recording-reproducing device 4810 (FIG. 47C) reads the contents of the time acquisition device data 5610 in the time information 5600 thereof (FIG. 56A) (step 6002). The device shown in the contents of the time acquisition device data 5610 is inquired about the presence thereof (step 6003). In the absence of a reply from such a device, the time acquisition device is reset in steps 5802 to 5805 of FIG. 58 (step 6004). Upon receipt of a reply from such a device, on the other hand, the current time continues to be acquired from such a device and the clock is adjusted accordingly.

In this way, even in the case where the AV system configuration is changed by addition or removal of a device, the clock can be automatically adjusted to accurate time without imposing any burden on the user.

This AV system has a plurality of devices having the master time acquisition function. At least an arbitrary one of the devices having no master time acquisition function is selected and determined as a time acquisition device. As an alternative, however, only one time acquisition device is determined in the AV system and the clocks of all the devices of the system are adjusted based on the time of the selected device. Such a system will be explained in detail below.

A specific example configuration of the time information managed by the time management sections 4705, 4815 of the devices 5701 to 5707 in the AV system of FIG. 57 is shown in FIGS. 61A, 61B and 62A, 62B.

Figure 61A:
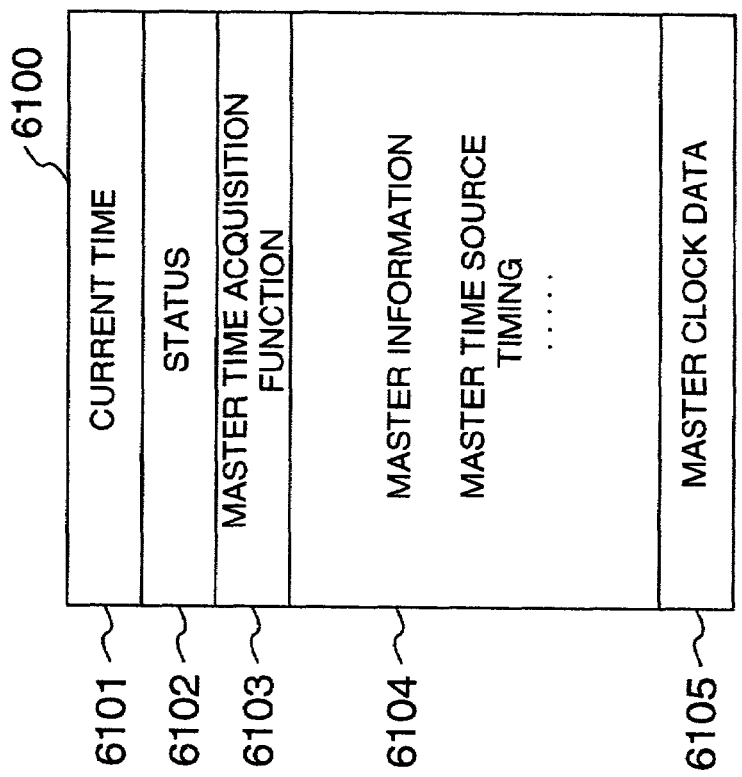
FIGS. 61A and 61B are diagrams showing a specific example of a configuration of time information managed by the time management section of a device having the master time acquisition function according to the second embodiment shown in FIG. 57.

First, explanation will be made about the time information 6100 managed by the time management section of a device having the master time acquisition function shown in FIGS. 61A, 61B. FIG. 61A shows a configuration of the information, and FIG. 61B specific contents thereof.

In FIG. 61A, the time information 6100 includes, as items managed thereby, the current time 6101, the status 6102, the master time acquisition function 6103, the master information 6104 and the master clock data 6105.

Figure 61B:
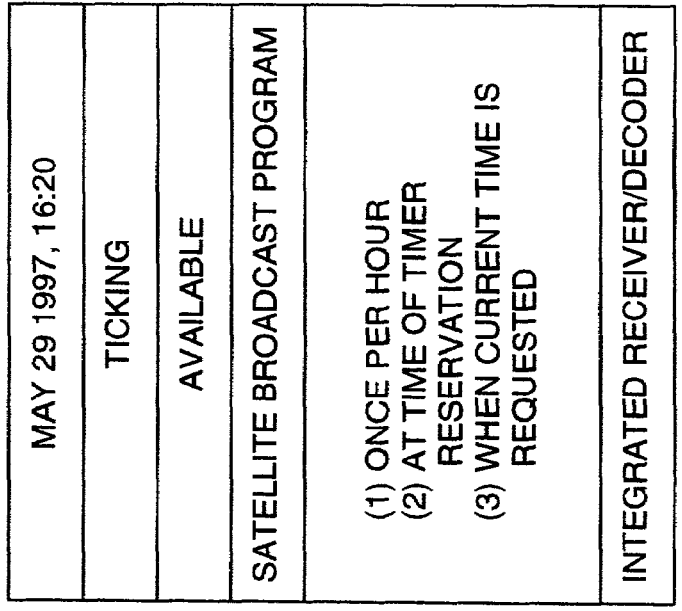

The current time 6101 indicates the present time on the clock in the device (May 29, 1997, 16:20, in FIG. 61B). The status 6102 indicates the operating condition of the clock whether the clock is ticking or stationary. (ticking in FIG. 61B). The master time acquisition function 6103 indicates whether the device has the function of acquiring accurate time from a source external to the AV system (the device has such a function in FIG. 61B). The master information 6104 indicates from what and in what timing the accurate time is acquired (in FIG. 61B, the accurate time is acquired once per hour from the received satellite broadcast program, at the time of timer reservation or upon request for acquisition of the current time). The master clock data 6105 indicates the address (ID) of the device constituting a sole time source (hereinafter referred to as the master clock) in the AV system (the integrated receiver/decoder in FIG. 61B).

Now, explanation will be made about the time information 6200 managed by the time management section of a device having no master time acquisition function shown in FIG.

62. FIG. 62A shows a configuration of the information, and FIG. 62B specific contents thereof.

In FIGS. 62A, 62B, the time information 6200 includes, as items managed thereby, the current time 6201, the status 6202, the master time acquisition function 6203 and the master clock data 6204.

The current time indicates the present time on the clock in the device (May 29, 1997, 16:15, in FIG. 62B). The status 6202 indicates the operating condition of the clock whether it is ticking or stationary. (ticking in FIG. 62B). The master time acquisition function 6103 indicates whether or not the device has the function of acquiring accurate time from a source external to the AV system (no such function in FIG. 62B). The master clock data 6204 indicates the address (ID) of the device constituting a sole time source (a master clock) (the master clock in FIG. 62B is the integrated receiver/decoder).

Now, the operation of the device having the master time acquisition function for processing the time information 6100 at the time of resetting the buses will be explained with reference to FIG. 63.

In FIG. 63, first assume that all the buses are completely reset and the configuration of connecting all the devices is determined with each device assigned an address (ID) (step 6301). The time management section of the device reads the contents of the time information 6100 (step 6302). Then, referring to the master clock data 6105 in the time information 6100, the time management section of the device checks whether or not it has been a master clock before the buses are reset (step 6303). If the answer is affirmative, the device notifies, within a predetermined time, the other devices in the same AV system that it continues to be a master clock (step 6304).

In the case where the time management section of the device has not been a master clock previously, the notification from a previous master clock is awaited (step 6305), and the time management section checks whether or not a notification is received within a predetermined time (step 6306). If a notification is received within that time, the device continues to be a master clock as a reference for time adjustment. If there is no such notification, on the other hand, a master clock is determined from among the devices having the master time acquisition function (step 6307).

In step 6307, a master clock is determined as one of the devices having the master time acquisition function with the largest address (ID), or the device information is displayed on the screen so that the user determines a master clock.

Now, the operation of processing the time information 6200 of a device having no master time acquisition function at the time of resetting the buses will be explained with reference to FIG. 64.

Figure 64:
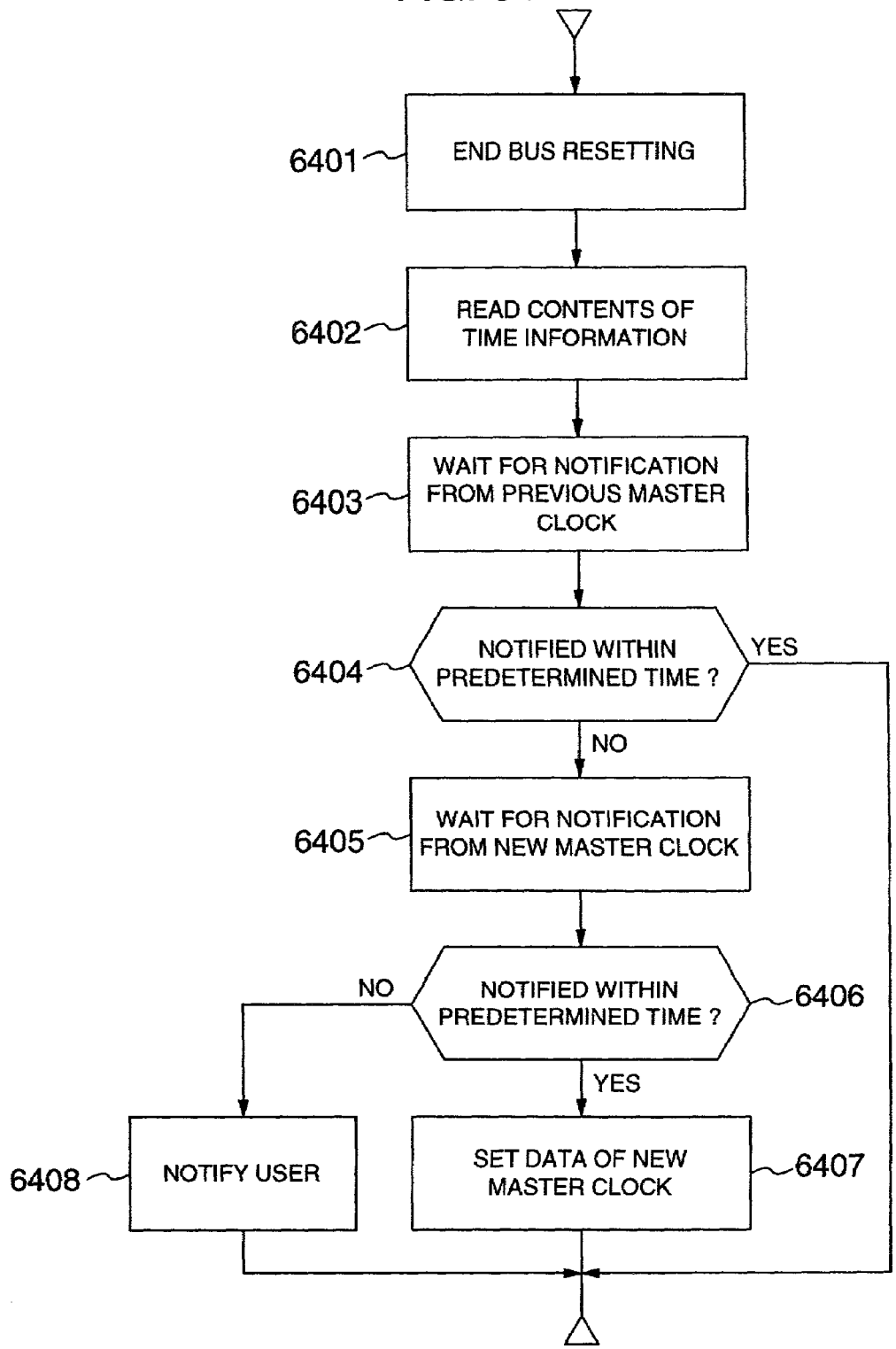
FIG. 64 is a flowchart showing the operation of processing the time information of a device having no master time acquisition function when the bus is reset according to the second embodiment in FIG. 57.

In FIG. 64, assume that all the buses are reset completely, and the configuration of connecting all the devices is determined with the address (ID) assigned to each device (step 6401). The time management section of this device reads the contents of the time information 6200 (step 6402), waits for a notification from the device indicated by the master clock data 6204 in the time information 6200 (step 6403), and checks whether or not a notification is received within a predetermined time (step 6404). If a notification is received within the predetermined time, the device continues to be a master clock and is used as a reference for time adjustment.

In the absence of a notification, on the other hand, the device waits for a notification from another device which has newly assumed a master clock (step 6405), and checks whether a notification is received within the predetermined time (step 6408). If the device receives such a notification, the contents of the master clock data 6204 in the time information 6200 are set in the device that has newly become a master clock (step 6407). In the absence of such a notification, on the other hand, the fact is displayed or otherwise notified to the user (step 6408).

In the above-mentioned manner, a single master clock is determined in the AV system, and the other devices in the AV system acquire the time as required from the master clock and adjusts their clocks. Thus, all the devices in the system can automatically maintain accurate time. It is also possible for the master clock to request all the devices in the AV system to adjust the clocks thereof or the master clock itself to execute the adjustment of the clocks of all the devices collectively at regular time intervals or as required.

In the device application according to the embodiments described above, each AV device is adapted to grasp all the information on itself from the information on the operation of all the devices, which information are set in the other AV devices and existing on the bus. In this way, all the information on the related device under control can be acquired from the information on the operation of the devices existing on the bus by inquiring only about the manner in which the related device uses the bus. The overlapped device operation or other inconveniences can thus be avoided and the matching of the devices operating on the bus can be maintained suitably.

Further, the required recording area on the recording medium set in the AV device is secured before-hand at the time of timer reservation. Therefore, an adverse situation, if any, in which a different recording medium is set or the capacity is not sufficient can be grasped before executing the reservation. It is thus possible to perform the recording operation to the end on a designated recording medium accurately at the time of executing the reservation. Also, a recording request which may be received from other AV devices after setting a reservation can be flexibly met without causing any problem in executing the reservation.

Furthermore, with the function such as timer reservation in which a plurality of devices cooperatively require the time information, the operating condition of the clock and the current time are referred to between the devices connected by a bus of the system to check whether the timer reservation can be executed without any problem. As a result, the setting of a timer reservation which may not be normally executed can be prevented.

Also, a device which can maintain accurate time (i.e. a device having the master time acquisition function) can adjust the clock of other devices which cannot maintain accurate time. Therefore, the clocks can be automatically adjusted so that the burden on the user and the failure to execute the timer reservation can be reduced.

In addition, according to the present invention, even when the system configuration is changed by addition or removal of devices, the clocks can be automatically adjusted accurately without imposing any burden on the user. Also, all the devices in the system can maintain accurate time by determining only one master clock in the system, acquiring the time from this master clock and adjusting the clocks of other devices as required.

The invention claimed is:

1. A device system comprising a plurality of devices for generating and recording and reproducing information and including a time management section for managing the time of the information signal and at least one display section connected by a bus to said devices for displaying said information signal, wherein each of said devices includes means for issuing a request to at least one other device through said bus to acquire the operating condition of the time management section and the current time, and means for receiving the information indicating the operating condition of said time management section.

2. A device system for managing time and information according to claim 1, wherein each of said devices includes means for storing the information indicating the operating condition of said time management section.

3. A device system for managing time and information according to claim 2, wherein each of said devices includes means for changing the contents of the information indicating the operating condition of said time management section stored in said storage means.

4. A device system for managing time and information according to claim 1, wherein each of said devices includes means for displaying the information indicating the operating condition of said time management section on said display section.

5. A device system for managing time and information according to claim 1, wherein each of said devices includes means for accessing the information indicating the operating condition of said time management section received from at least one other device through said bus and determining whether the time management section of said other device is operating normally or whether the accuracy of the current time is within a predetermined tolerance.

6. A device system for managing time and information according to claim 5, wherein the result of said determination is displayed on said display section.

7. A device system comprising a plurality of devices for generating and recording and reproducing information and including a time management section for managing the time of the information signal and at least one display section connected by a bus to said devices for displaying said information signal,
wherein each of said devices includes means for issuing a request to at least one other device through said bus to set the current time and the operating condition of the time management section including the operating condition of said time management section.

8. A device system according to claim 7, wherein each of said devices includes means for storing the information indicating the status of said time management section.

9. A device system according to claim 8, wherein each of said devices includes means for changing the contents of the information indicating the status of the time management section stored.

10. A device system according to claim 8, further comprising means for receiving the result as to whether the information indicating the status of said time management section is set or not.

11. A device system according to claim 10, wherein in the case where the result as to whether the information indicating the status of said time management section is set or not is received, said result is displayed on said display section.

12. A device system comprising a plurality of devices for generating and recording and reproducing information and including a time management section for managing the time of the information signal and at least one display section connected by a bus to said devices for displaying said information signal,
wherein each of said devices includes means for issuing a request to at least one other device through said bus to acquire the information indicating the status of said time management section including the current time and the operating condition of the time management section, means for receiving said information indicating the status of said time management section in response to said acquisition request, and means for issuing a request to the other devices to set the information indicating the status of the time management section.

13. A device system according to claim 12, wherein each of said devices includes means for displaying on said display section the information indicating the status of said time management section received through said bus.

14. A device system according to claim 13, wherein each of said devices includes means for storing the information indicating the status of said time management section.

15. A device system according to claim 12, wherein each of said devices includes means for accessing the information indicating the status of said time management section received from at least one other device and determining whether the time management section of said other device is operating normally or whether or not the accuracy of the current time is within a predetermined tolerance.

16. A device system according to claim 15, wherein each of said devices includes means for displaying the result of said determination on said display section.

17. A device system according to claim 12, wherein each of said devices includes means for displaying on said display section the result, if received, as to whether the information indicating the status of said time management section is set or not.

18. A device system comprising a plurality of devices for generating and recording and reproducing information and including a time management section for managing the time of the information signal and at least one display section connected by a bus to said devices for displaying said information signal,
wherein each of said devices includes means for transmitting the information indicating the status of said time management section in response to a request from at least one other device to acquire the information indicating the status of said time management section through said bus.

19. A device system comprising a plurality of devices for generating and recording and reproducing information and including a time management section for managing the time of the information signal and at least one display section connected by a bus to said devices for displaying said information signal,
wherein each of said devices includes means for setting the status of said time management section in response to a request from at least one other device to set the status of said time management section through said bus.

20. A device system according to claim 19, wherein each of said devices includes means for storing the information indicating the status of said time management section set in the above-mentioned manner.

21. A device system comprising a plurality of devices for generating and recording and reproducing information and including a time management section for managing the time of the information signal and at least one display section connected by a bus to said devices for displaying said information signal,
further comprising at least a device including means for requesting said at least one other device to acquire the information indicating the status of the time management section including the operating condition of the time management section and the current time and means for receiving the information indicating the status of said time management section, and at least a device including means for responding to a request from at least one other device to acquire the information on the status of the time management section through said bus, wherein the status of the time management section can be grasped between said devices existing on the bus.

* * * * *